United States Patent
Polidori et al.

(10) Patent No.: US 10,427,727 B2
(45) Date of Patent: Oct. 1, 2019

(54) DEPLOYABLE AERODYNAMIC DEVICE FOR REAR OF A CARGO BODY

(71) Applicant: Advanced Transit Dynamics, Inc., Hayward, CA (US)

(72) Inventors: Michael W. Polidori, Castro Valley, CA (US); Jeffrey J. Grossmann, Berkeley, CA (US); Jared A. Niemiec, Palo Alto, CA (US); Court S. Hinricher, Pacifica, CA (US); Austin A. Duncanson, San Francisco, CA (US)

(73) Assignee: STEMCO PRODUCTS, INC., Charlotte, NC (US)

( * ) Notice: Subject to any disclaimer, the term of this patent is extended or adjusted under 35 U.S.C. 154(b) by 0 days.

(21) Appl. No.: 15/543,135

(22) PCT Filed: Jan. 13, 2016

(86) PCT No.: PCT/US2016/013274
§ 371 (c)(1),
(2) Date: Jul. 12, 2017

(87) PCT Pub. No.: WO2016/115265
PCT Pub. Date: Jul. 21, 2016

(65) Prior Publication Data
US 2018/0001941 A1    Jan. 4, 2018

Related U.S. Application Data

(60) Provisional application No. 62/103,533, filed on Jan. 14, 2015.

(51) Int. Cl.
*B62D 35/00*    (2006.01)
(52) U.S. Cl.
CPC ......... *B62D 35/001* (2013.01); *B62D 35/007* (2013.01)

(58) Field of Classification Search
CPC ...... B62D 35/00; B62D 35/001; B62D 35/02; B62D 35/007; B62D 35/004; B62D 25/168; B62D 35/008; B62D 21/20
(Continued)

(56) References Cited

U.S. PATENT DOCUMENTS

| 5,328,228 | A | 7/1994 | Klassen |
| 5,947,353 | A | 9/1999 | Wieczorek |

(Continued)

OTHER PUBLICATIONS

PCT Application No. PCT/US2016/013274, International Search Report and Written Opinion, dated Mar. 17, 2016, 10 pages.

*Primary Examiner* — D Glenn Dayoan
*Assistant Examiner* — Sunsurraye Westbrook
(74) *Attorney, Agent, or Firm* — Perkins Coie LLP

(57) ABSTRACT

This invention provides aerodynamic structures for the rear of a cargo body that move between a deployed position and a retracted position. The aerodynamic structures are typically three-sided, with a top panel and opposing side panels that form a partial cavity at the rear of the body. The panels employ tensioned flexible (e.g. fabric) panels or rigid/semi-rigid panels that are stowed, rolled, or folded in a retracted position against the rear of the door frame (for flexible panels) of the cargo body, or along the sides of the cargo body (for rigid/semi-rigid panels). The rigid/semi-rigid panels can be stored within nacelles that protect the panels and improve aerodynamic performance. Various linkages, including rotating rigid members attached to the rear of the body can coordinate movement between a top panel and side panels between deployed and retracted positions and a variety of powered and non-powered actuators can facilitate panel movement.

14 Claims, 45 Drawing Sheets

(58) Field of Classification Search
USPC .......... 296/180.4, 180.1, 180.5, 181.5, 24.35
See application file for complete search history.

(56) References Cited

U.S. PATENT DOCUMENTS

| | | | | |
|---|---|---|---|---|
| 6,257,654 | B1* | 7/2001 | Boivin | B62D 35/001 |
| | | | | 296/180.4 |
| 8,360,509 | B2* | 1/2013 | Smith | B62D 35/001 |
| | | | | 296/180.4 |
| 9,199,673 | B2* | 12/2015 | Baker | B62D 35/001 |
| 9,333,993 | B2* | 5/2016 | Telnack | B62D 35/007 |
| 9,561,747 | B2* | 2/2017 | Royer | B65D 88/125 |
| 2003/0034666 | A1* | 2/2003 | Wood | B60J 7/085 |
| | | | | 296/98 |
| 2008/0093886 | A1* | 4/2008 | Nusbaum | B62D 35/001 |
| | | | | 296/180.1 |
| 2011/0037291 | A1* | 2/2011 | Pickering | B62D 35/001 |
| | | | | 296/180.4 |
| 2013/0076064 | A1* | 3/2013 | Smith | B62D 35/007 |
| | | | | 296/180.1 |

* cited by examiner

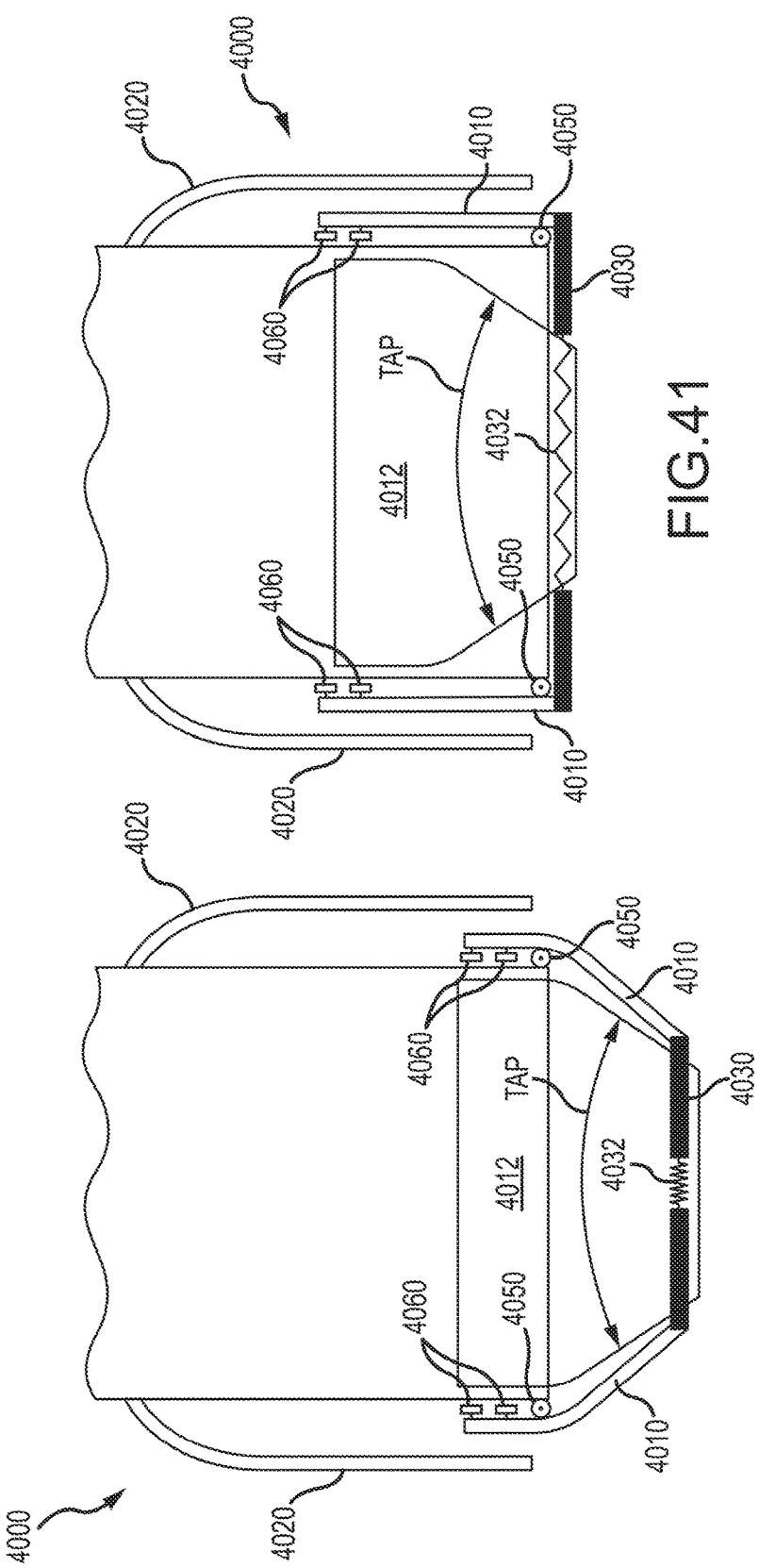

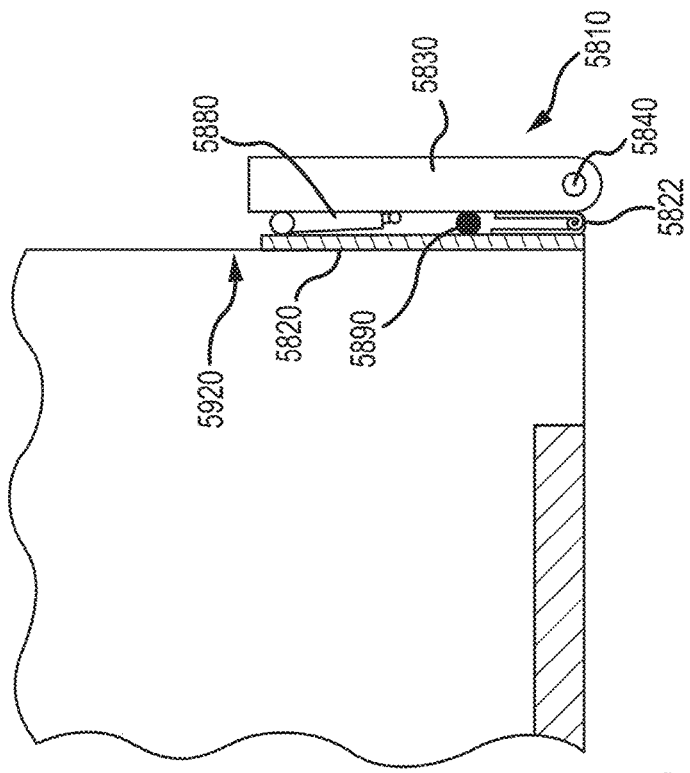
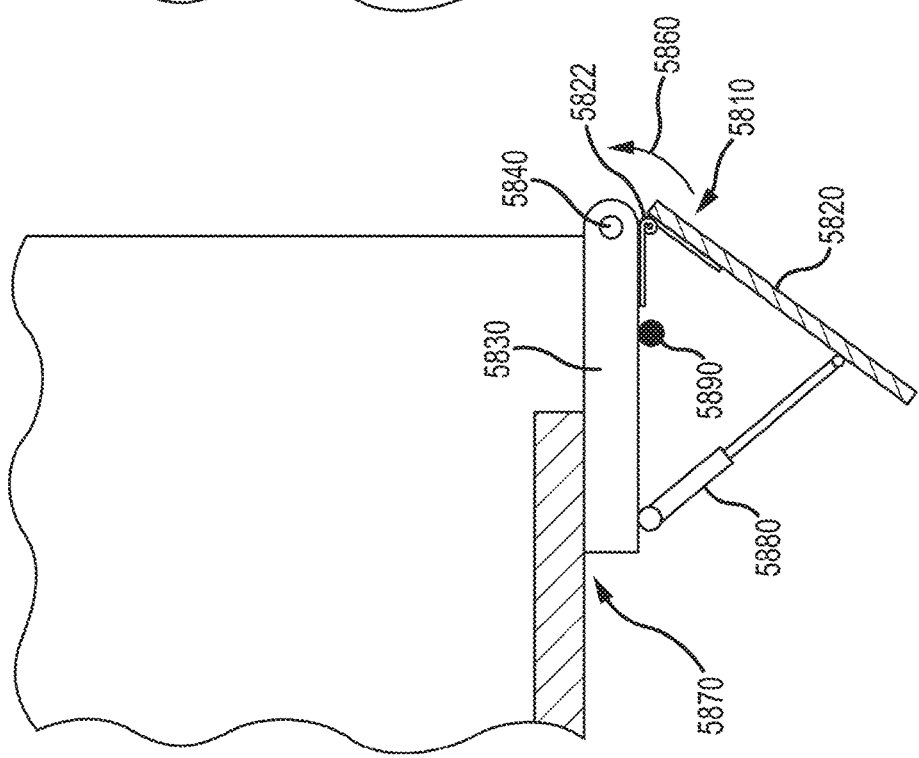
FIG. 59
FIG. 58

DEPLOYABLE AERODYNAMIC DEVICE FOR REAR OF A CARGO BODY

RELATED APPLICATIONS

This application is a 35 USC § 371 National Stage application of International Application No. PCT/US2016/013274, entitled "DEPLOYABLE AERODYNAMIC DEVICE FOR REAR OF A CARGO BODY," filed on Jan. 13, 2016, which claims priority to U.S. Provisional Patent Application Ser. No. 62/103,533, filed Jan. 14, 2015, the disclosures of which are incorporated herein by reference as if set out in full.

FIELD OF THE INVENTION

The present technology relates to rear-mounted aerodynamic structures for cargo bodies having rolling rear access doors and similar rear access requirements, and more particularly to deployable aerodynamic structures for the same.

BACKGROUND OF THE INVENTION

Trucking is the primary mode of long-distance and short-haul transport for goods and materials in the United States, and many other countries. Trucks typically include a motorized cab in which the driver sits and operates the vehicle. The cab is attached to a box-like cargo section. Smaller trucks typically include an integral cargo section that sits on a unified frame which extends from the front wheels to the rear wheel assembly. Larger trucks often include a detachable cab unit, with multiple driven axles, and a separate trailer with a long box-like cargo unit seated atop two or more sets of wheel assemblies. These truck assemblages are commonly referred to as "semi-trailers" or "tractor trailers." Most modern trucks' cabs, particularly those of tractor trailers, have been fitted with aerodynamic fairings on their roof, sides and front. Among other things, these fairings assist in directing air over the exposed top of the box-like cargo body, which typically extends higher (by several feet) than the average cab roof. The flat, projecting front face of a cargo body is a substantial source of drag. The use of such front-mounted aerodynamic fairings in recent years has served to significantly lower drag and, therefore, raise fuel economy for trucks, especially those traveling at high speed on open highways.

However, the rear end of the truck's cargo body has remained the same throughout its history. This is mainly because most trucks include large swinging or rolling doors on their rear face. Trucks may also include a lift gate or a lip that is suited particularly to backing the truck into a loading dock area so that goods can be unloaded from the cargo body. It is well-known that the provision of appropriate aerodynamic fairings (typically consisting of an inwardly tapered set of walls) would further reduce the aerodynamic profile of the truck by reducing drag at the rear face. The reduction of drag, in turn, increases fuel economy.

Nevertheless, most attempts to provide aerodynamic structures that integrate with the structure and function of the rear cargo doors of a truck have been unsuccessful and/or impractical to use and operate. Such rear aerodynamic structures are typically large and difficult to remove from the rear so as to access the cargo doors when needed. One approach is to provide a structure that swings upwardly, completely out of the path of the doors. However, aerodynamic structures that swing upwardly require substantial strength or force to be moved away from the doors, and also require substantial height clearance above an already tall cargo body. Other solutions have attempted to provide an aerodynamic structure that hinges to one side of the cargo body. While this requires less force to move, it also requires substantial side clearance—which is generally absent from a closely packed, multi-truck loading dock.

To improve the aerodynamics of a truck or trailer cargo body by reducing drag, several solutions have been provided that focus on trucks having swinging doors, which are not always readily applicable to cargo bodies having rolling doors. For useful background information on aerodynamic structures for swinging cargo doors, refer to commonly assigned U.S. Pat. No. 8,100,461, issued Jan. 24, 2012, by Smith et al., and U.S. Pat. No. 8,360,509, issued Jan. 29, 2013, by Smith et al., which are both incorporated herein by reference as if set out in full. While these devices are usable on a trailer having a roller door, they are impractical as the aerodynamic device would need to be separately operated from the roller door.

Only recently has an effort been made to improve the aerodynamic efficiency of vehicles with use of rear fairings or "boat tail" devices to reduce the aerodynamic drag of the cargo body. However, there is a lack of commercially available devices that are suitable for use with a rolling-door cargo body (or other similarly configured trailer body) that allows for access to the full loading dimensions of the rolling door. Moreover, aerodynamic devices usable with roller doors have been challenging to construct and use.

SUMMARY OF THE INVENTION

The technology of the present application overcomes certain disadvantages of the prior art by providing an aerodynamic device for the rear of a cargo body (e.g. a truck trailer) that uses an aerodynamic panel that moves from a retracted position adjacent to the door frame to a deployed position that extends rearwardly from the end edge along at least three sides thereof. In one aspect, a rotating member may be attached at, or near, the rear of the cargo body (e.g. the door frame). The rotating member rotates about an axis defined by the connection to the cargo body. At least a distal end of the rotating member is coupled at, or near, a trailing edge of the aerodynamic panel(s). The rotating member is rotated to extend and/or retract the panel member.

In one aspect, the panel may be constructed of a flexible material such that the flexible panel can be supplied on a roller (for example, a conically shaped roller). In another aspect, the panel may be supplied to slide along a side of a cargo body sidewall, or within a telescoping cage, mounted to the frame end, and define side panels. In certain embodiments, the panel may be shaped such that it has an upwardly tapered (e.g. triangular) shape in the deployed position and a top panel that is generally rectangular.

In certain embodiments, the rear/outer end of each side panel is supported by a rigid member hinged at a bottom end the rear of the cargo body. The top panel is supported by an arrangement of rotating members or arms that are each hinged between the frame and the top of the side panel rigid member. Illustratively, in one aspect, the side panels and top panel can be stored in nacelles that are located forward of the rear door frame on the sides and top of the body, respectively. The panels slide rearwardly from the retracted to deployed position. The sliding may be facilitated using roller arrangements and/or hinged, rotating rigid members. In further embodiments, side panels can be mounted relative to the underside of the body and slide upwardly along tracks from the retracted position to a deployed position extending rearwardly from the door frame.

In further embodiments, an aerodynamic device for a rear of a cargo body comprises a side panel mounted between a frame of the cargo body and a support that hinges between a retracted position and a deployed position based upon operation of an actuator or biasing spring, or both. The support can define a rotating rigid member that is hingedly mounted between a position at or near the rear (e.g. door frame) of the cargo body and at or near the trailing edge of the panel. The rotating rigid member at a proximal end rotates on an axis defined by the hinged connection of the member to the cargo body. The rotating rigid member at a distal end rotates in an arc from a position adjacent the cargo body to a position removed from the cargo body. Illustratively, side take-up area is provided, into which the flexible side panel is gathered in the retracted position. A moving top frame member is operatively connected to the support that coordinates movement of a flexible top panel between the retracted position and the deployed position. A top take-up area also is provided into which the flexible top panel is gathered in the retracted position. The side take-up area can include a roller. The roller can comprise a conical roller and the flexible side panel can define a downwardly tapered structure in the deployed position. Additionally, the top take-up area can include a roller.

In further embodiments, the aerodynamic device for a rear of a cargo body can comprise a rigid side panel that moves between a retracted position and a deployed position along a guide that is mounted on a side of the cargo body. A rotating member is interconnected between the cargo body and the side panel, which maintains a shape and inward/rearward taper of the panel as it moves from the retracted position to the deployed position. A linkage joins the rotating member to a top panel so that the top panel slides along a roof of the cargo body between the retracted position and the deployed position in coordination with the rigid side panel. Illustratively, the rigid side panel and the top panel are moved to at least one of the retracted position and the deployed position by an actuator, or biased by a spring, or both. Illustratively, the side panel can be stored within a nacelle when it is in the retracted position, and the side panel can define a rear edge that is positioned remote from a rear edge of the cargo body in the deployed position. The side panel can include a plurality of hinges to avoid contacting the cargo body when moving to the retracted position. Illustratively, the top panel can be stored in a nacelle in the retracted position, and the top panel can include a plurality hinges to avoid contacting the cargo body when moving to the retracted position Illustratively, the biasing mechanism can include one of a mechanical spring, a gas spring, a linear actuator, a lead screw and rack and pinion and a torsion spring. The actuator can be at least one of a mechanical spring, a gas spring, a driven lead screw, a linear motor, a rotating motor, a fluid motor and a fluid piston.

BRIEF DESCRIPTION OF THE DRAWINGS

The invention description below refers to the accompanying drawings, of which:

FIG. 40 is a partial top view of a cargo body and rear aerodynamic device showing side panels and side nacelles with the side panels biased by an expanding member, in a deployed position, according to an illustrative embodiment;

FIG. 41 is a partial top view of the cargo body and rear aerodynamic device of FIG. 40 in a retracted position;

FIG. 58 is a partial top view of a cargo body and rear aerodynamic device showing a side panel mounted on a rotating external frame against the rear of the cargo body rear, in a deployed position, according to an illustrative embodiment;

FIG. 59 is a partial top view of the cargo body and rear aerodynamic device of FIG. 58 in a retracted position;

DETAILED DESCRIPTION

Figure 1:
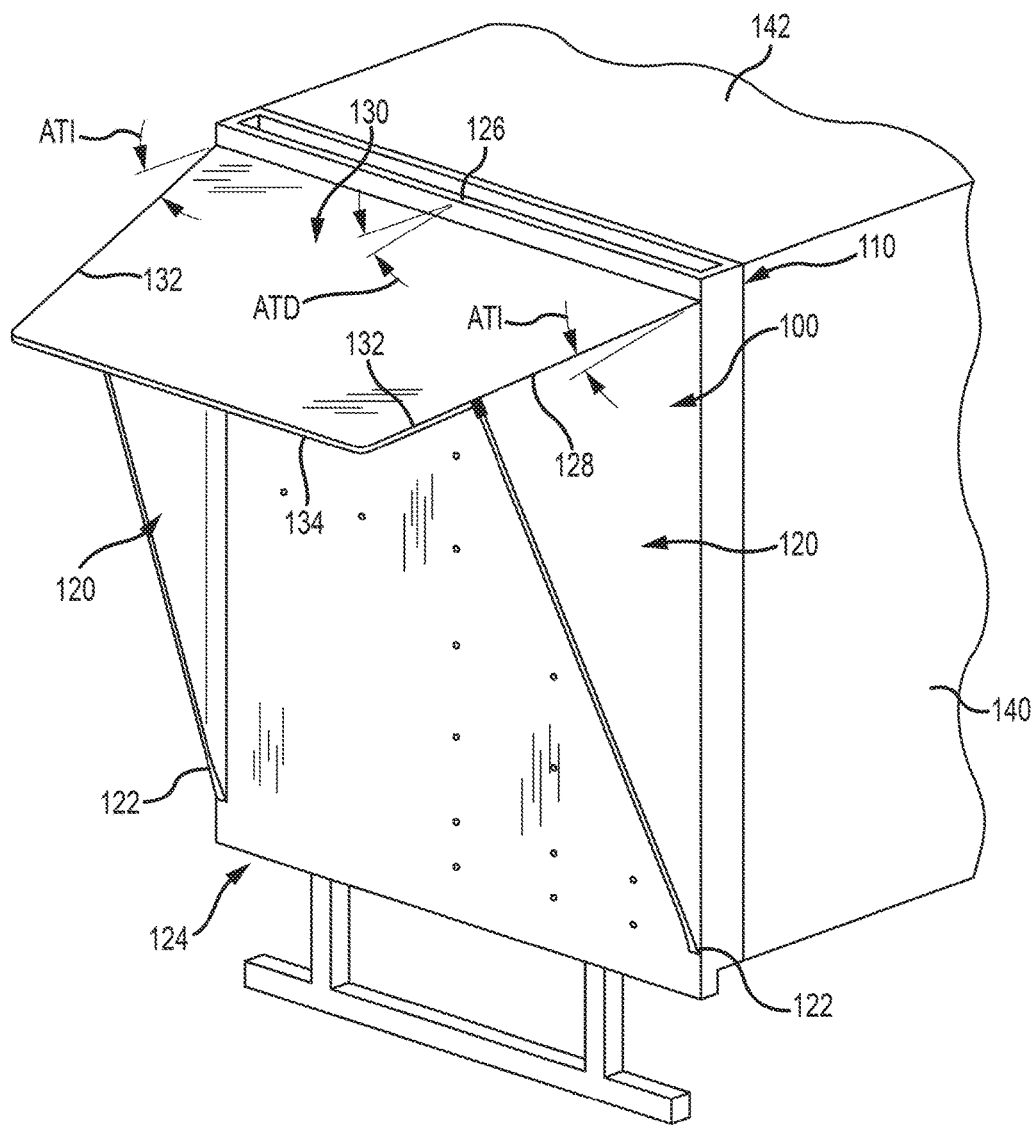
FIG. 1 is a rear perspective view of an exemplary cargo body (e.g. a truck trailer) with a rear aerodynamic device having three sides (side and top panels) in a deployed position.

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to the rear end of a cargo body for a tractor trailer that has a vertical roller door (sometimes referred to as a rolling door). Such doors move vertically to open and close, similar to a conventional garage door, rather than swing open and close by rotating about hinges that form a rotation axis for the door. However, one of ordinary skill in the art on reading the disclosure will now understand that the technology of the present application is applicable to other vehicles having generally vertical rear ends, such as, for example, railcars, buses, integral truck/trailers, and the like. Moreover, the technology of the present application will be described with relation to illustrative or exemplary embodiments. The words "illustrative" or "exemplary" are used herein to mean "serving as an example, instance, or illustration." Any embodiment described herein as "illustrative" or "exemplary" is not necessarily to be construed as preferred or advantageous over other embodiments.

Additionally, unless specifically identified otherwise, all embodiments described herein should be considered exemplary. The particular parts, structures, and components of the various exemplary embodiments may be interchanged freely without adding or detracting from the technology described herein. In the description of any particular exemplary embodiments, structure described elsewhere in present application may/may not be described with respect to the particular exemplary embodiment as a matter of convenience.

A rear aerodynamic device 100 (sometimes referred to simply as "device") consisting of a "three-sided" aerodynamic fairing arrangement (e.g. top and two sides or partial sides) according to an illustrative embodiment is shown and described with reference to FIGS. 1-5. While described as a three-sided device (a top and opposing sides), the device 100 (as well as other devices described herein may be configured to operate with a fourth side as one of ordinary skill in the art would now recognize. The device 100 is shown somewhat schematically in a deployed position in FIG. 1. The device 100 is mounted, as explained further below, to the rear frame 110 of a cargo body (also termed herein a "trailer" or simply "body"). The device 100 consists of a fairing arrangement in which a flexible or semi-flexible material (e.g. a fabric, reinforced fabric, certain plastics and fiberglass), is used so that it can be rolled or folded when in the retracted position. While deployed as shown in this exemplary embodiment, the device 100 defines two triangular-shaped side fairing panels 120 that taper upwardly from a bottom position 122 near the bottom edge 124 of the door frame 110 to a top edge 126 of the frame 110, where the top edges 128 of the side panels confront a top fairing panel 130, thereby defining a three-sided rear aerodynamic device 100. The side panels 120 in this illustrative arrangement define triangles where the majority of rearward extension is adjacent to the top. From a practical aerodynamic standpoint, the majority of aerodynamic advantage is achieved with an extended structure nearer to the top of the body/frame. This upwardly tapered/triangular shape achieves that goal, while still allowing for ease of storage during retraction as described further below. Note that, when deployed, the outer edges 132 of the top panel 130 and the outer plane of each side panel 120 taper inwardly (in a rearward direction) at an angle ATI relative to the plane of the cargo body side 140. Likewise, the outer plane of the top panel 130 tapers downwardly (in a rearward direction) at an angle ATD relative to the plane of the cargo body top 142. The angles ATI and ATD can vary within a range. For example ATI and/or ATD can be in a range of 3-0 degrees in an illustrative embodiment.

Figure 2:
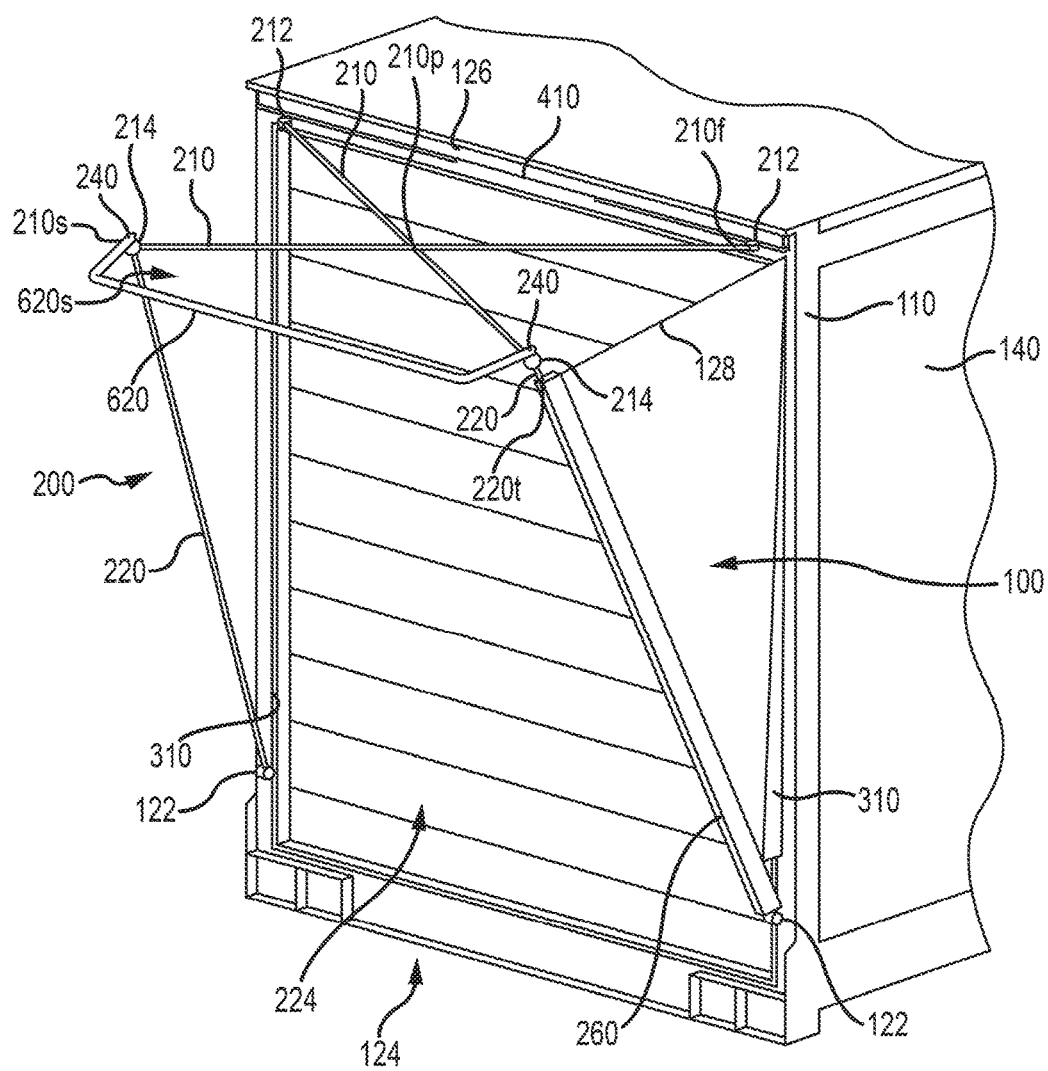
FIG. 2 is a rear perspective view of the cargo body and rear aerodynamic device of FIG. 1 showing the top and side panel fabric on one side removed to reveal rotating rigid members.

With particular reference to FIG. 2, the supporting framework 200 for the device 100 includes top rigid rotating members 210. The top rigid rotating members 210 are mounted at a first end 210*f* proximal to the top edge 126 of rear frame 110 by joints 212, which may be a piano hinges, a door hinges, a ball and socket joints, or the like (such joints are generally understood in the art and provide the required degrees of freedom). The second end 210*s* of the top rigid rotating members 210, which is opposite the first end 210*f*, is coupled to a trailing side 220*t* of the side rigid members 220. For ease of reference, the top rigid rotating members 210 and the side rigid members 220 are sometimes referred to as top members 210 and side members 220. The coupling to the trailing side 220*t* of the side rigid members 220 may be via a similar joint 212. The top rigid rotating members

210 may be pivotally connected at a point 210*p* using pin or the like such that the top rigid rotating members 210 form a scissor linkage assembly. These top rigid rotating members 210 and side rigid members 220 are mounted so that they do not interfere with the body loading area and associated door (e.g. a roll door) 224 when retracted. Generally, the roll door 224 can be open and closed when the device 100 is deployed as well, but the deployed device may interfere with loading dock operation. The rotating rigid members 210 and the side rigid members form a support frame that facilitate the maintenance of an aerodynamic shape in the deployed position. Thus, the panel materials can be a wide variety of material including durable fabric, plastics, fiberglass, composites, thermoplastics, thermosets, and the like. The panel, such a fabric or the like, is connected to the top rigid rotating members 210 and the side rigid members 220 to form the device 100 including fairing panels 120, 130 as shown. The connections can be accomplished by a sewn sleeve at an end of the fabric, for example, that fits around the rigid members. Additionally, the fabric may be coupled to the top rigid rotating members 210 and the side rigid members 220 using grommets, pins, clips, rivets, adhesives, etc. The top panel 130 is also coupled at it rearmost edge 134 to a cross piece (620, described further below). This attachment can also be made via a sewn sleeve, clips, rivets, grommets, pins, adhesives, etc.

By way of illustration, the top fairing panel 130 is shaped in part by the top rigid rotating members 210. In an alternative construction, for example, the top rigid rotating members 210 may be a U or shaped construction of rigid members (not specifically shown). In other words, with reference to FIG. 1, the top fairing panel may be supported by first and second longitudinal members along the confronting edges 132. A third transverse member would connect the first and second longitudinal members along the rearmost edge 134.

The top rigid rotating members 210 are each hinged to the top of the frame 110 at joints 212. They rotate on the joints 212 between a position flush against the frame 110 and with free ends 214, opposite the joints 212, adjacent to the side of the frame 110 when the device 100 is retracted and an outwardly extended position that defines the inward taper (ATI above) when fully extended (as shown in FIG. 2).The device 100 could be constructed in certain embodiments to eliminate the inward taper (ATI) and the downward taper (ATD). The free ends 214 include an arrangement 240 that rotatably couples the top rigid rotating members 210 with respect to side rigid members 220 as they move between the retracted and deployed positions. The arrangement 240 may be similar to the described joint 212, which may be a hinge, gimbal, ball and socket, or the like. As explained further below with respect to FIGS. 3, 4, and 5, in this embodiment, each of the top fairing panel 130 and side panels 120 are mounted on a roller 410, 310, each of which roller 410, 310 is mounted to the frame 110 and allows the associated panel to be retracted close to the frame or extended into the deployed orientation as shown in FIG. 1. While not shown, the rollers 410, 310 may be provided in a housing having a slot out of which the top fairing panel 130 and side fairing panels 120 can move. In this embodiment, the top edge 128 of each side panel 120 and the confronting edge 132 of the top panel 130 do not couple and are unjoined. As desired, the confronting edge 132 and the top edge 128 may be operably coupled using a flexible seal, such as a brush and/or foam wiper to reduce slipstream airflow infiltration into the internal cavity defined by the panels 120, 130 (operably coupling in this instance means covering the gap to increase the aerodynamic efficiency of the device). The unjoined configuration of the panels allows each panel to roll-up separately on its respective roller.

The top and side members 210, 220 in any embodiment herein can be constructed from any acceptable material with sufficient strength, durability and weather-resistance to allow for long-term outdoor use in a harsh, weather-variable environment under aerodynamic loading at speed. For example composite, (e.g. stainless or coated) steel or aluminum tubes having a rectangular and/or square (or round/ovular) cross section can be employed. The joints can be any acceptable arrangement that allows rotation about one or more axes and can handle the loading and environmental demands. Because the rigid members may rotate in three degrees of freedom, a ball joint can be implemented and/or a multi-axis gimbal assembly. As joints are generally understood in the art, they are not described in detail unless necessary for a complete understanding of the technology disclosed herein.

Figure 3:
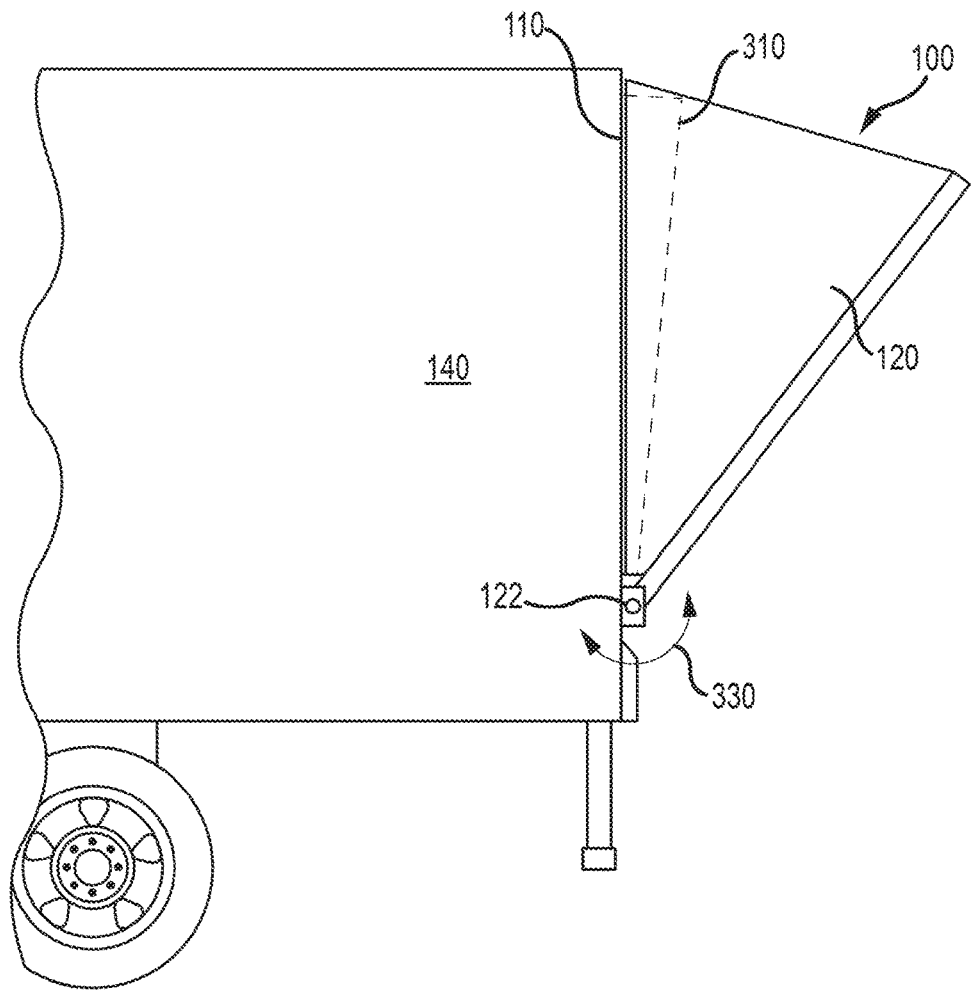
FIG. 3 is a partial side view of the cargo body of FIG. 1 with the rear aerodynamic device in a deployed position showing the location of a conical take-up roller for the side panel.
Figure 5:
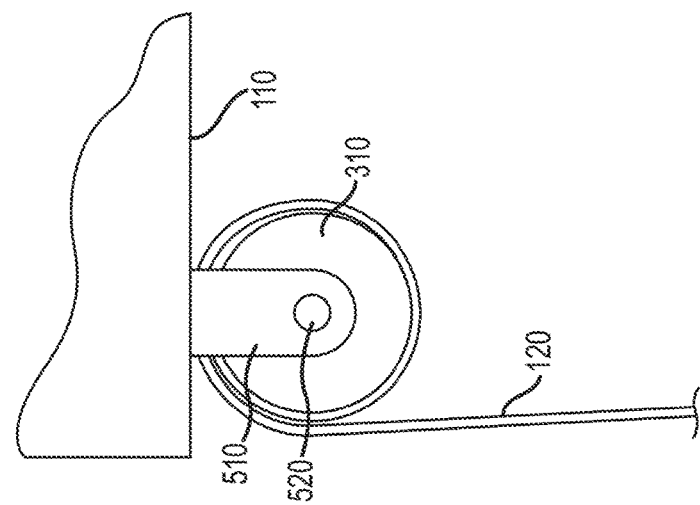
FIGS. 4 and 5 are partial rear and top views of the cargo body of FIG. 1 detailing the conical take-up roller.
Figure 4:
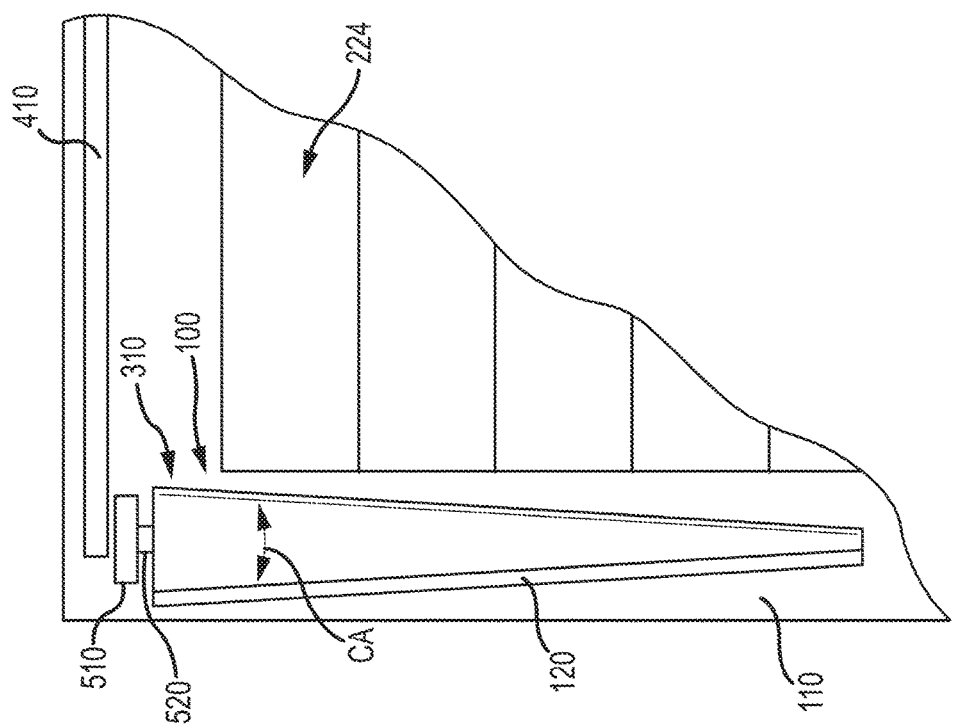
Figure 6:
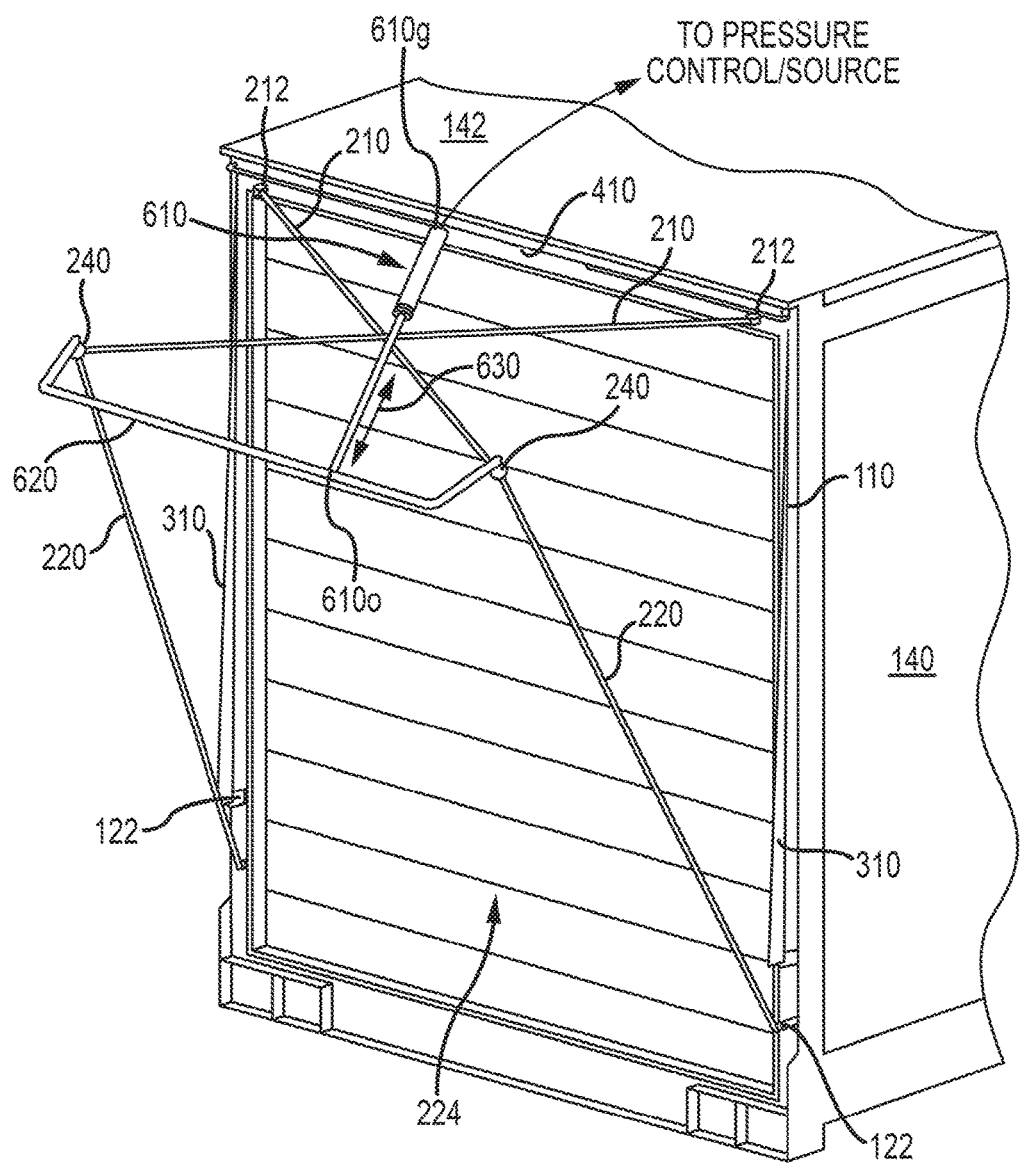
FIG. 6 is a rear perspective view of the cargo body of FIG. 1 with the rear aerodynamic device fabric side and top panels omitted to detail the rigid members in a deployed position and showing an actuator located between one of the top rigid members and the cargo body frame.

Reference is also made to FIGS. 3-5, which depict the exemplary retraction roller arrangement. The deployment of the device 100 is facilitated by rollers 310 and 410 mounted to the door frame 110 sides and top, respectively. The rollers 310, 410 and the associated housings may be called "take-up" areas. The top roller 410 can be cylindrical across its axial length (along the width-direction of the body) and is mounted across the top of the body rear frame 110. The side rollers are conical/frustoconical in shape (FIG. 4), defining a downward taper angle CA in shape so that when the device is retracted, the material, which may be fabric, wraps around its roller without bunching. More generally, the cross sectional shape of the roller allows for uniform wrapping of the panel as it swings in (rotates—double-curved arrow 330) along the side member 220 hinge axis 122 during retraction. The hinge axis 122 traverses the width of the trailer (curb-side to drive side). While shown as parallel to the width and perpendicular to the side, the axis may be oriented at other angles or have multiple degrees of freedom. In this case, swing or rotate means the top of the side member 220 move away (in a rearward direction) from the cargo body while the bottom of the side member 220 remains adjacent to the cargo body. While a conical side roller 310 is shown, the cross-section shape along its axial length is highly variable in alternate embodiments—for example, ovoid, etc. Appropriate brackets 510 can support the top and bottom end of the roller axle 520. The roller can be spring-loaded (in accordance with skill in the art) so that it normally applies a torque to roll-up the panel fabric. This rolling torque is overcome by an actuator 610 (FIG. 6) applied, for example between the frame 110 top edge 126 and top rigid member 210. In this embodiment the top rigid members 210 include a top panel extension cross piece 620 that depends from the arrangement 240 in a rearward direction. The actuator 610, which may be a compression spring, gas spring, piston, or the like is attached by a joint 610*j*, which may be a hinge, at one end to the top of the frame 110, and at an opposing end 610*o* to the cross piece 620. The actuator 610 could, in certain embodiments, couple to the top rigid members 210, the side rigid members 220, the arrangement 240, or the like. The exemplary actuator 610 is a linear piston actuator that extends and retracts (double arrow 630) based upon a motive force such as fluid (e.g. air or hydraulic) pressure from a source (e.g. pressure tank and/or pump). In an embodiment, the vehicle's pneumatic system can be routed through a user-switched (or automated) valve that applies actuation pressure when the vehicle is in motion and/or attains a certain speed, such as, for example, 35 miles per hour.

Below a certain vehicle speed, such as, for example, 35 miles per hour, or when stationary (or when a user switches a control), the actuator pressure is relieved and vented, causing the actuator to retract. The speed control aspect, as explained elsewhere, may be a hysteresis control loop where the deployment speed is higher than the retract speed. Also, the controller may be tied to a timing device to allow a predetermined time below (or above) the trigger speed to avoid cycling the device for intermittent stops or speed bursts. In alternate embodiments, a rotary actuator can be used to move the top members 210 or side members 220. Alternatively, one or more linear actuators can be applied between the frame and the side members 220 (such as actuator 710 in FIG. 7). The actuator can alternatively be powered by another motive force, such as a rotary or linear electric motor. A lead screw can be employed instead of a piston and can be driven electrically or by a rotary fluid motor. In retraction, the rollers 310, 410 evenly take up slack in the panel fabric as the actuator retracts, resulting in a compact, retracted arrangement that does not interfere with the operations of the vehicle. This is because the device 100 may be attached exclusively to the rear frame 100, and thus does not increase the cross sectional area of the cargo body, which would increase drag. Mounting on the rear frame 110 also reduces the likelihood of damage to the device from contact with other adjacent vehicles or structures as the vehicle cargo body is moving or parked in a yard. Such bodies are often scraped on the sides in these situations and mounting on the rear only eliminates this exposure. The rear frame 110 of the exemplary cargo body has additional benefits of being fairly consistent across different body OEMs, and thus the device 100 can be designed to be adaptable or adjustable to fit all or virtually all configurations of cargo body. Advantageously, the device 100 mounts to the rear frame 110 at multiple points to ensure design redundancy for failure or damage.

The combination of spring biasing within the rollers and the pressure applied by the actuators during deployment cause the panels to assume a relatively rigid geometry that avoids flapping within the slipstream during motion. The actuators can include limiters (either mechanical in the form of springs/dampers and/or electronic in the form of strain gauges and controllers) that detect maximum force so as to prevent over-stressing of the panels during deployment.

A variety of automation and biasing options exist for the linkages between rigid members according to this and other embodiments herein. Such mechanisms include, but are not limited to, motorized fabric rollers (directly or through gears, belts, chains, cables), and actuators. Such automation of the device allows it to be used without driver input, and ensures that the device is deployed for maximum fuel savings. Deployment/Retraction of the device can be performed through automated means of slow speed or collision detection, or through driver activation (remote control). The device rollers can be passively biased wrapped up via sprung fabric rollers (torsion springs or constant force springs) or through using a hanging mass. The rotating members may be biased open or closed by using springs (extension, compression, torsion) or gas springs.

Illustratively, lights can be added to the device or moved to a different position in order to ensure any requirements under applicable government safety laws regulations are met. Device component positions can be adjusted independently during installation in order to avoid existing lights, rivets, guards, or other cargo body features or add-ons. The panel installation positions can also be adjusted based on body configuration or aerodynamic benefit. The panels can be made flush with body sides or top for the least-severe (most-streamlined) transition from body to device.

With reference again to FIG. 2, the top panel extension cross piece 620 is oriented rearwardly at a greater distance from the rear frame 110 than the length of the top edge 128 of the side panels 120 and their associated side rigid members 220. Thus when deployed, the top panel 130 exhibits a further rearward profile and when retracted a small extension of the top panel remains exposed, forming a flared surface 620s proximal the top edge 126 of the cargo body. Additionally, the side members 120 and attached side panel material can be covered with a channel-shaped cover 260 of durable material—e.g. a durable polymer such as ABS, polycarbonate or acrylic, to protect the material against scrapes and tears when it contacts loading docks and other surfaces during operation. The legs of the channel (C-shape) should be flexible with respect to the base of the channel (C-shape) such that the channel-shaped cover 260 forms a friction fitting over the panel material and side members 120. Such a channel-shaped cover 260 is optional and potentially not necessary for devices 100 using composite panel material.

Figure 7:
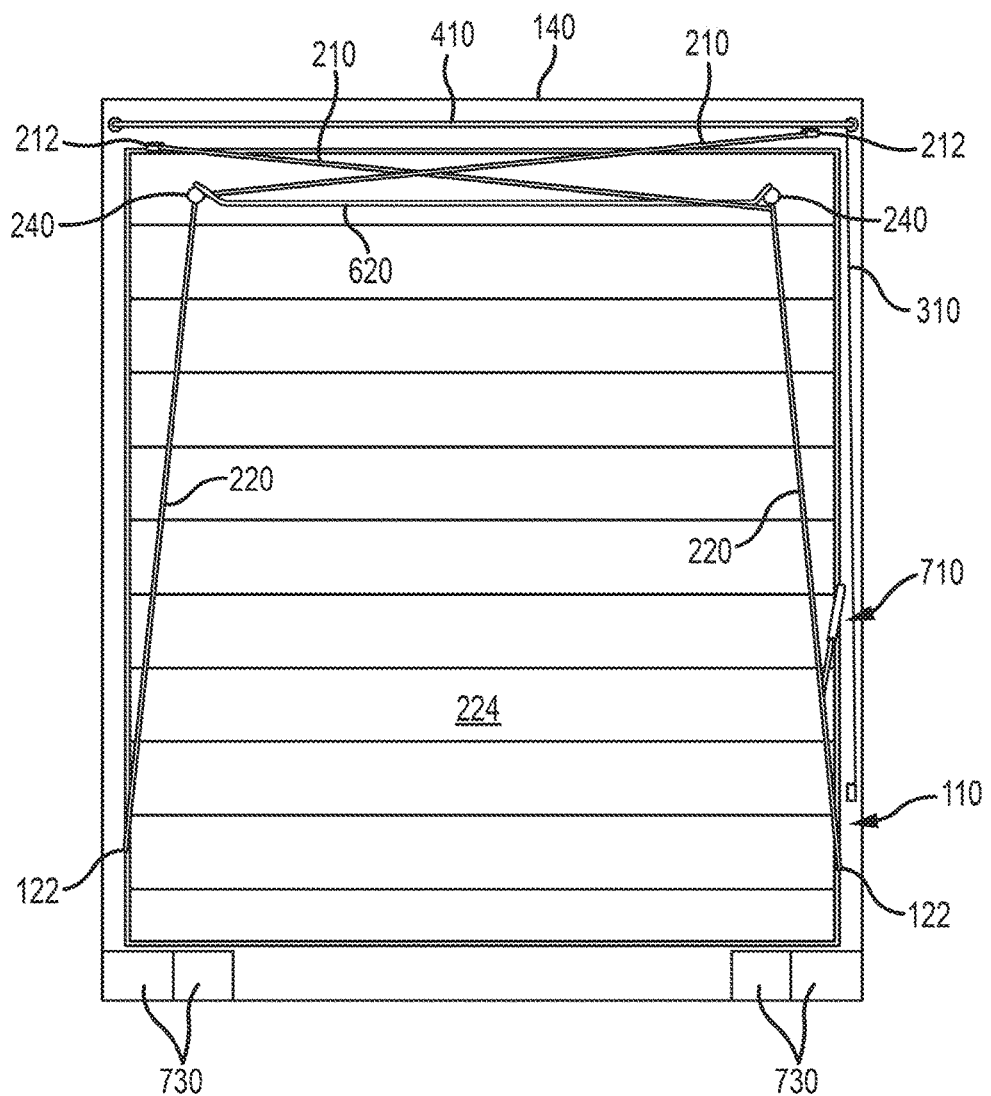
FIG. 7 is a rear view of the cargo body of FIG. 1 with the rear aerodynamic device fabric side and top panels omitted to detail the rigid members in a deployed position.
Figure 8:
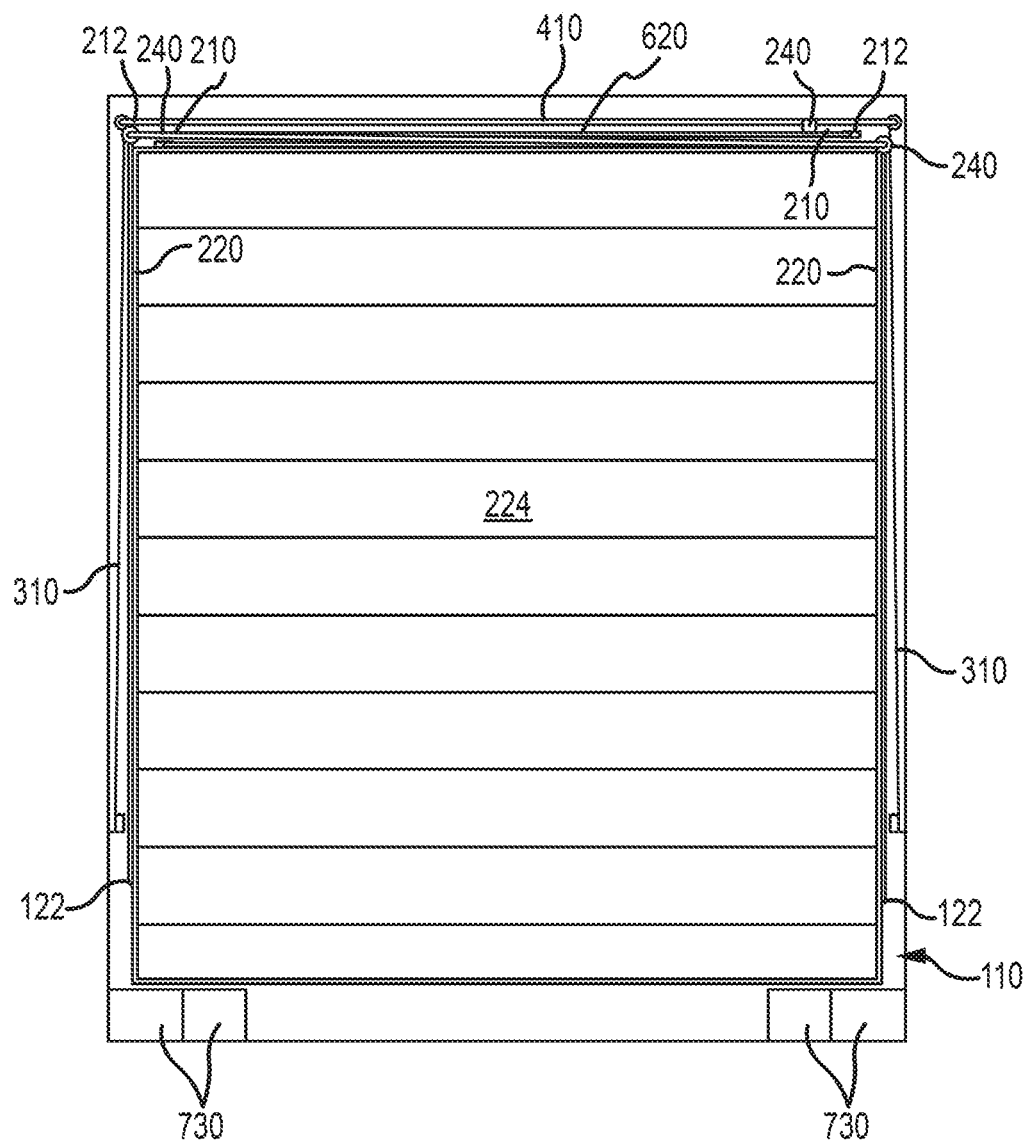
FIG. 8 is a rear view of the cargo body of FIG. 1 with the rear aerodynamic device fabric side and top panels omitted to detail the rigid members in a retracted position.

With reference to FIGS. 7 and 8, a rear view of the cargo body frame 110 and door 224 is shown with the top fairing and side fairing panels 120, 130 removed to reveal the top and side members 210, 220 as well as the cross piece 620 of the flared surface 620 or top panel extension. The side and top rollers 310, 410 are also shown. Notably, this embodiment provides a linear actuator 710 between the frame 110 and at least one side rigid member 220 rather than the linear actuator 610 coupled to the top edge 126 of the frame 110 and the cross piece 620. Applying an actuator between any for the top or side members 210, 220 and the frame can enable deployment and retraction of the entire assembly as it is arranged as a modified "pantograph". Likewise, an actuator can be positioned between two rigid members in certain alternate embodiments. While generally described above and below as actuators that move the frame from a retracted position to a deployed position, one of ordinary skill in the art will recognize on reading the disclosure that the actuators may operate in reverse such that the actuator moves the frame from a deployed position to a retracted position. The pneumatic, hydraulic, and rotary screw actuators may cause both deployment and retraction of the device 100. Also, springs could be alternated between compression springs and tension springs to achieve the desired results.

Note also that the entire device resides above bumper mounted lighting 730 and other elements (e.g. license plates, registration tags, etc.) that normally reside on the frame bottom, allowing for full visibility of such features in compliance with applicable safety laws and regulations.

Figure 9:
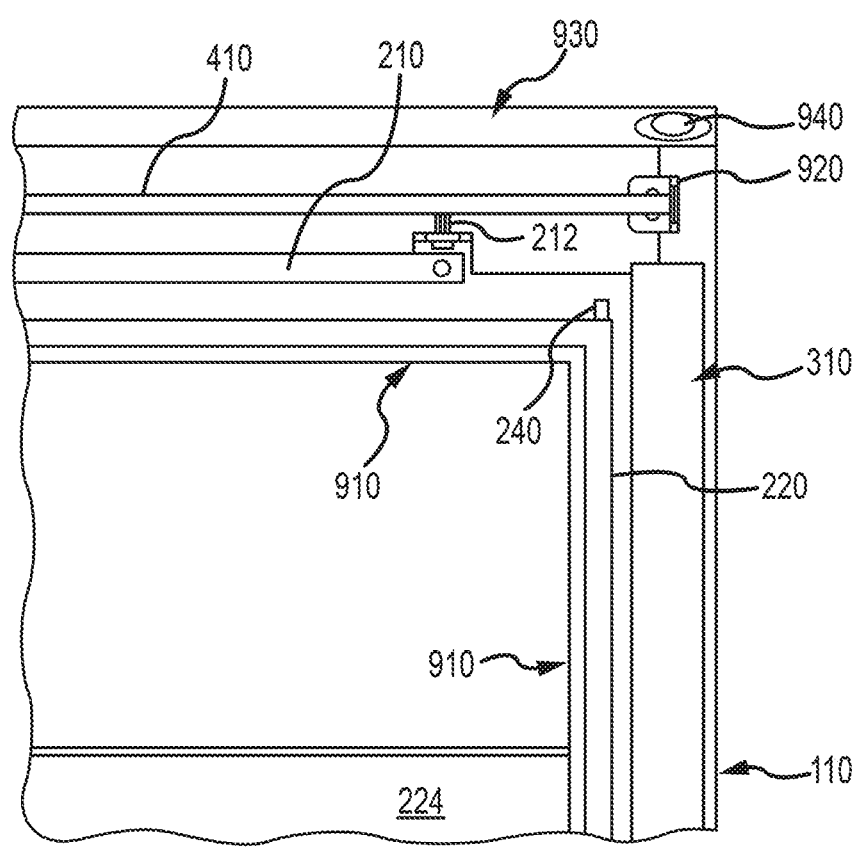
FIG. 9 is a partial rear view of the cargo body of FIG. 1 with the rigid members shown in a retracted position and with the device fabric side and top panels omitted and showing the conical take-up roller.

As shown in FIG. 9, the retracted top and side members 210, 220 clear the edge 910 of the door 224 on the top and sides. This allows for ease of operation during loading and unloading of the cargo body. Note also the positioning of the support bracket 920 (see also bracket 510 of FIG. 5) for the top panel roller 410 on the top of the frame 110. The support bracket 920 is positioned below the top edge 930 of the frame 110 allowing visibility for required lighting 940 and other required safety elements (e.g. reflective strips, etc.). In alternate embodiments, portions of the fabric can be transparent or translucent where it can cover lighting and optically visible features. Additionally, the bracket 920 (or 510) may be formed of a translucent plastic to allow for safety lighting to be visible.

Figure 10:
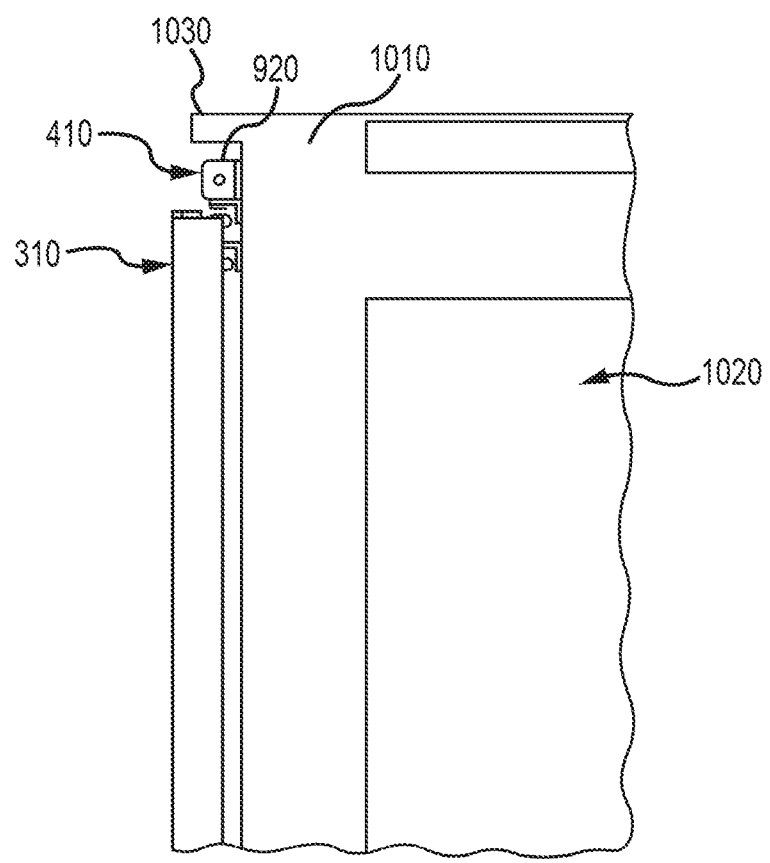
FIG. 10 is a partial side view of the cargo body of FIG. 1 showing the conical take-up roller and the top rigid member in a retracted position.

As shown in the alternate embodiment of FIG. 10, the frame 1010 (or 110 as described previously) of the cargo body 1020 can be modified to include a guard 1030 (e.g. along the top edge 126) that protrudes rearwardly and thereby protects the rollers 310, 410 and associated rigid members from compression that can occur when contacting a loading bay or other fixed structure. Although not shown, a similar guard 1030 may protrude from the vertically extending side edges of the frame 1010 (or 110).

Figure 11:
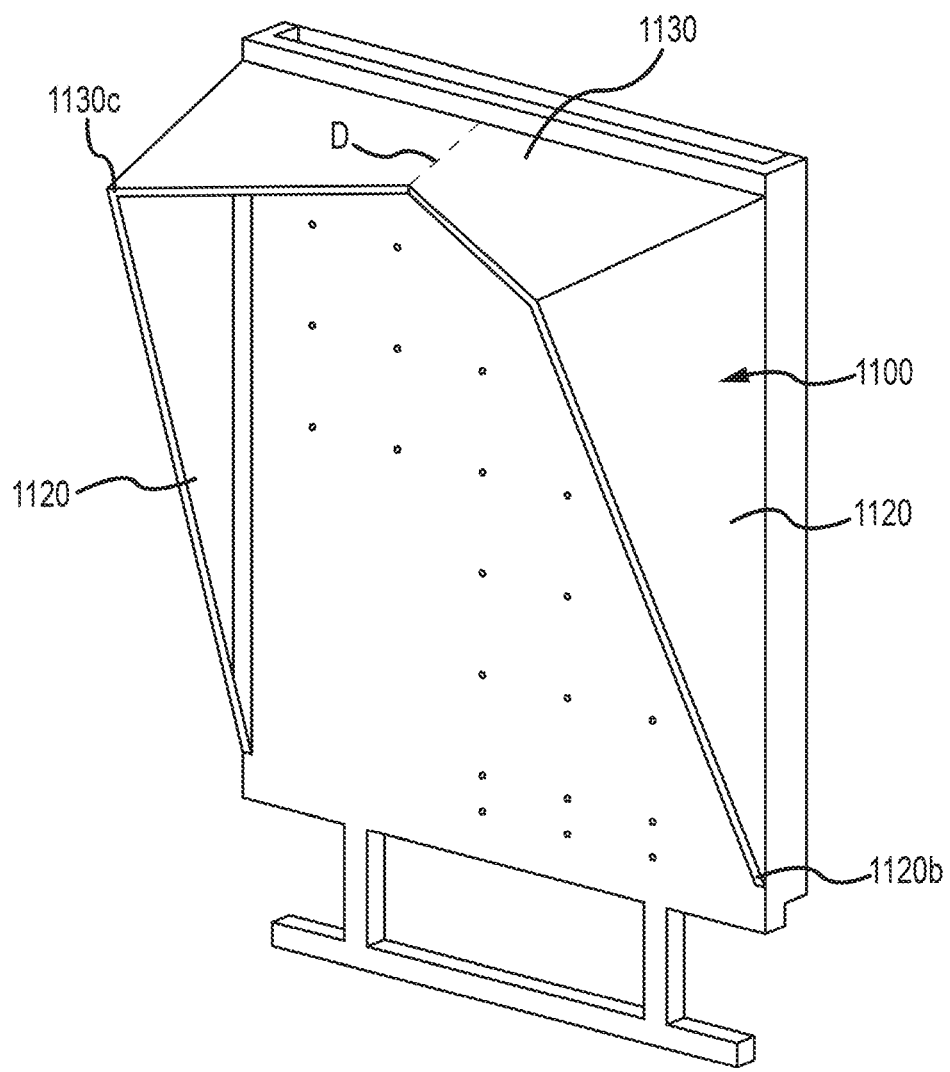
FIG. 11 is a rear perspective view of a cargo body door frame according to an illustrative embodiment in which a portion of the top fabric panel is omitted and the rear edge conforms to the shape of the top rigid members in a deployed position.

The shape of panels is variable. As shown in the example of FIG. 11, the deployed device 1100 includes triangular side panels 1120 as described above and the top panel 1130 omits the cross piece (620 FIG. 2) forming mirror image trapezoidal shapes as shown by the dividing line D (for illustration purposes only). The rearmost corner 1130*c* of the top panel 1130 are attached directly to the outer sections of the two top members 210 (FIG. 2). Illustratively, the smaller top panel design reduces material used and the number of moving parts, while only slightly reducing aerodynamic performance at highway speeds. The side panels 1120 also may be formed in more of a trapezoidal shape or even rectangular in certain embodiments where the bottoms 1120*b* of the side panels 1120 are moved away from the rear frame 110 of the cargo body. The roller 310 may be required to be configured or oriented to account for the shape.

Figure 12:
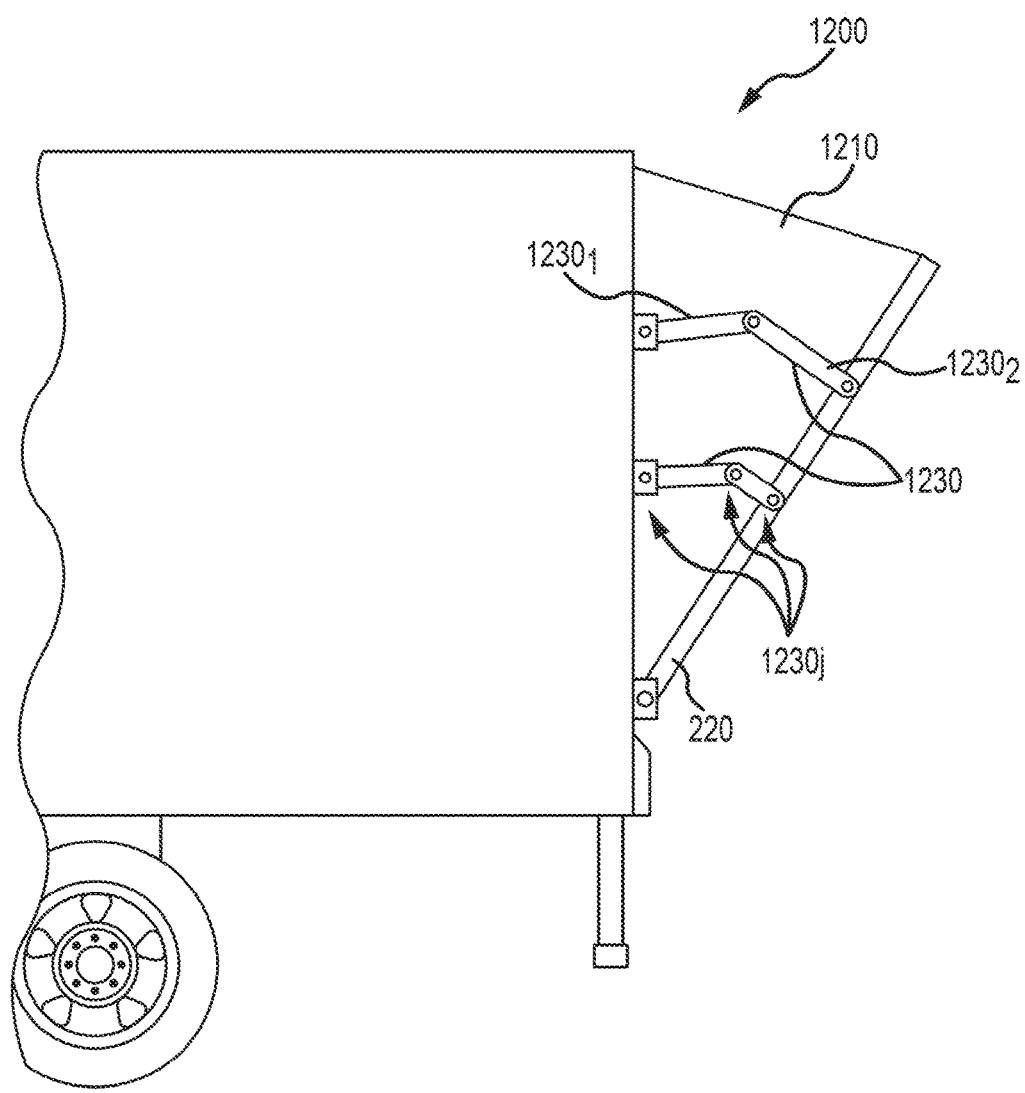
FIG. 12 is a partial side view of a cargo body with rear aerodynamic device in a deployed position, and with a side fabric panel enclosed by linked members according to an illustrative embodiment.
Figure 13:
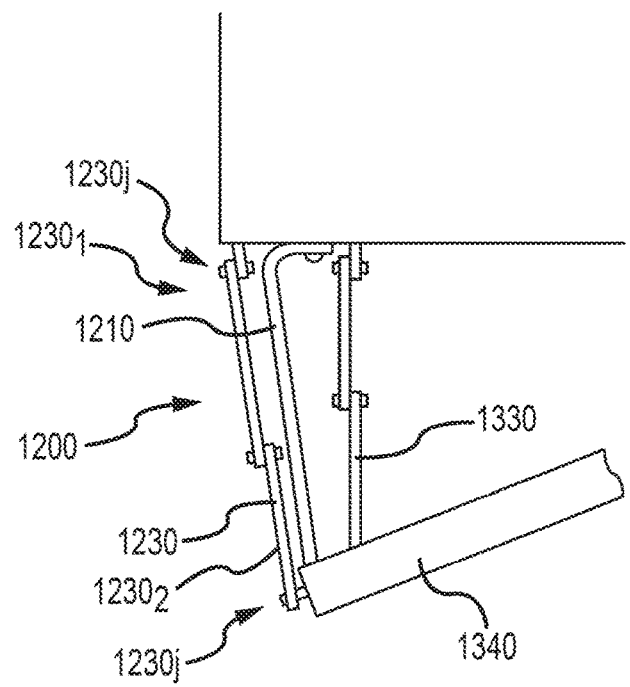
FIG. 13 is a partial top view of the cargo body and rear aerodynamic device of FIG. 12 in a deployed position.
Figure 14:
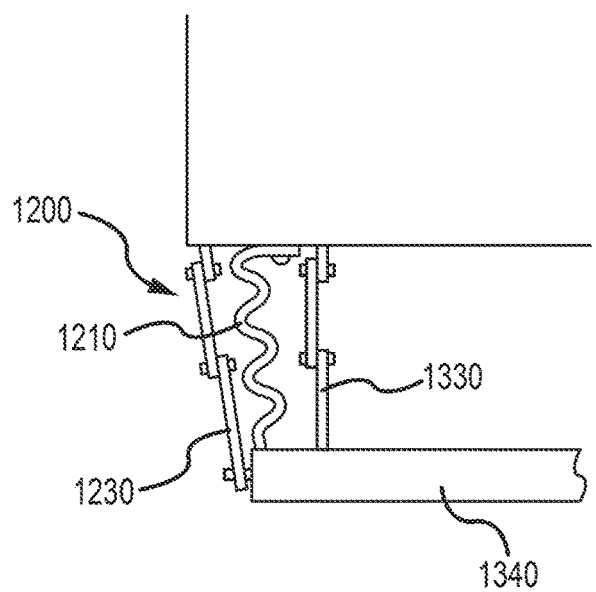
FIG. 14 is a partial top view of the cargo body and rear aerodynamic device of FIG. 12 in a retracted position in which the side fabric panel is gathered between the linked members.

FIGS. 12-14 detail a device 1200 employing panels 1210, which may be constructed of fabric or other flexible composite materials, that are sandwiched between link members 1230 and 1330 that extend between a deployed position (as shown in FIGS. 12 and 13) and a retracted position (FIG. 14) based on the motion of the rigid top member 1340. The rigid top member 1340 is similar to the top rigid rotating members 210 described above, and not re-described here. The second rigid top member has been removed from FIGS. 13 and 14 for clarity. Notice, the link members 1230 and 1330 do not couple directly to the rigid top member 1340, but rather they couple to the rigid side member 220.

In the retracted position, the side panels fold or bunch as shown in FIG. 14, and are retained between the linked members in the form of a "cage". The top panel (not shown in FIG. 12-14, but as described above top fairing panel 130) can be rolled or folded as appropriate in a manner described above. Providing internal and external link members 1230 and 1330 provides some resistance to buckling or flapping of the panels, especially in the collapsed configuration shown in FIG. 14, which could interfere with operation of the door. However, device 1200 may be constructed using a single link member 1230 or 1330.

The link member 1230 are shown as formed by a first member 1230₁ coupled at a first end via a joint 1230*j* (such as the joints 212 or arrangements 240 above) to the rear frame 110, for example, and coupled at a second end via a joint 1230*j* to a first end of a second member 1230₂. The second end of the second member 1230₂ is coupled via a joint 1230*j* to a side member 220, which is attached as described above. The link member 1330 may be constructed similar to link member 1230.

Figure 15:
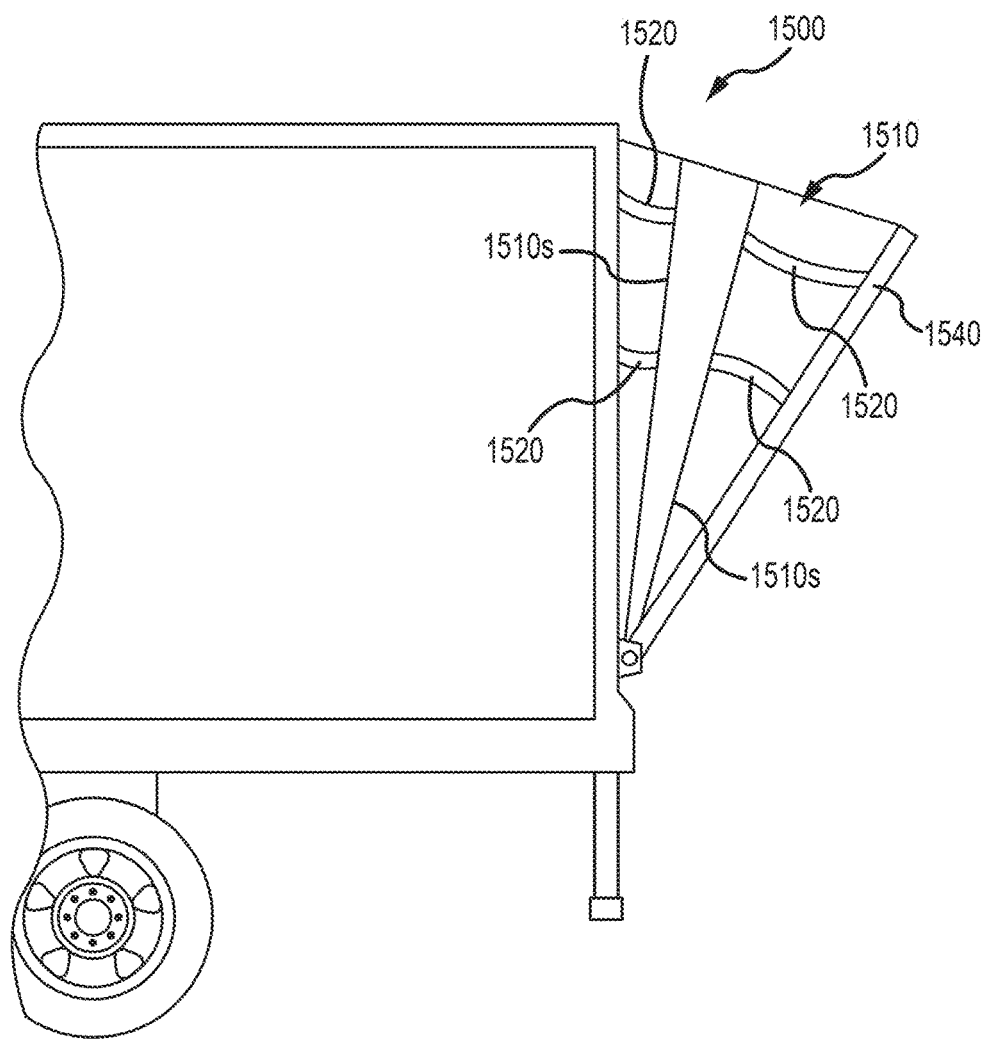
FIG. 15 is a partial side view of a cargo body with rear aerodynamic device in a deployed position, and with a side fabric panel threaded through a cable according to an illustrative embodiment.
Figure 16:
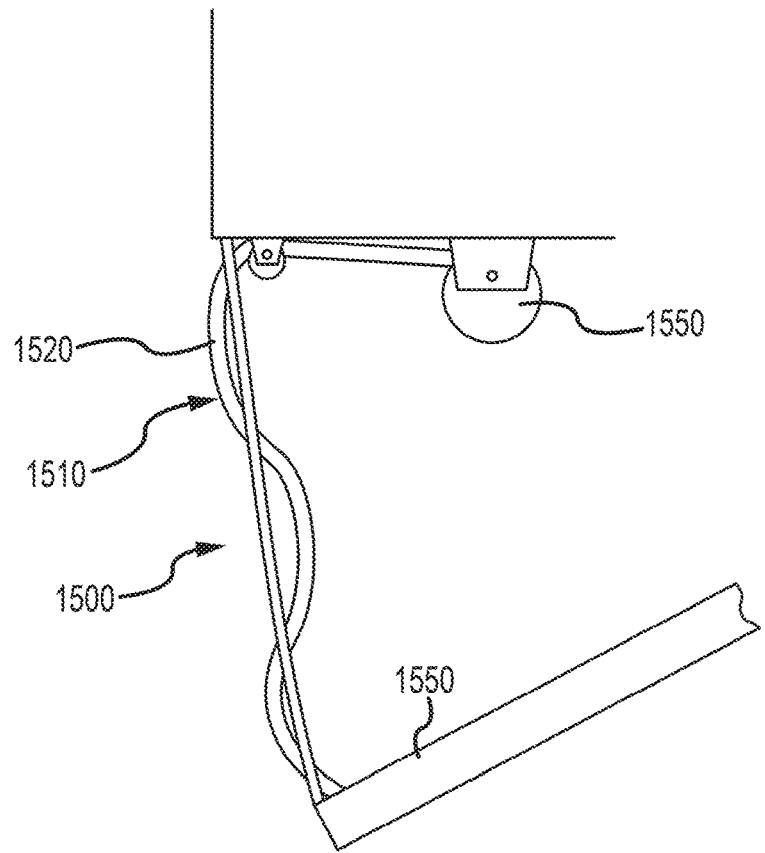
FIG. 16 is a partial top view of the cargo body and rear aerodynamic device of FIG. 15 in a deployed position.
Figure 17:
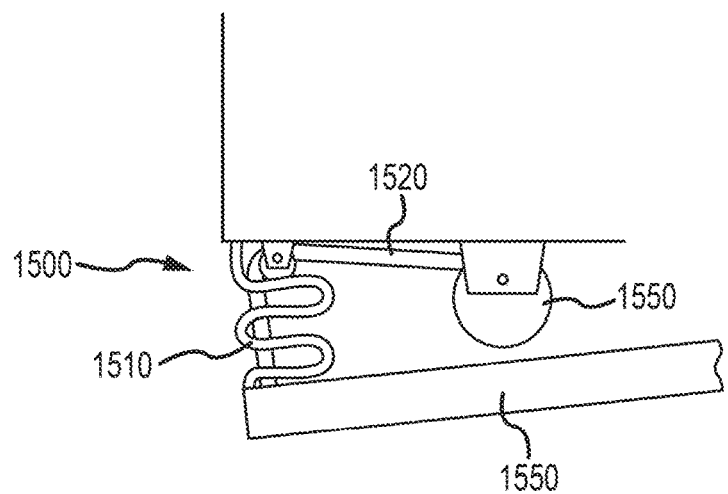
FIG. 17 is a partial top view of the cargo body and rear aerodynamic device of FIG. 15 in a retracted position in which the side fabric panel is gathered along the cable in the manner of an accordion fold.

FIGS. 15-17 show another embodiment of a device 1500. Device 1500 includes side panels 1510, which may be fabric or a composite to allow collapsing. Cables 1520 are threaded through slot 1510*s* in the side panels 1510 such that the cables can be pulled in one or the other direction to open and close the side panels 1510 in an accordion manner as shown best in FIGS. 16 and 17. Appropriate grommets, gussets, or other reinforcements, can be used to reinforce the slots 1510*s* or threading holes in the panels 1510 through which cables 1520 pass. The cables are coupled to the side rigid member 1540, which is similar to the rigid side member 220 above. The side rigid member 1540 is coupled to a top rigid member 1550, which is similar to the top rigid rotating members 210 described above.

The panel 1510 is deployed (FIGS. 15 and 16) or retracted (FIG. 17) based upon a powered or spring-biased reel 1550, which normally draws the cable in, and the biasing force of which is overcome by a (e.g. powered linear) actuator (not shown) acting upon one or more of the rigid members 1540, 1550. The top panel (not shown) can be rolled or folded as appropriate in a manner described above. In alternative embodiments, the cable may be rigidly anchored to the rear frame 110 of the cargo body and other actuators, as described herein throughout, may be used to extend and retract the panels 1510. The top fairing panel is not shown in FIGS. 15-17 for convenience, but would be similar to top fairing panel 130 or other top panels described herein.

Figure 18:
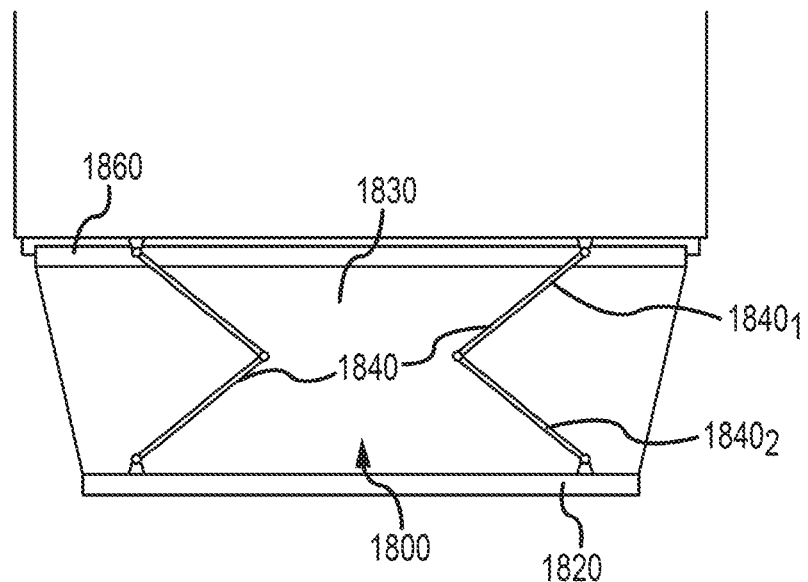
FIG. 18 is a partial top view of a cargo body and rear aerodynamic device with scissor-style folding rigid members in a deployed position according to an illustrative embodiment.
Figure 19:
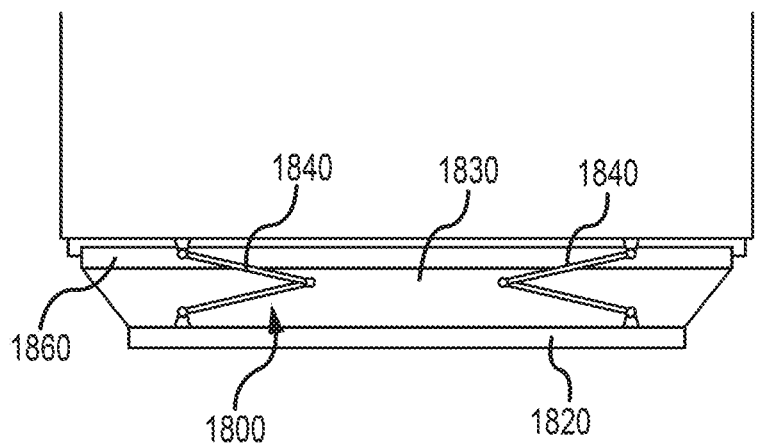
FIG. 19 is a partial top view of the cargo body and rear aerodynamic device of FIG. 18 with the rigid members folded in a retracted position.

FIGS. 18 and 19 show a device 1800 according to another alternate embodiment in which the top fairing panel 1830 moves between a deployed position (FIG. 18) and a retracted position (FIG. 19). The top fairing panel 1830, similar to the above embodiments, may be made from a fabric, plastic, composite, or the like. The top fairing panel 1830 is supported by link members 1840. Link members 1840 comprise a first link member 1840₁ and a second link member 1840₂. A first end of the first link member 1840₁ is coupled to the rear frame 110 and the second end of the first link member 1840₁ is coupled to the first end of the second link member 1840₂. The second end of the link member 1840₂ is coupled to a cross piece 1820, which may be similar to cross piece 620 described above and provide a flanged surface 620*s*. The link members 1840 open and close based upon the motion of scissor the first and second members 1840₁,₂ (each with a central pivot and pivots at each end) that extend between the frame 1810 and a cross piece 1820. The joints are similar to joints described throughout the application. In certain aspects the joints may be constrained to inhibit movement out of the shown planar orientation. In certain embodiments, the top fairing panel 1830 rolls on a biased roller 1860 as described above (similar to roller 410). A similar scissors arrangement or a hinged side rigid member arrangement (e.g. members 220) can be employed for the side panels in this embodiment (not shown). Using the scissor arrangement, the side fairing panels 120 may be rectangular in shape by employing a top and bottom link member 1840 similar to the left and right link member 1840 as shown in FIGS. 18 and 19.

Figure 20:
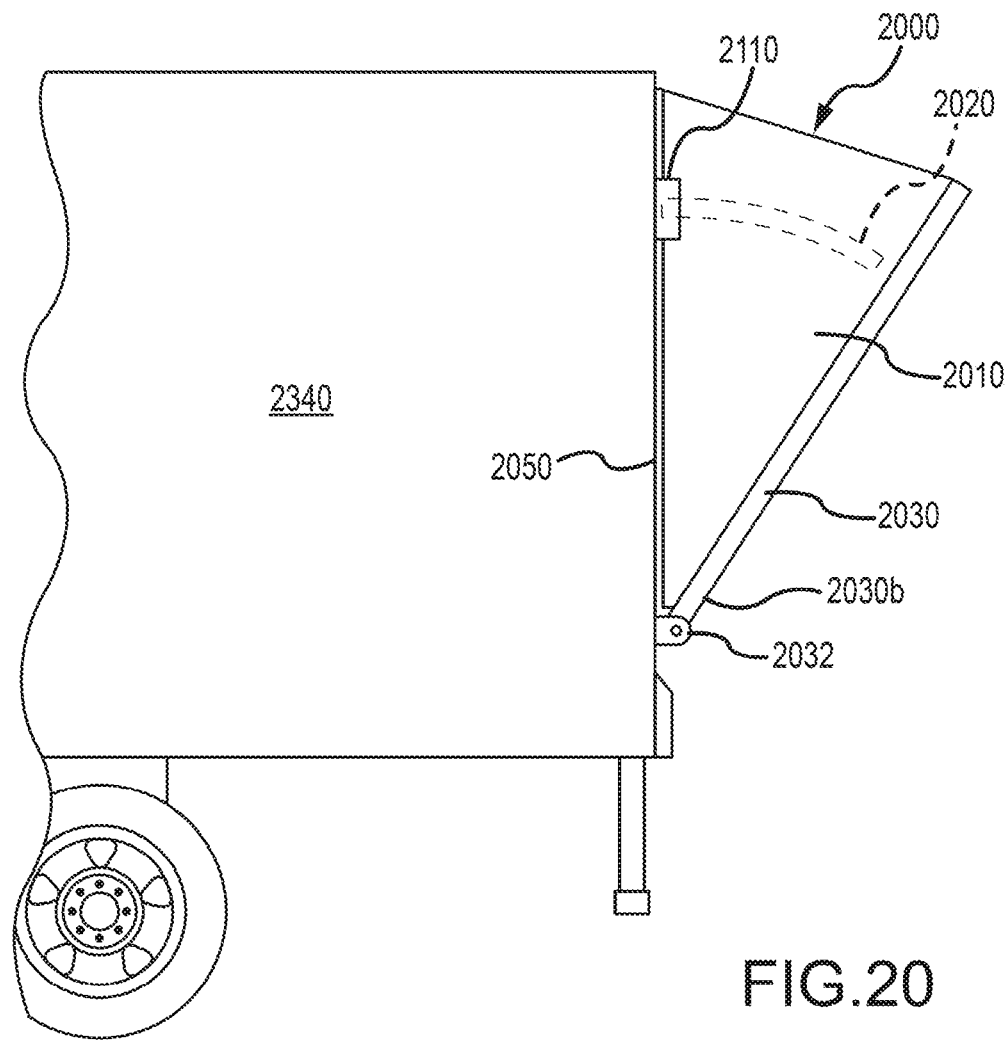
FIG. 20 is a partial side view of a cargo body with rear aerodynamic device in a deployed position, and with a rigid, semi-rigid or flexible side panel that rides along an arcuate track located on a side of the cargo body in a deployed position according to an illustrative embodiment.
Figure 21:
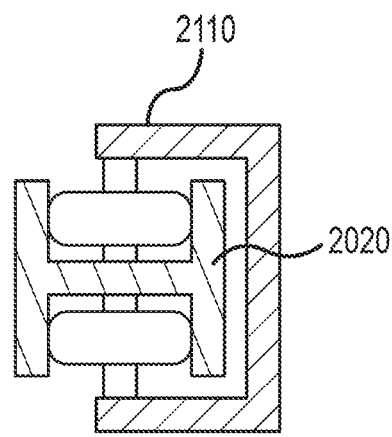
FIG. 21 is a cross section of the track and panel roller assembly for the rear aerodynamic device of FIG. 20.
Figure 22:
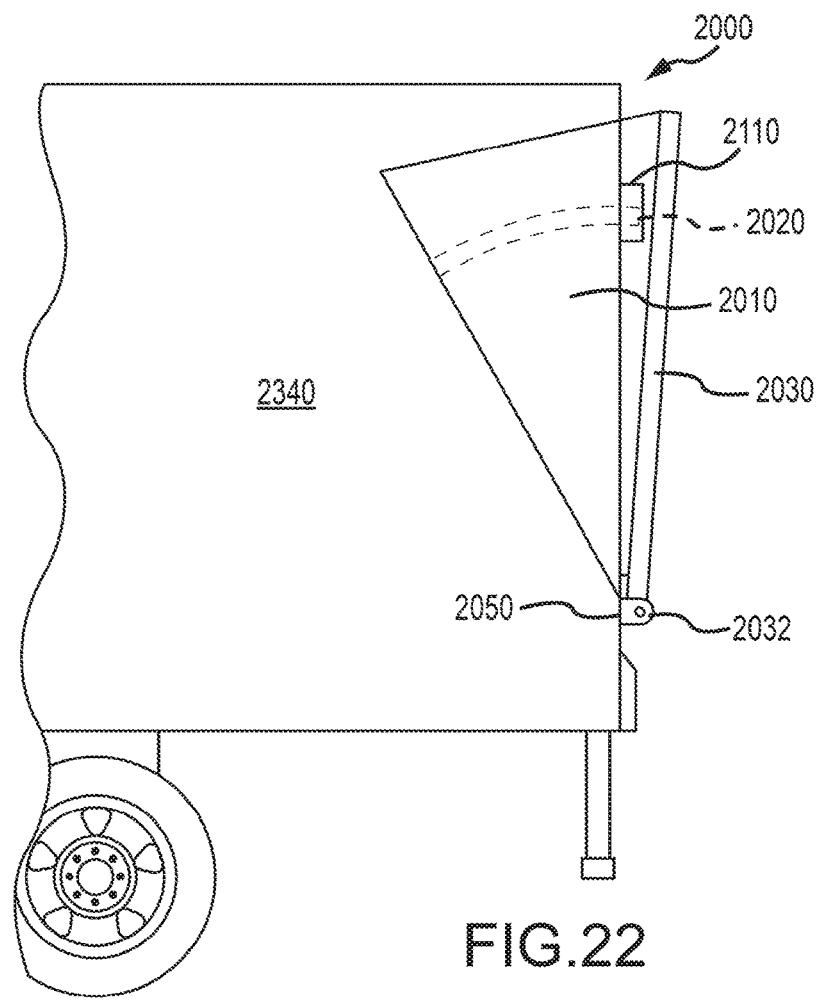
FIG. 22 is a partial side view of the cargo body with rear aerodynamic device if FIG. 20 in a retracted position, and with the rigid, semi-rigid or flexible side panel located along the side of the cargo body.
Figure 23:
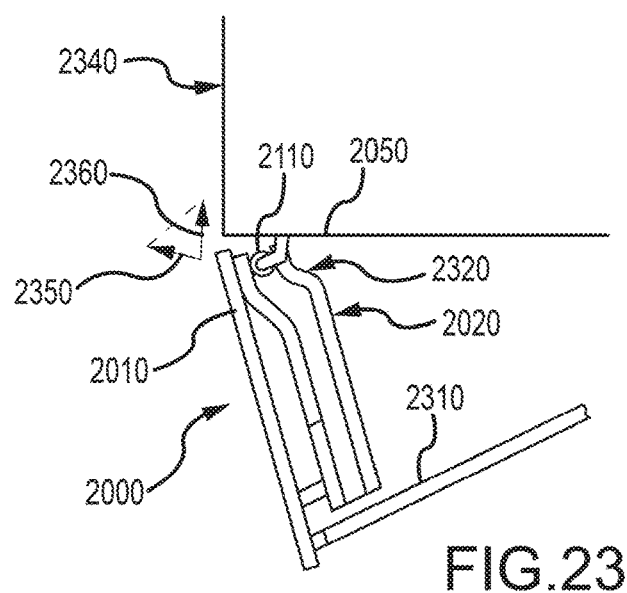
FIG. 23 is a partial top view of the cargo body and rear aerodynamic device of FIG. 20 in a deployed position showing a step in the track to facilitate movement of the rigid, semi-rigid or flexible panel around the corner of the body rear frame.

FIGS. 20-23 show a device 2000 that can employ a rigid or semi-rigid side panel 2010 having a triangular shape as described above. In other words, the device 2000 may employ any of the fabric or flexible composite material described above as well as other more rigid composite materials. The side panel 2010 is mounted on a curved (arcuate) track 2020 that faces the interior of the cavity formed when deployed (FIG. 20). The track may ride on a roller set 2110 (FIG. 21). Alternatively, the track may be made of a lubricous material or mounted on bearings. A bottom part 2030*b* of a side rigid member 2030 is mounted on a joint 2032, which may be a hinge, ball and socket, or the like at the bottom of the frame 2050. The joint 2032 forms a rotation axis for the side rigid member 2030 and allows the panel 2010 to move along the arcuate path defined by the track between the deployed position (FIG. 20) and the retracted position (FIG. 22). As best shown in FIG. 23, a top rigid member 2310 is interconnected between the side rigid member 2030 and the frame 2050, similar to the top rigid rotating members 210 described above, to maintain lateral stability of the device 2000 when deployed and provide a location for an actuator that allows deployment and retraction of the side panel 2010. In certain embodiments, an actuator may be coupled between the frame 2050 and the side rigid member 2030 or the top rigid member 2310. Notably, the track 2020 includes a step 2320 (FIG. 23) that allows the side panel 2010 to move outwardly (arrow 2350) to a position along the side 2340 of the cargo body as it moves rearwardly (arrow 2060) into the retracted position (as shown in FIG. 22). The shape of the track and roller assemblies are variable in alternate embodiments and rollers can be replaced by low-friction journals or blocks in various embodiments. The top fairing panel (not shown but similar to top fairing panel 130) can be flexible and rolled or folded between a deployed and retracted position as described above and below. Note that any rigid or semi-rigid panel described according to an embodiments herein can be constructed form a variety of polymers and/or composites—e.g. a fiberglass or carbon fiber sheet, a plastic sheet and/or a lightweight metal, such as thin-gauge steel or aluminum sheet. Such materials should be clear to those of skill.

Figure 24:
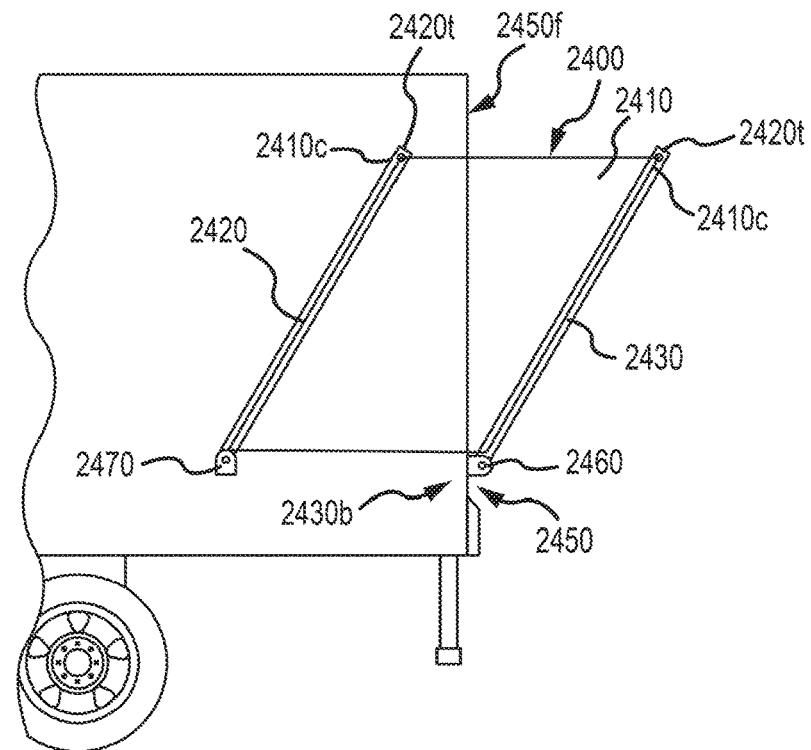
FIG. 24 is a partial side view of a cargo body with rear aerodynamic device in a deployed position, and with a rigid, semi-rigid or flexible side panel that is supported along a side of the cargo body using support members/bars that define a pivoting four-bar linkage in a deployed position.
Figure 25:
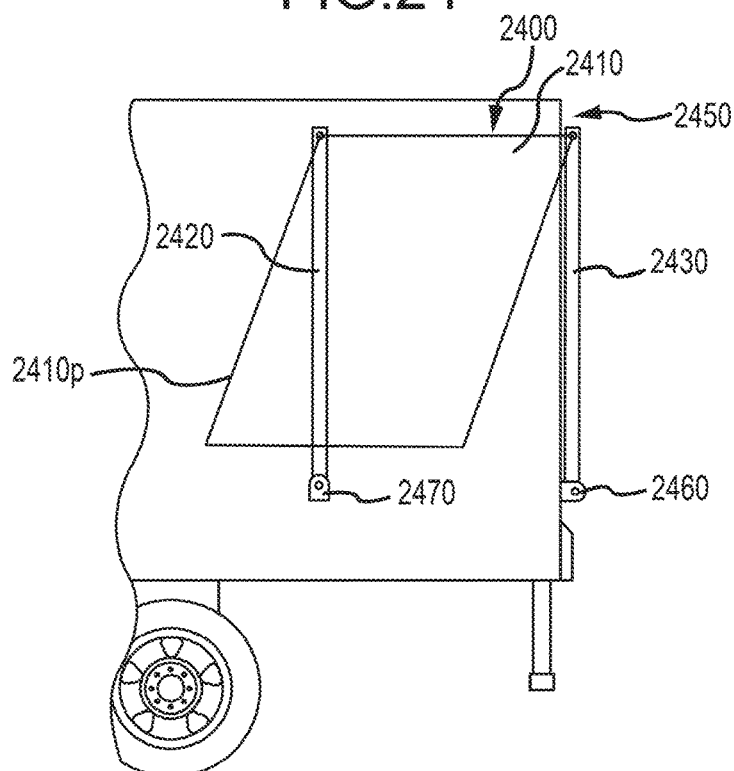
FIG. 25 is a partial side view of the cargo body and rear aerodynamic device of FIG. 24 in a retracted position.

FIGS. 24 and 25 show another embodiment of a device 2400 in which the side panel 2410 may be rigid or semi-rigid, or a fabric as desired. The side panel 2410 defines a parallelogram 2410*p* perimeter and is pivotally mounted adjacent to each top corner 2410*c* to the tops 2420*t*, 2430*t* of a pair of swinging bar members 2420 and 2430. The rear bar member 2430 is mounted at a joint 2460 near the bottom 2430*b* of the rear face 2450 of the frame 2450. The front bar member 2420 is mounted to a joint 2470 located at the bottom 2420*b* of the side of the cargo body. While not shown, a top rigid member is provided for lateral stability and to define an inward taper in the side panel 2410 when deployed (FIG. 24). The top rigid member may be similar to the top rigid rotating members 210 described above. When retracted, the panel 2410 resides against the side of the cargo body (FIG. 25) as shown. The bottom portion of the panel 2410 may be coupled directly to the joints 2470 and 2460, but may require an elongated slot (and the slot may be curved) to accommodate the shape of the panel 2410. The bar members define a four-bar linkage that serve as the front and rear edges of the panel during deployment as shown. If the panel 2410 is not coupled at the bottom (as shown), the rear bar member 2430 may form a ledge or channel to support the panel in the deployed position. Various fairings, seals and/or brushes can allow the front edge of the panel and associated bar member 2420 to define an aerodynamic seal against the cargo body when deployed. Deployment and retraction can be controlled by gas springs, rotary spring devices, and/or other mechanisms that normally bias the bar members (e.g.) into a retracted position and that are overcome by a (e.g.) deployment actuator mounted, for example, between the frame 2450 and the rear bar member 2430 or the top rigid member (not shown). The top panel (not shown) can be flexible and rolled or folded between a deployed and retracted position as described above.

Figure 26:
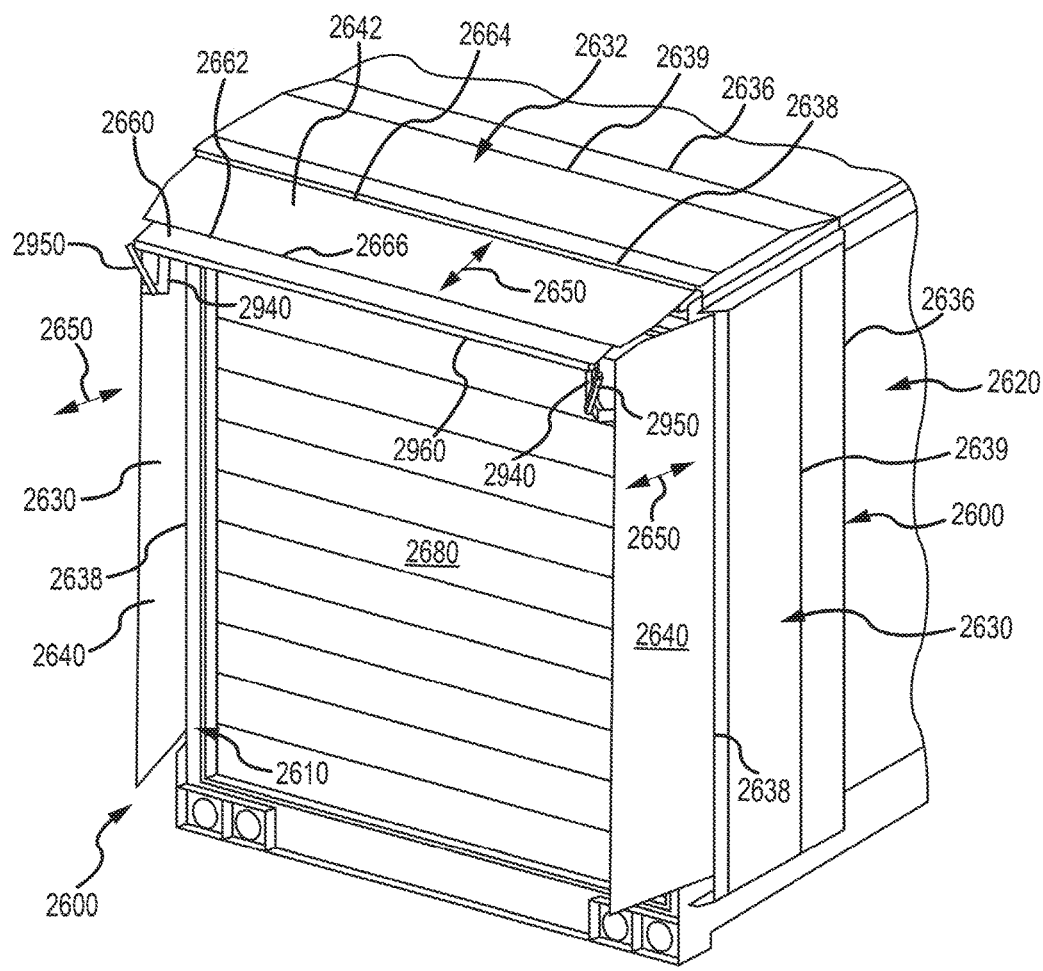
FIG. 26 is a rear perspective view of an exemplary cargo body (e.g. a truck trailer) with a rear aerodynamic device having three sides (side and top panels) in a deployed position, according to an illustrative embodiment.

According to various illustrative embodiments, and with reference generally to FIGS. 26-33, a three-sided device 2600 for mounting to the rear door frame 2610 of a cargo body 2620 is shown. The device 2600 includes side panels 2640 and top panel 2642 that are deployed rearwards (as shown in FIG. 26) from a retracted (stowed—described below) position under a respective aerodynamic cover 2630, 2632(sometimes nacelle or housing) along each side and the top of the cargo body 2620. Each nacelle 2630, 2632 defines a shape that slopes/curves outward from the body surface at the leading edge 2636, flattens or peaks, and tapers inward at the trailing edge 2638 to enhance the overall aerodynamic profile of the arrangement. The nacelles, which house the panels, may be called a "take-up" area for the side and/or top panels. The apex 2639 of each nacelle 2630, 2632 is forward of the end of the body so that the airflow from a moving body is directed inwards earlier (more-forward) than it normally would absent the nacelle 2630, 2632. This earlier (more-forward) airflow transition point, improves the drag reduction performance of the device 2600. Preferably, the nacelle trailing edge 2639 does not extend past the rear most surface of the body/rear frame 2610. The trailing edge of the nacelle 2630, 2632 may or may not contact the side and top panels 2640, 2642 in order to make a consistent aerodynamic surface. Note also that the width of the top nacelle 2632 overlaps the tops of the side nacelles to ensure a sufficient overlap between the confronting edges of panels 2640,2642—as described further below. A seal can be used to make a consistent/continuous aerodynamic shape from the nacelle to the deployed panel. The panels 2640, 2642 and nacelles 2630, 2632 overlap so that the panels are prevented from binding/jamming in/on the nacelles during retraction.

Figure 27:
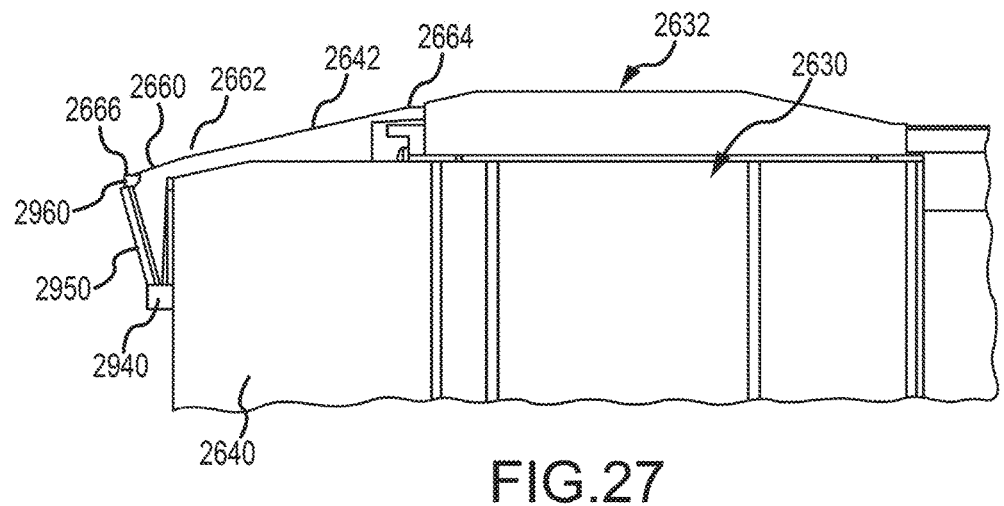
FIG. 27 is a partial side view of the cargo body and rear aerodynamic device of FIG. 26 showing the top panel and top nacelle.
Figure 28:
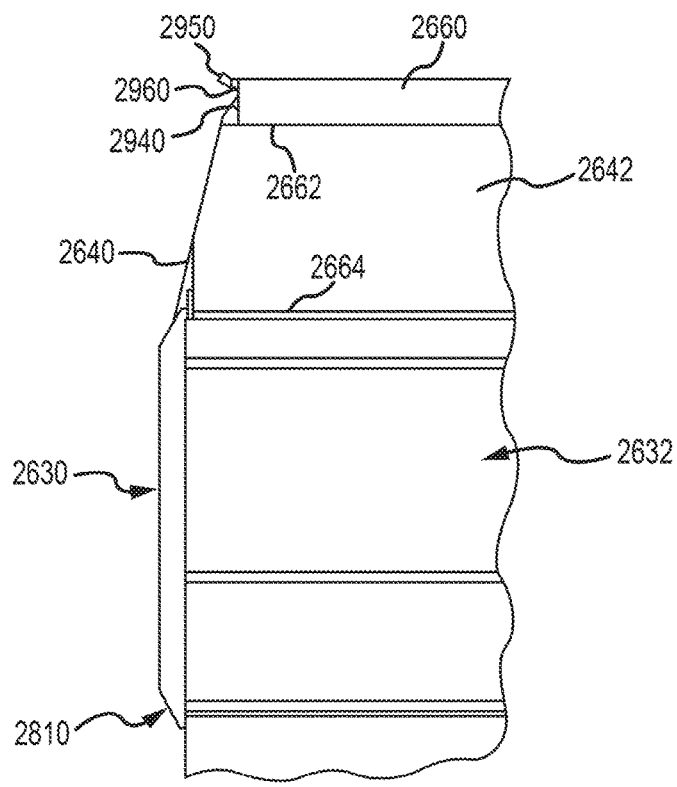
FIG. 28 is a partial top view of the cargo body and rear aerodynamic device of FIG. 26 showing the top panel, top nacelle, side panel and side nacelle.

Reference is also made to FIGS. 27-28, which show the deployed device 2600 in partial side view and top view respectively. Each nacelle 2630, 2632 acts as a protective cover against other vehicles, tree branches, other debris, or the like that can engage the panels during use of the vehicle. Generally, the nacelles 2630 and 2632 have a length, width, and thickness (or depth) sufficient to house the associated panels 2640 and 2642 along with any additional equipment, such as, actuators, rollers, tracks, or the like. As shown by the double arrows 2650 in FIG. 26, the panels 2640, 2642 retract and deploy into/from the nacelles 2630, 2632. Optionally, guards 2810 or rub rails (which can be mounted on the roof as well) are located at one or more heights along the side of the cargo body and protrude beyond the nacelle 2630 to protect the device from catastrophic damage due to contact with another vehicle, body, pole, or structure. These guards direct the load into the body hard points so that the object or body pushes away from the device. All critical components, including the retracted panels and slides, are contained within the protective envelope of the guards and nacelles. All critical mechanisms are mounted to body hard points, including the body rear frame and side rails, to ensure their mounting is secure. The deployed device tapers inward and has a rigid member which is connected near the trailing edge of the panel(s) and to the body. The panels can be constructed from a variety of rigid or semi-rigid materials, such as plastics and composites, fiberglass, carbon fiber sheets, certain metals, fabric in a rigid frame, or other fabrics, and the like.

In the exemplary embodiment shown in FIG. 27, for example, the top panel 2642 includes a rear extension 2660 that remains visible during retraction. In other words, in some aspects, the top panel 2642 retracts to a position such that even retracted, the rear extension 2660 portion extends from the nacelle 2632 and rearward of the rear frame 2610. The rear extension 2660 maybe joined to the remainder of the top panel 2642 using a variety of joints, such as joint 2666. Joint 2666, for example, a unitary "living" hinge can be employed at a fold in the overall panel material. The panel may have a unitary fold line to distinguish the rear extension 2660 from the remainder of the top panel 2642. A fabric or flexible polymer (tape) hinge can be employed or a mechanical hinge, such as spaced-apart butt hinges or a piano hinge can be employed. A forward joint 2664, which may be of similar arrangement, is provided adjacent to the nacelle on the top panel 2642. These two joints 2666 and 2664 form three sections in top panel 2642, including the rear extension 2660 section described above, an intermediate section, and a forward most section. While shown with two joints, more or less may be provided. The two joints 2664 and 2666 provide a bending axes traverse to the top panel 2642 that enable the top panel 2642 to be positioned to define a desired airflow shape. Generally, the shape facilitates downwardly tapered deployment of the panel around the cargo body frame and rear guards. The curvature and/or sloped angles defined by the joints described or additional joints allows air to flow smoothly over panel transitions, and allows for airflow to traverse around device mechanisms with low amounts of turbulence or flow disturbance.

The curvature transition point of the top panel 2642 is forward to the end of the cargo body and frame in order to start the airflow transition towards a more tapered shape. The prevailing angles of inward/rearward taper for the panels 2640, 2642 are similar to those described above and can be in a range of approximately 3 to 20 degrees with respect to the plane of the adjacent cargo body side.

Figure 29:
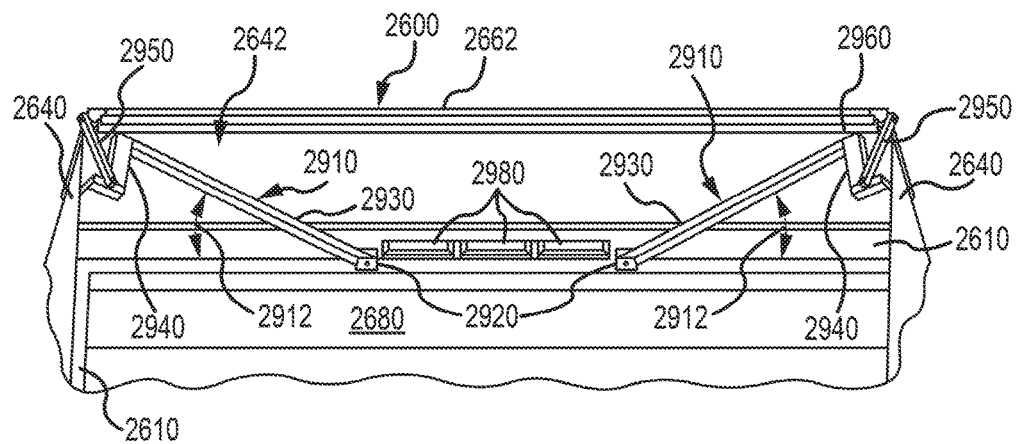
FIG. 29 is a partial upwardly directed rear view of the cargo body and rear aerodynamic device of FIG. 26 showing the top panel and rotating rigid top members.
Figure 30:
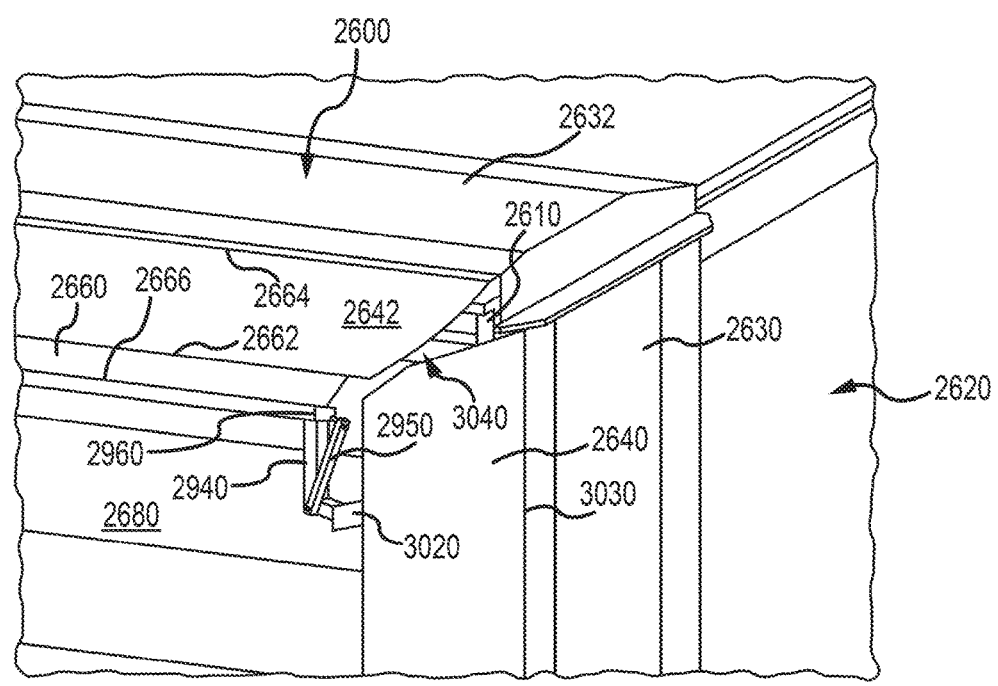
FIG. 30 is a partial rear view of the cargo body and rear aerodynamic device of FIG. 26 showing the top panel and rotating rigid top members.
Figure 31:
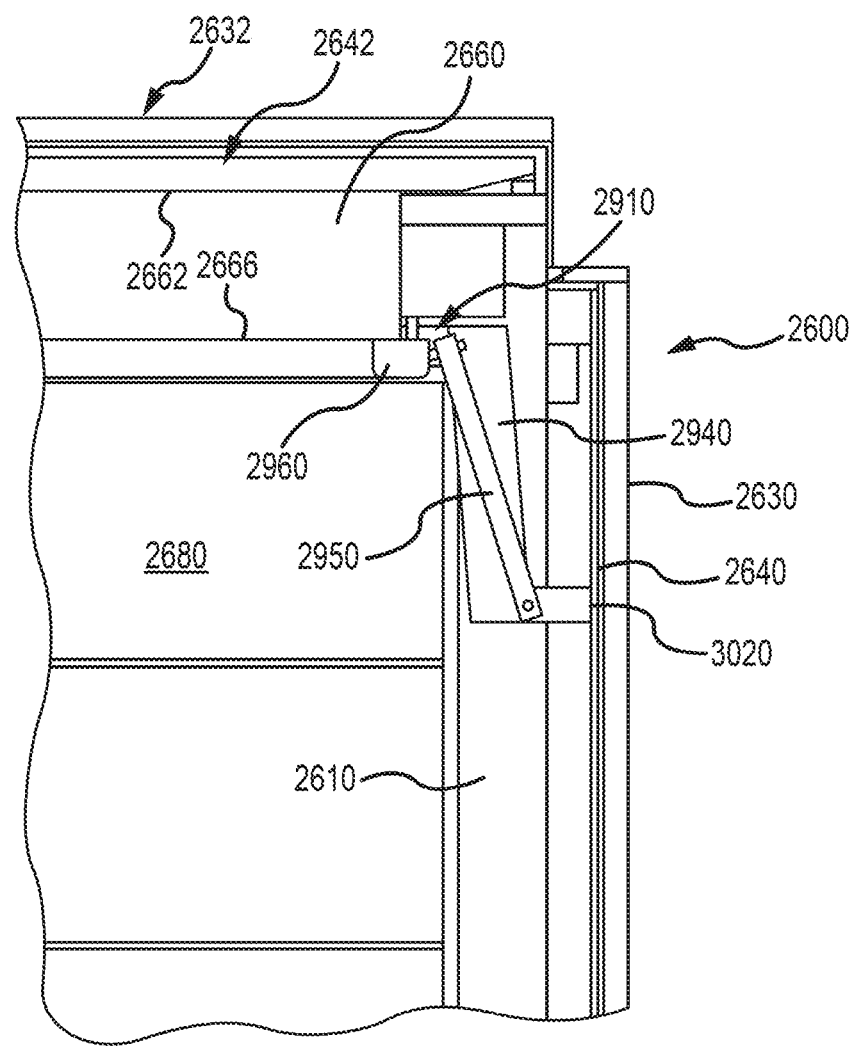
FIG. 31 is a partial rear view of the cargo body and rear aerodynamic device of FIG. 26 showing the top panel and rotating rigid top members in a retracted position.

Reference is now also made to FIGS. 29-30, which detail rotating rigid member assemblies 2910 that control the shape and position of the panels 2640, 2642 to maintain an aerodynamic shape and prevent device damage and fatigue thereto. As shown particularly in the upwardly directed rear view of FIG. 29, each rigid member 2910 is hinged to the top of the frame 2610, above the door 2680 at a hinge 2920. The member assemblies 2910 can swing toward and away from the frame during retraction and deployment, respectively, as indicated by double-curved arrows 2912. In other words, the elongated bar of member assemblies 2910 rotates in an arch about an axis defined by the hinge location 2920, which is shown as a bracket with a pin. Without a rigid member, the device's panels would require cantilevered arrangements, and larger loads would be input into the slides during high winds and normal body operation. The arc path of the member defines the panel angle. The member also provides for design failure redundancy. Each rigid member assembly 2910 consists of an elongated bar 2930 that extends from the respective hinge 2920 and an L-shaped end member 2940, which includes a downwardly extending leg and a horizontally, outwardly extending leg. The L-shaped end member 2940 engages an inner face at the rear, top edge of each side panel 2640 and acts as an escape shape for clearance of the cargo body (trailer) upper guards. A pivoting connecting bar 2950 is coupled to the L-shaped end member 2940 at a first pivot point and to a pivot point on an adjacent end of a cross piece 2960. The cross piece 2960 supports the rear end of the top panel 2642, such as the rear extension 2660. Thus, each rigid member assembly 2910 ties together the end of the top 2642 panel and the end of the side panel 2640 adjacent thereto ensuring these panels remain in relative position with respect to each other. The pivoting connecting bar 2950 serves the primary purpose of maintaining a constant width for the top panel assembly, even as the side panel assembly tapers in, or retracts from, the center of the cargo body. The pivoting connector bar 2950 can be linear, as depicted in the example of FIG. 31, or can define a curved profile to provide additional clearance for the perimeter of the door when the aerodynamic device is located in its retracted position. Note that the side panels 2640 also may be jointed, with for example, hinges, forming an axis 3020 at the L-shaped member interconnection and another axis (e.g. a living hinge) 3030 adjacent to the nacelle. These joint axes 3020, 3030 allow the side panel 2640 to achieve an inward/rearward taper and also to retract into its respective nacelle 2630 with minimal or no contact with the frame or cargo body, thereby minimizing rubbing and wear on the panel during use. The confronting edges of the panels can define a small gap 3040 (FIG. 30) that does not significantly affect aerodynamic performance. In an embodiment, the gap 3040 can be partially sealed by one or more flexible wipers, brushes, etc., mounted on one or both of the confronting panel edges on each side of the cargo body.

As shown in FIG. 29, the frame-top-mounted lighting 2980 remains visible beneath the top panel 2642, thereby complying with applicable laws and regulations. As noted, where lighting may be obscured it can be moved as appropriate to facilitate visibility, or mounted directly on an end of the panel. Alternatively, the panel can include a transparent window to expose the light.

Figure 32:
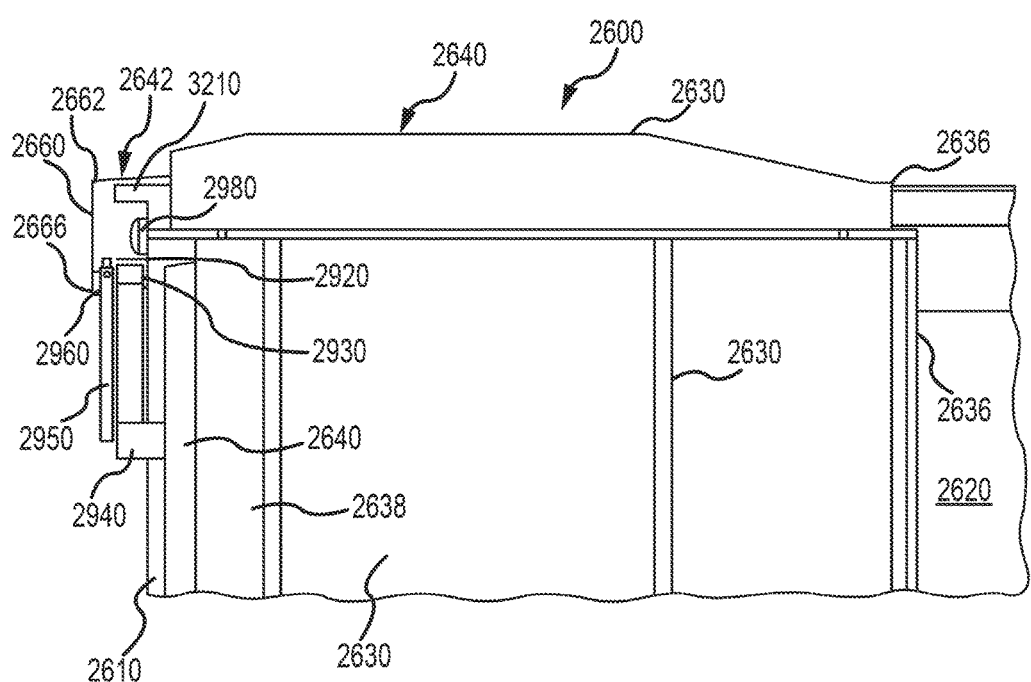
FIG. 32 is a partial side view of the cargo body and rear aerodynamic device of FIG. 26 showing the top panel and rotating rigid top members in a retracted position.

With reference now to FIGS. 31 and 32, the panels 2640 and 2642 are shown retracted into the nacelles 2630 and 2632, which each define a slot of sufficient, length, width and thickness to house and accommodate the respective panel as shown. If the panels are sufficiently flexible, the nacelles may accommodate a spring loaded roller as described herein. Otherwise, the panels slide into the nacelles and are arranged relatively flat with respect to the sides/tops of the cargo body. Panels 2640, 2642 are stored when retracted so that the panels and rigid members do not interfere with the body loading area, and particularly, the perimeter of the door 2680. This is particularly illustrated by the close-up rear view of a corner of the cargo body and device 2600 in FIG. 31. The rigid member assembly 2910 folds clear of the perimeter of the door 2680 as shown and exhibits a relatively low profile on the outside of the cargo body, ensuring it can still fit in tight spaces designed for truck/trailer traffic, such as loading docks, truck stop parking areas and fueling sites. Ideally, the profile of the rigid member assembly 2910 is no larger than the rear frame width or the width of the rear frame and nacelle. Note that the rear extension panel 2660 on the top panel 2642 is exposed. As shown in FIG. 31, the rear extension panel 2660 may fold into an exposed vertical orientation covering the frame as shown while the rigid member assembly rotates into contact with the cargo body frame or built-in panel stops that are part of the device 2600. Some or all of this panel can be transparent if needed to provide visibility for marker lights 2980. As shown in FIG. 32, when retracted, the side panels 2640 are positioned forward of the trailer rear face for protection during backing. The device 2600 can be arranged so that the elements of the rotating rigid member assembly 2910 are protected by the built in trailer rear guards (e.g. guard 3210) when the device is retracted.

Figure 33:
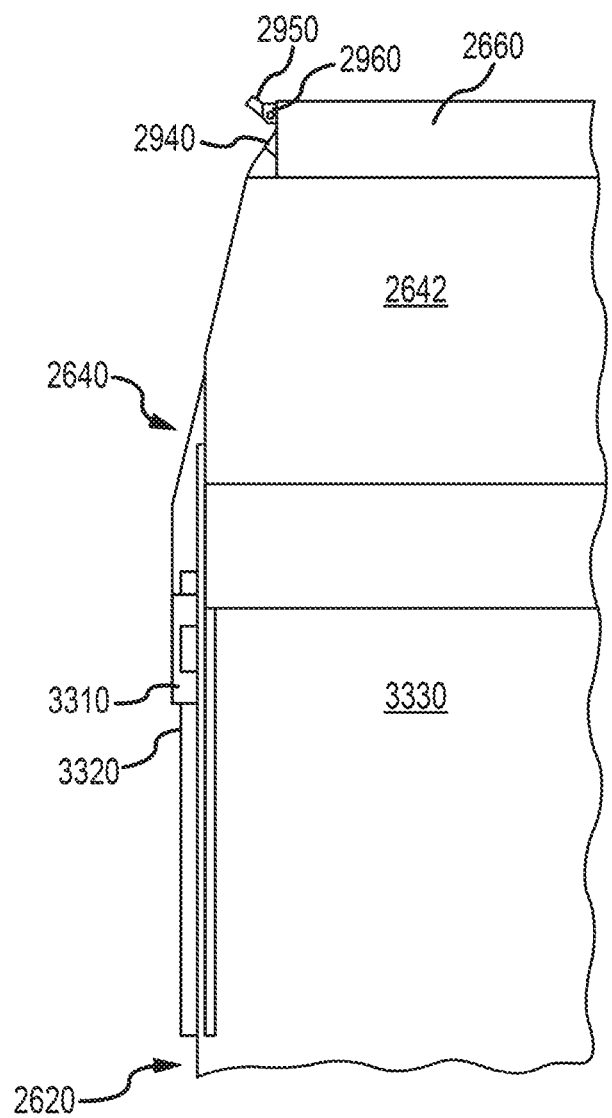
FIG. 33 is a partial top view of the cargo body and rear aerodynamic device of FIG. 26 showing the top panel and side panel in a deployed position with sliding guides exposed.

The panels 2640, 2642 are stored via mechanisms which control panel movement along a path as described below. Such mechanisms can include linear bearings/bushings, rollers and tracks, guide rails, and linkages. FIG. 33 details an arrangement (with nacelle covers 2630 removed or omitted) in which roller assemblies 3310 are mounted to the side panel 2640 and ride on body-mounted tracks 3320. Additionally, the top panel 2642 slides along a guide rail or skid 3330 (or any other linear system such as, e.g., a track-roller system, a linear bearing, pillow blocks, etc.) that is secured to the cargo body roof at its edges and optionally along the middle of its width. The rail/skid 3330 can be constructed from a self-lubricating and/or low-friction material such as polymer (e.g. nylon, Delrin®, etc.). These translation methods can be isolated, via rubber mounts, etc., from the cargo body or from the panel assembly in order to damp the shock/loads input from the cargo body. Multiple-axis rollers or slides can be used to constrain the system in each direction so that loads are input into rollers/slides which are designed to accept loads in that direction. Guides or studs, which the moving panel assembly engages with during the deployed or retracted device state, may be used to reduce load on the sliding mechanisms. The device's moving mechanisms/components are also damped by gas springs, rubber isolators, impact bumpers, and dampers to prevent fatigue and damage to device components. As noted above, in an alternate arrangement, the device can be constructed without (free-of) nacelles, and the top panel can also be dragged along the trailer's roof without (free-of) sliding or rolling elements as its weight is distributed evenly on the surface of the cargo body while the side panels can tend to rack if they are not well-supported by (e.g.) sliding/guiding mechanisms. Optionally, rollers can be mounted in the cargo body rain gutter (when fitted) to ease the movement of the top panel between retracted and deployed positions.

While not specifically shown, actuators, such as the actuators 610 and 710 described above, or other actuators as described below may be coupled between the rear frame and the rotating rigid member assembly 2910 for example. The actuator may be a rotary screw for example, a linear actuator, a compression spring, a tension spring, a combination thereof or the like described above and below. Additional, actuators, such as the actuators described herein, but not specifically shown, may be attached to the panels to push/pull the panels from or into the nacelles. For example, a compression spring may be coupled to the forward most edge of one or both side panels or the top panel to push the panel into the deployed position. Pressure supplied by an object (approaching vehicle or loading dock) may counter the compression spring to force the panels back into the nacelles. Alternatively to an object, a linear actuator, rotary screw, or the like may pull the panels into the nacelles. In other embodiments, for example, a linear actuator may be used to push the panels out of the nacelles against spring tension that pulls the panels back into the nacelles when the actuator is disengaged.

Figure 33A:
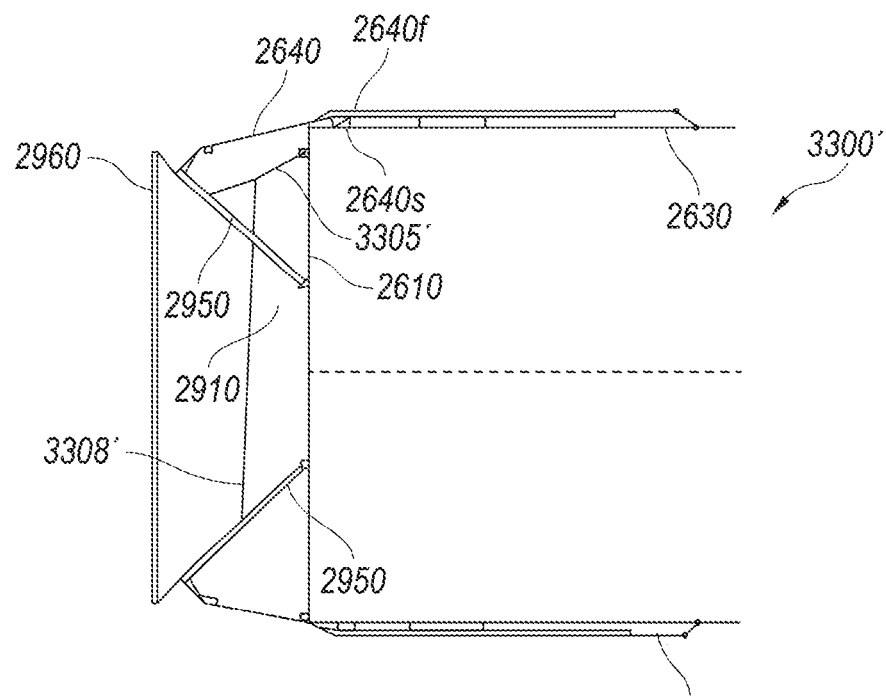
FIG. 33A is a top side view of a cargo body and a rear aerodynamic device consistent with the technology of the present application in a deployed position.
Figure 33B:
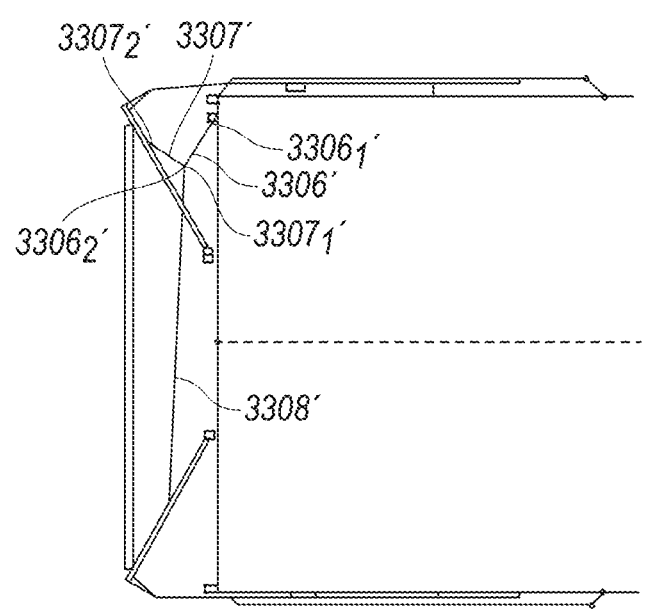
FIG. 33B is a top side view of the rear aerodynamic device of FIG. 33A shown in a partially deployed, partially retracted position.
Figure 33C:
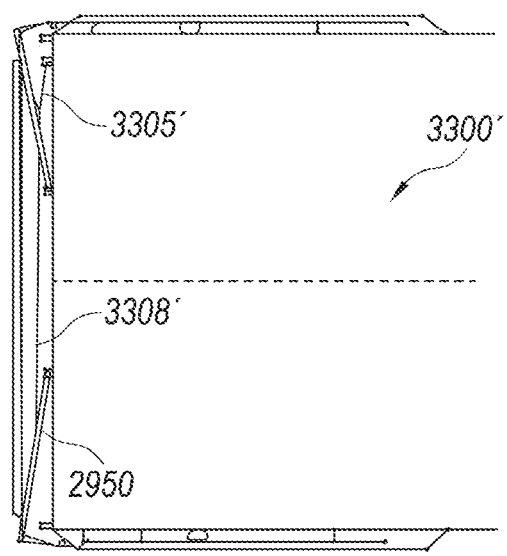
FIG. 33C is a top side view of the rear aerodynamic device of FIG. 33A in a mostly retracted position (FIG. 33C does not show a fully retracted position for convenience to show certain components identified therein)
Figure 33D:
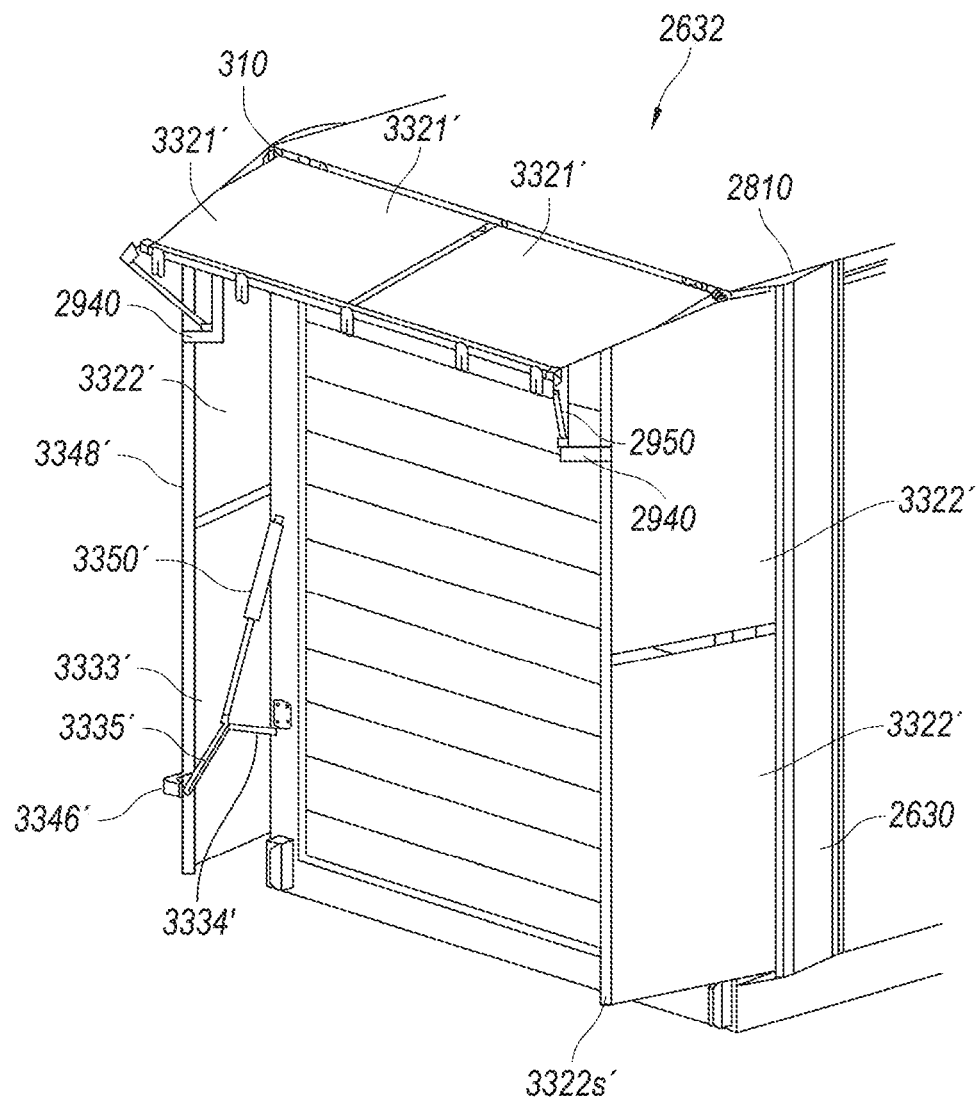
FIG. 33D shows a perspective view of a cargo body and another rear aerodynamic device consistent with the technology of the present application in a deployed position.
Figure 33E:
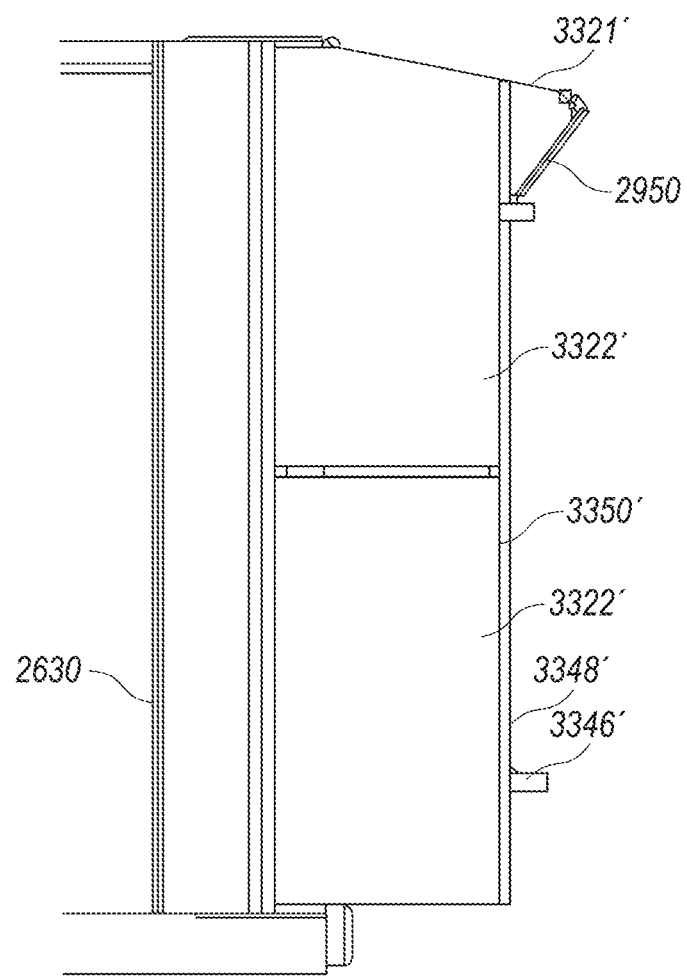
FIG. 33E shows a side elevation view of the aerodynamic device of FIG. 33D is the deployed position.

With reference now to FIGS. 33A-33C, an aerodynamic device 3300' that is similar to the device described in FIG. 26-33 above. Device 3300' has a top fairing panel (as any of the top fairing panels described herein—above or below) not specifically shown for convenience. The cargo body 3302' has a nacelle 2630 coupled to each side. Side fairing panels 2640 are shown deployed in FIG. 33A. The forward most end 2640f of the side fairing panels 2640 may be coupled to a stop 2640s to inhibit the side fairing panels 2640 from pulling completely out of the nacelles 2630. The device 3300' has a rigid member assembly 2910 coupled to the rear frame 2610 as described above. The rigid member assembly 2910 will not be described here for convenience except to understand the operation of the device 3300'. The pivoting connecting member 2950 is coupled to the side fairing panels 2640 and top fairing panel or cross piece 2960 as described above.

Device 3300' includes a linkage assembly 3305' having an extended position, as shown in FIG. 33A and a collapsed (or retracted) position as shown in FIG. 33C attached to one of the elongated bar 2930. The linkage 3305' as shown is a scissor link comprising a first elongate member 3306' and a second elongate member 3307'. A first end $3306_1$' of the first member 3306' pivotally coupled to the rear frame 2610 of the cargo body. The second end $3306_2$' of the first member 3306' is pivotally coupled to the first end $3307_1$' of the second member 3307'. The second end $3307_2$' of the second member 3307' is pivotally coupled to the elongated bar 2930. A synchro arm 3308' extends from the linkage 3305' to the other elongated bar 2930. An actuator (not shown here, but any of the various actuators described herein, such as, for example, linear actuator 710) may be coupled to drive the linkage 3305' between the open and closed position. The actuator could be attached to numerous different structural members as described elsewhere in the specifications. The synchro arm 3308' would cause the other rotating rigid member 2910 to follow the actuated rotating rigid member 2910. While shown connected to the linkage 3305', the synchro arm 3308' could be coupled to other parts of the device 3300'. In this exemplary embodiment, the linkage 3305' and synchro arm 3308' may be flexible members, such as cables, rather than rigid members, such as steel tubes or the like.

Another aerodynamic panel device 3320' is shown in FIGS. 33D-33H. Device 3320' has certain components that are similar to the aerodynamic devices 2600 and 3300' described above. The similar components will not be further explained herein except as necessary to understand the device 3320'. Generally, it is envisioned that the device 3320' includes panels that can be retracted using rollers (such as rollers 310 or 410 described above) whereas the devices 2600 and 3300' include panels that are less flexible and are stored flat in the nacelles. However, it should be understood, that the embodiments described above for devices 2600 and 3300' may use fabric also.

The device 3320' includes a top fairing panel 3321' and a pair of opposed side fairing panels 3322'. The top fairing panel 3321' and opposed side fairing panels 3322' may be housed in nacelles 2632, 2630 as previously described. The nacelles 2632, 2630 may have upper and/or side guards 2810 as previously described. While the exemplary embodiment shows a nacelle, the panels 3321' and 3322' may be stored in other style housings or arranged to lay flat on the sides of the cargo body. Alternatively, the panels may be gathered at the rear facing frame, such as, by rollers 310 or 410, or other gathering mechanisms described herein. The top fairing panel 3321' and the side fairing panels 3322' may be split into two or more panels. As shown, they are split into two roughly equal sized panels, but the panel sizes may be variable. The trailing edge of each side fairing panel 3322' may be provided with a support 3322s'. The support 3322s' may be a reinforcing member, steel, aluminum, fiberglass, carbon fiber, other composites, or the like. As shown, the support 3322s' is a contiguous piece across multiple side fairing panels 3322', but the support 3322s' could be discontinuous.

Figure 33F:
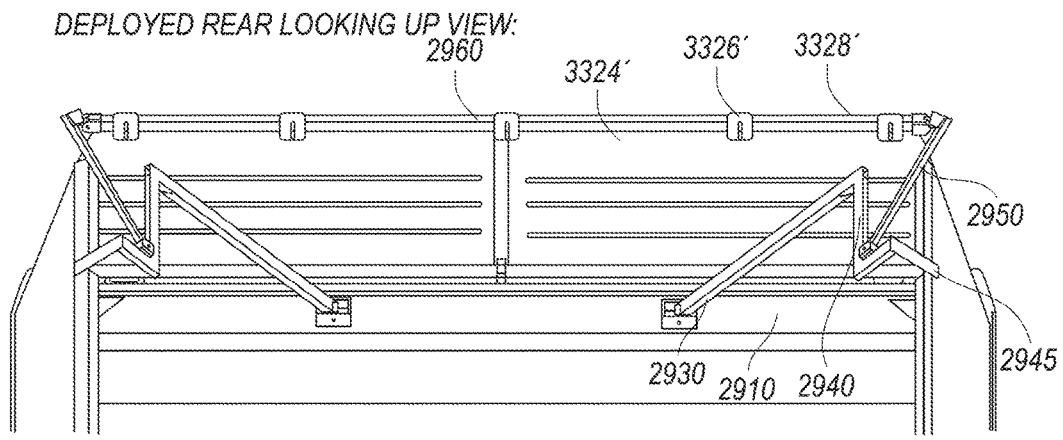
FIG. 33F shows a rear perspective view of the underside of a top panel of the aerodynamic device of FIG. 33D in the deployed position.
Figure 33G:
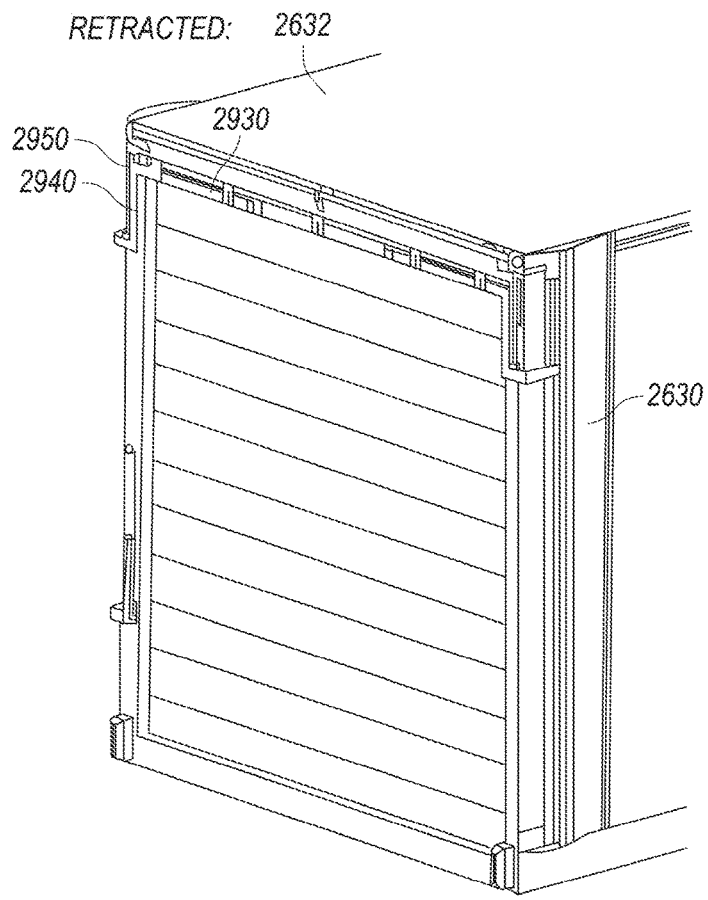
FIG. 33G shows a rear perspective view of the aerodynamic device of FIG. 33D in the retracted position.
Figure 33H:
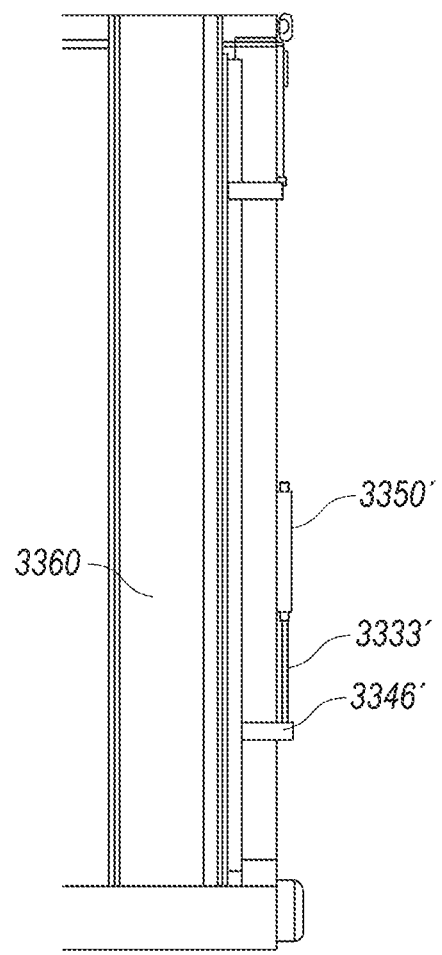
FIG. 33H shows a side elevation view of the aerodynamic device of FIG. 33D in the retracted position.

As shown best in FIG. 33F, the device 3320' include rotating rigid members 2910 as described above. The rotating rigid members 2910 include an elongate bar 2930 having an L-shaped end member 2940. The rotating rigid members 2910 may be coupled to actuators, not specifically shown here, but described elsewhere in the application. A connecting bar 2950 is pivotally coupled between the end member 2940 and the cross piece 2960 at the rearmost portion of the top fairing panel 3321'. The top fairing panel 3321' and the side fairing panels 3322' may have stiffeners 3324', which may be ribs in the panels or added members, such as steel rods or the like. As shown on top fairing panel 3321', a plurality of tabs 3326' may be provided at the rearmost edge 3328' of the top fairing panel 3321' to facilitate tension. The side fairing panels 3322' may have similar features.

With reference to FIG. 33F, the L shaped end member 2940 also has a square bracket 2945. The square bracket 2945 is coupled to the support 3322s' of the side fairing panel 3322'. The shape is such to operatively engage the edge of the rear frame of the cargo body.

The device 3320' also may include a linkage 3333', similar to other scissor style linkages described herein. The linkage 3333' has a first and second elongate member 3334', 3345'. The second elongate member 3345' is coupled to a base 3346' extending from the rearmost edge 3348' of one of lower side fairing panel 3322'. An actuator 3350', such as the linear actuators 610, 710 described above, or other actuators described herein, may be coupled between the rear frame 2610 and the linkage 3333'. Depending on the material, the rearmost edge 3348' may or may not have the support 3322s'', such as a steel sleeve or the like.

While shown on only one side, the linkage 3333' (and other associated parts) functions in part to stabilize the side panel 3322'. Thus, in some embodiments, a second linkage 3333' may be provided. The second linkage 3333' may be provided with an actuator 3350' as well.

In certain embodiments, the side fairing panels 3322' may be formed of fabric, especially if additional linkages 3333' or stiffeners 3324' are provided. Thus, the nacelles 2630 may house rollers 310 (or 410) and biasing springs or the like as described above. Similarly the top fairing panels 3321'may be formed of fabric that can be rolled on rollers 410 (or 310). While not specifically shown, the top fairing panels 3321' and side fairing panels 3322' may be taught and formed to have curvatures although substantially planar and tapered provides satisfactory performance.

Figure 34:
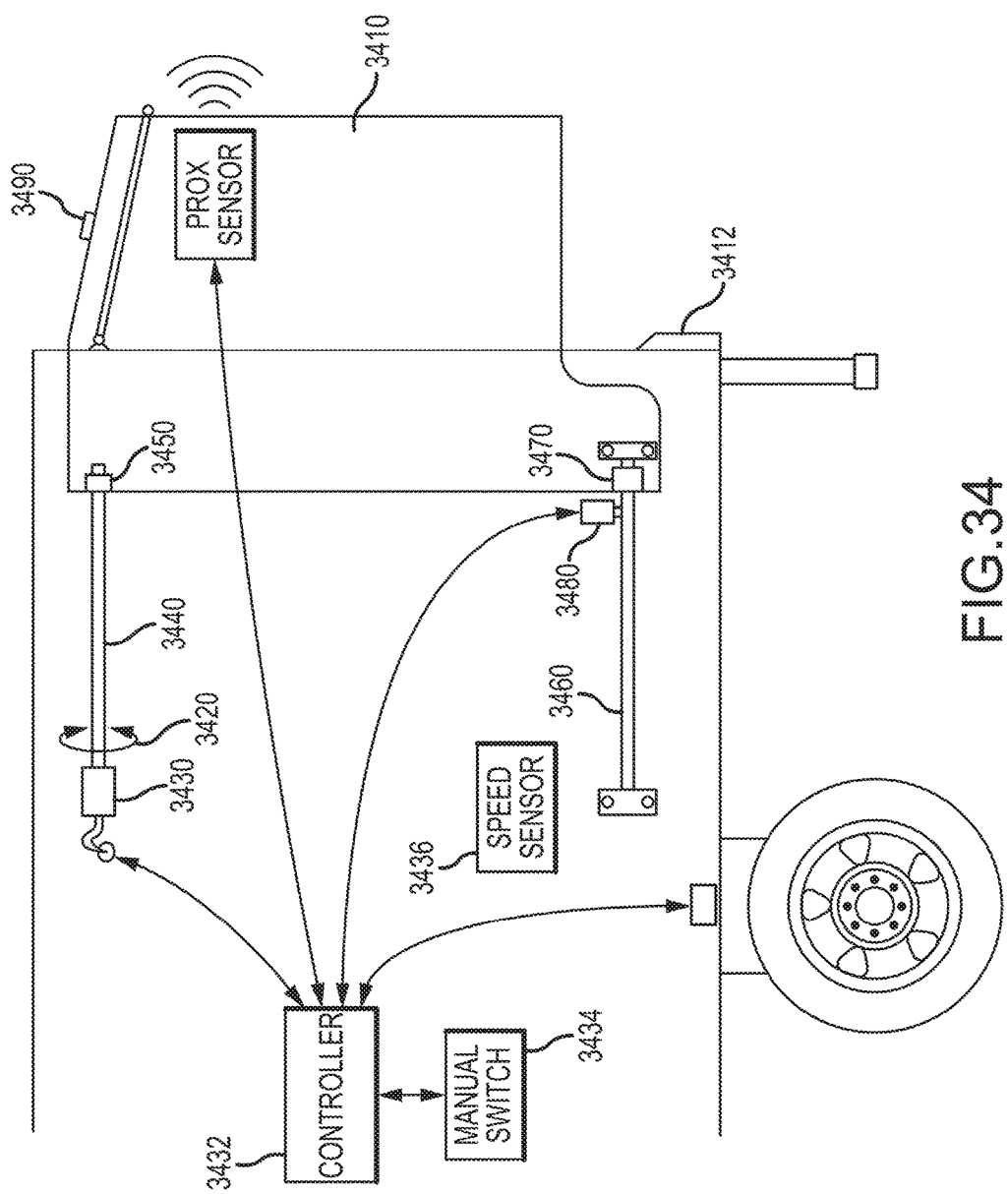
FIG. 34 is a partial side view of the cargo body and rear aerodynamic device of, for example, FIG. 26 showing the side panel in a deployed position with lead screw actuator and various sensors to control and monitor functions of the aerodynamic device.

The device installation is adjustable and adaptable for each OEM and their various configurations. For example, slides and side guards can be mounted on top of body rivets on the side rails or moved into a position which clears those built-in features. The rotating rigid members may be mounted on the rear frame in a position which does not interfere with the body top lights, or the lights may be relocated to the device or lower on the body. The rigid members are designed with escape shapes that clear body rear guards. See, for example, the upwardly curved step at the bottom of each side panel 3410 in FIG. 34 avoids the rear guards/bumpers 3412.

The device (or any other sliding-panel-type device contemplated herein) can be biased retracted by passive mechanism, and deployed by automated mechanisms or vice versa as outlined above. Biasing in a retracted states may be preferable in certain circumstances as it tends to eliminate or minimize driver involvement while inhibiting damage to the device when the truck docks, if the device loses power, or if operator/driver is unaware of obstructions. However, biasing to a deployed state and actuating to a retracted state is possible by flipping the general operations described herein. By way of non-limiting example, retraction mechanisms that can bias the panel include springs, damper, counterweight, elastic member, angled tracks, and/or motors. Examples of automated deployment biasing mechanisms include actuators (connected to the rotating rigid members or to the sliding panels), motors (connected to the rotating rigid members or the sliding panels through gears, belts, chains, cables, rack and pinion), linear motors, motors mounted inside the body (to protect it from environmental and durability concerns), motors mounted in place of rollers, and solenoids. By way of non-limiting example, a side panel 3410 (which can be similar to or the same as above-described side panel 2640) is biased into both a retracted and deployed position (as shown) by rotation (double curved arrow 3420) of an electric (or fluid-driven) motor 3430. The motor 3430 selectively rotates in each direction using a controller 3432 and/or switch 3434 that is manually operated by the user or automatically activated by, for example, a speed sensor 3436. The motor drives a lead screw 3440 upon which a linear bushing/bearing 3450 assembly is threaded. This bushing/bearing is fixed adjacent to the top forward edge of the panel 3410 as shown. The bottom forward edge of the panel includes a pillow block or bushing 3470 that rides on a track 3460 secured to the bottom rear of the cargo body, and operates as described above. In this manner, the panel can be fully or partially deployed or retracted as appropriate. Note that various mechanisms, such as a latch or break-away structures on the lead screw/bushing assembly or the track (e.g. latch mechanism 3480 in FIG. 34) can be used to allow retraction free-of operation of the motor with a spring that causes the panel to retract when the screw is disengaged and/or a latch is released. More generally, the device can be latched in the deployed position by manual or automated mechanism to minimize current draw or prevent deploying/retracting of device if power to device is intermittent. The exemplary latch mechanism can also reduce component loads.

Optionally, in various embodiments, proximity sensors, such as laser, ultrasonic, radar, and camera/computer vision, can be utilized to detect collisions with the device and trigger device automation or a warning to the driver. These exemplary proximity sensors can be mounted along trailing edges of the device panels or at another appropriate location (e.g. nacelles, the door frame, etc.). Likewise, as described above, speed sensors can be used to drive device automation and feed into the activation control logic. Exemplary speed sensors can include radar, GPS, ultrasonic, cameras, Hall Effect, and the body wheel speed sensors.

Logic systems/processes/processors can be used by the automation control/controller unit to limit the number of deployment/retraction cycles the device does. This can include waiting a predetermined delay time to deploy the device after a retraction cycle even if the sensors report no obstacles and the body is at speed. As described above, the length of extension of the device panels can also be controlled and varied. Different settings and/or sensors (for example an airflow sensor 3490) can adjust the device length and panel angle for optimal aerodynamic performance, body platooning, and body longer combination vehicles (LCVs). Panel extension adjustment can also be used to comply with restrictions in various jurisdictions related to maximum rear extension of an aerodynamic device. The user can direct the system to extend the device to a given legal length that is less than the maximum panel extension length. Applicable lengths for various legal jurisdictions can be programmed into the controller. More generally, the device is adaptable for regulation. Body top lights can be moved to the end of the tail.

Figure 36:
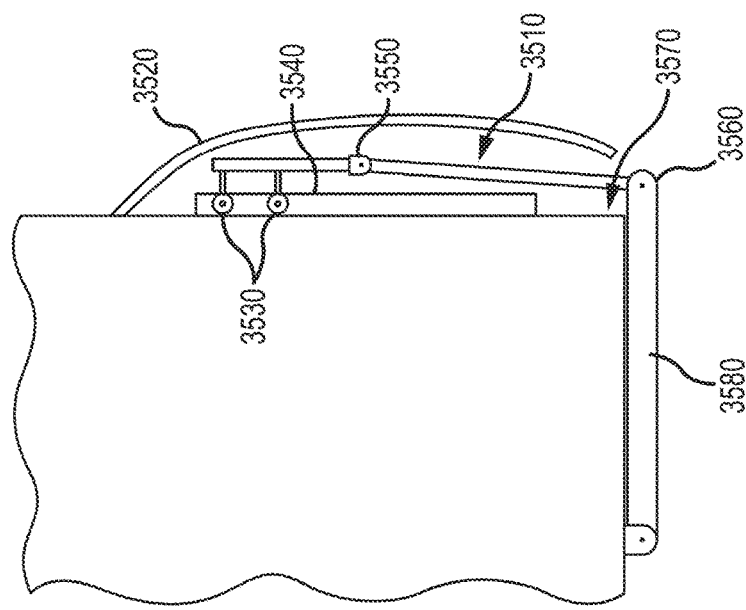
FIG. 36 is a partial top view of the cargo body and rear aerodynamic device of FIG. 35 in a retracted position.
Figure 35:
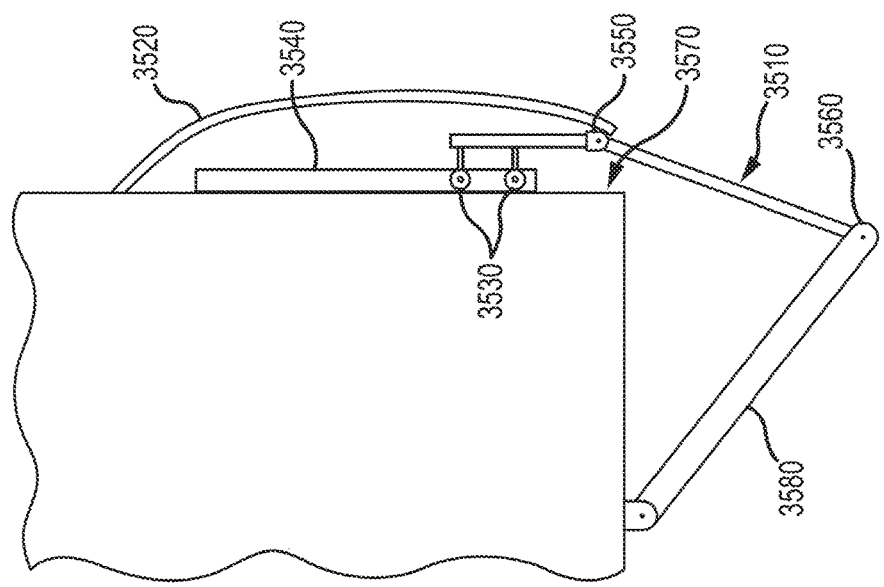
FIG. 35 is a partial top view of a cargo body and rear aerodynamic device showing a dual-hinge side panel and side nacelle in a deployed position according to an illustrative embodiment.

The following is a description of a variety of different features and arrangements applicable to side-sliding panel arrangements such as those shown and described with reference to FIGS. 26-34. With reference now to FIGS. 35-36, the side panel arrangement 3510 is shown deployed from its nacelle 3520 (FIG. 35) and retracted thereinto (FIG. 36). The panel 3510 is slidably supported by exemplary rollers 3530 that ride on one or more tracks 3540 mounted on the cargo body side. The panel arrangement 3510 includes full-length dual hinges 3550 and 3560 that allow it to retract (under operation of the rigid member 3580) free-of any contact or rubbing with the cargo body side or frame 3570 as denoted by the gap 3610 when retracted.

Figure 38:
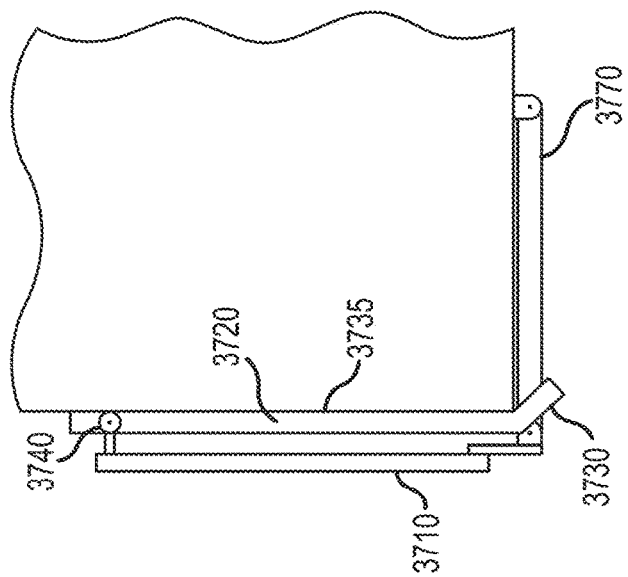
FIG. 38 is a partial top view of the cargo body and rear aerodynamic device of FIG. 37 in a retracted position.
Figure 37:
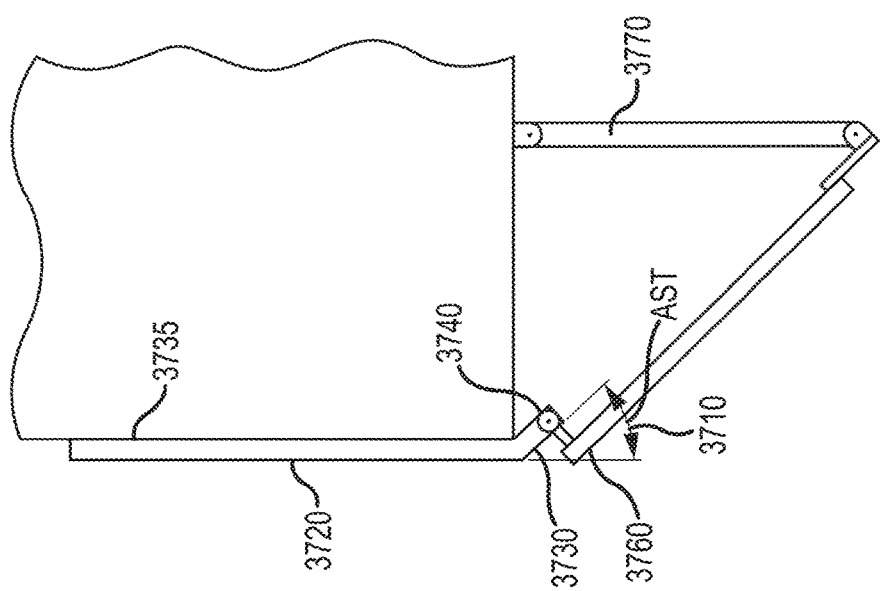
FIG. 37 is a partial top view of a cargo body and rear aerodynamic device showing a wrap-around track with side panel in a deployed position according to an illustrative embodiment.

With reference to FIGS. 37 and 38, the track(s) 3720 that guide the side panel 3710 (and can also be used with a top panel) can include an inwardly and rearwardly angled segment 3730 that projects at a predetermined inward angle AST relative to the plane of the cargo body side 3735. The roller 3740 that rides on the track 3720 allows the panel 3710 to be located off of the body side and/or top to avoid damage when deployed (FIG. 37), but readily confront the body side 3735 in a relatively flush manner when retracted (FIG. 38). The inwardly angled track segment 3730 also allows the forward edge 3760 of the panel 3710 to move inwardly, thereby reducing drag. The retraction/deployment as well as the taper angle of the panel is controlled by the rotating rigid member 3770, which operates as described above, and, like other assemblies herein, can tie together the top panel and be actuated by one or more actuators that operate on the member or the panel(s) themselves.

Figure 39:
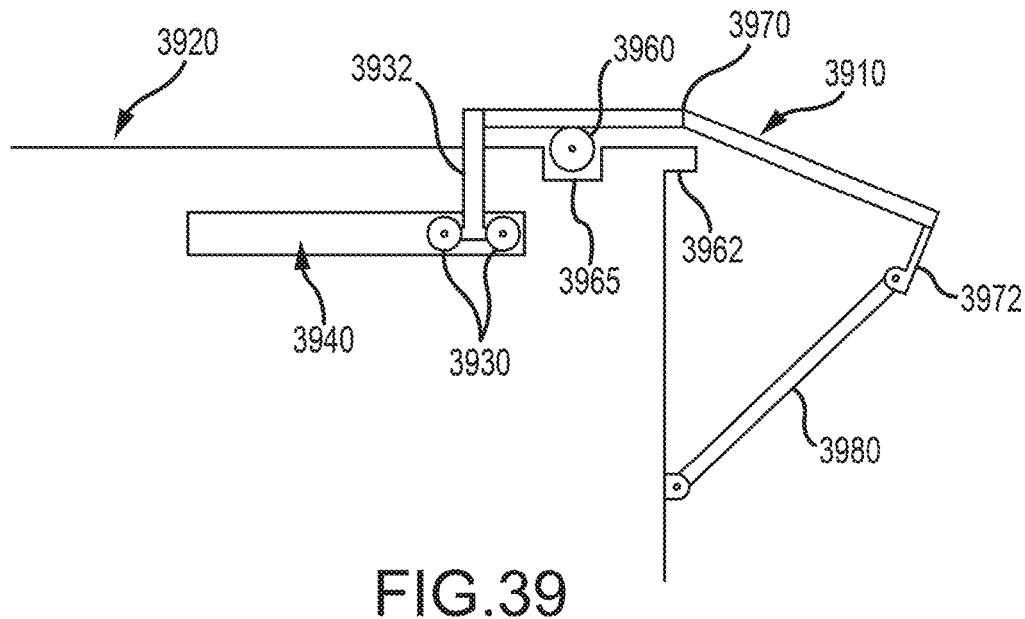
FIG. 39 is a partial side view of a cargo body and rear aerodynamic device showing a top panel guided by side mounted tracks and rollers to achieve a low profile on the roof, in a deployed position, according to an illustrative embodiment.
Figure 39A:
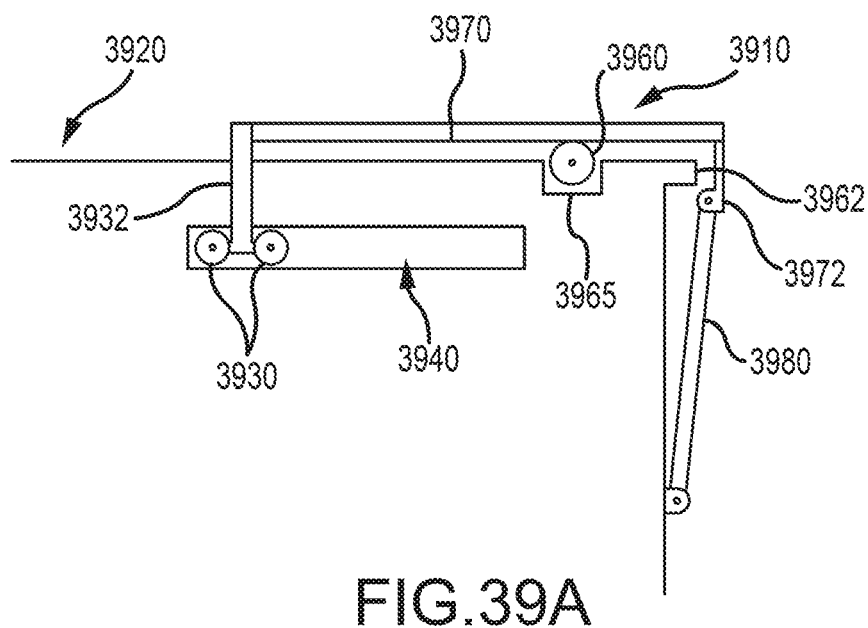
FIG. 39A is a partial top view of the cargo body and rear aerodynamic device of FIG. 39 in a retracted position.

FIGS. 39 and 39A show an exemplary top panel arrangement 3900 that slides along the roof 3920 of the cargo body. The top panel 3910 is supported by a roller assembly 3930. One or more roller assemblies 3930 may be used. Generally, two roller assemblies 3930 are used with one on each side of the panel that engages an associated side-mounted track 3940. Respective extension bars 3932 extend to the roller assembly 3930 from the panel 3910 to the side tracks 3940. This arrangement of side-mounted rollers/tracks avoids the use of components that will cause a stack-up of height to facilitate movement of the top panel from the deployed (FIG. 39) to retracted (FIG. 39A) position. A recessed roller 3960 can be placed in the body rain gutter 3965 or other recess (as applicable) on the roof 3920 of the cargo body (or another slide/skid can be mounted in the gutter or another location across the body width), which prevents the panel 3910 from rubbing against the roof or frame (or rearwardly projecting top guards 3962). The panel includes various hinge lines/axes 3970 (i.e. a double hinge) to facilitate rub-free retraction as the rigid member 3980 rotates. The rigid member 3980 is shown as a vertical member attached to the frame in this example—but alternatively it can be part (e.g. member 2950) of a rigid member assembly 2910, described above.

FIGS. 40 and 41 show another side panel arrangement 4000 according to an exemplary embodiment in which the side panels 4010 and the top panel 4012 are shown in a deployed (FIG. 40) and retracted (FIG. 41) position, respectively. Nacelles 4020 are provided as an option for at least the side panels 4010. The top panel 4012 defines a rearwardly/inwardly tapered angle TAP that the side panels conform to when deployed. The taper is achieved in the side panels 4010 (which can be flexible or contain multi-axis hinges) using a spring-loaded expansion member 4030 with tension spring 4032 (or a travel-limited compression spring), which extends between the rear edges of the side panels 4010. The spring biases the panels toward each other when deployed as shown (FIG. 40). The bias force is overcome and the panels spread apart when retracted (FIG. 41). Corner rollers 4050 mounted on the ends of the body frame prevent the side panels from binding on the frame as they move between deployed and retracted positions. Tracks and rollers 4060, as have been described or are generally known, can guide the panels as they move along the respective sides of the body and the top panel can be linked (via rotating rigid members and/or other linkages) to move in coordination with the side panels when actuated in accordance with various techniques contemplated herein.

Figures 42, 43:
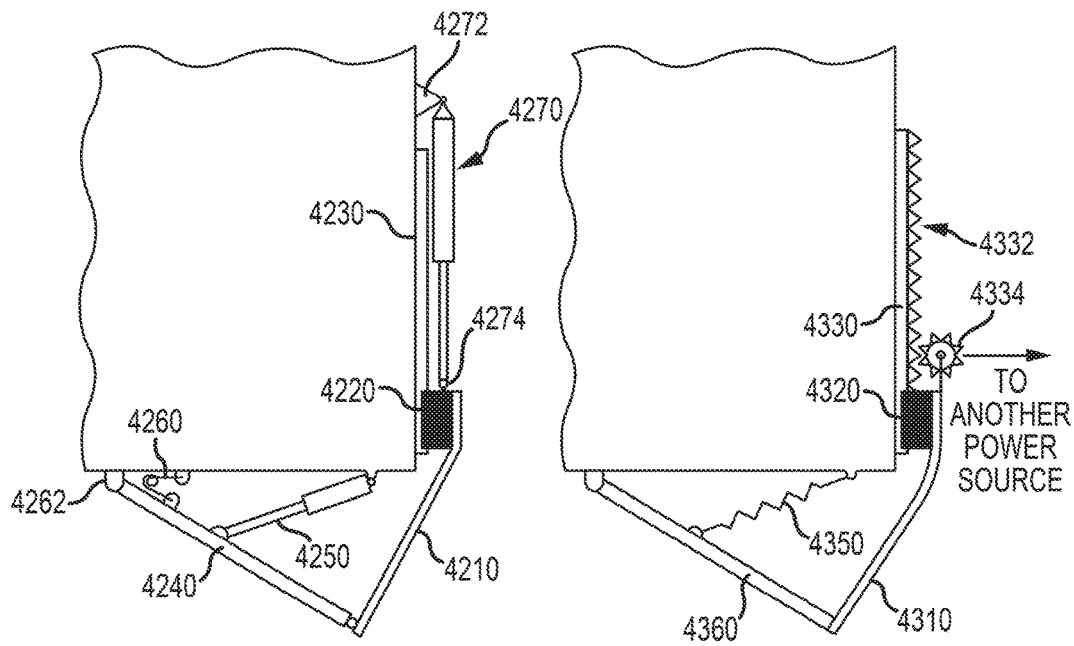
FIG. 42 is a partial top view of a cargo body and rear aerodynamic device showing a linear/gas piston actuator and torsion spring biasing mechanism for a side panel in a deployed position according to an illustrative embodiment.
FIG. 43 is a partial top view of a cargo body and rear aerodynamic device showing a rack and pinion actuation mechanism for a side panel in a deployed position according to an illustrative embodiment.
Figure 44:
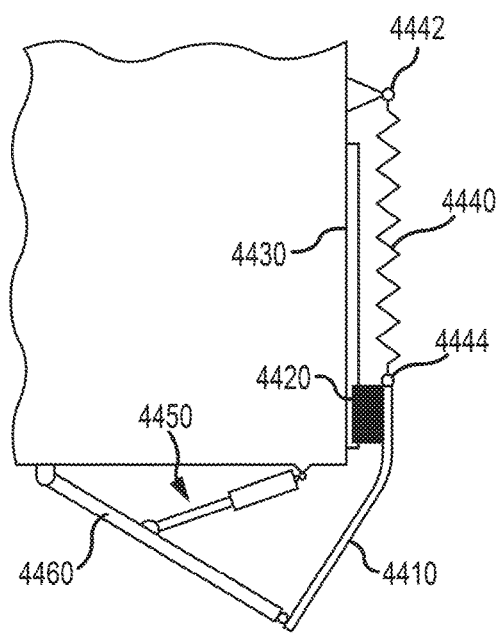
FIG. 44 is a partial top view of a cargo body and rear aerodynamic device showing a an extension/tension spring that normally biases a side panel into a retracted position against selective bias of an actuator according to an illustrative embodiment.

FIGS. 42-44 show further examples of panel biasing mechanisms as described generally above.

In FIG. 42, a side (or top) panel 4210 is supported on a block or roller assembly 4220 that slides on a body-mounted track 4230. The rotating rigid member 4240, hinged at the body and the rear edge of the panel 4210, is coupled to a damper or gas spring 4250 that is also hinged to the body or rear frame and the rotating rigid member 4240. Alternatively, or additionally, a torsion spring 4260 is provided at the body hinge 4262 of the rigid member 4240. Alternatively, or additionally, a mechanical spring, gas spring, or powered actuator 4270 can be fixed to the body side at a mounting point 4272 and engage the panel edge or the block 4220 at a connection point 4274 as shown to translate motion linearly along the longitudinal direction of the body and direction of retraction/deployment of the panel. Generally, although it can be reversed, the gas spring 4250 would bias the panel 4210 to a deployed state and the actuator 4270 would bias the panel 4210 to a retracted state.

In FIG. 43, the side (or top) panel 4310 includes a sliding assembly (roller/block) 4320 that rides in a track 4330 that includes a gear rack 4332. A pinion gear 4334 is mounted on the panel edge and/or sliding assembly 4320, and can be motorized using, for example a fluid or electric motor that interfaces with an appropriate controller (as described above). Rotation of the pinion causes the sliding assembly 4320 to move along the track 4330 between a deployed and retracted position. A further spring 4350 can be provided between the body frame and the rotating rigid member 4360 to aid in extension and retraction of the panel 4310. The spring 4350 could be a compression spring to aid in the extension, a tension spring to aid in retraction, or a combination to aid in extension and retraction. In an embodiment, the rack can be disengaged and/or allowed to freewheel (for example, using a solenoid or fluid piston to engage or disengage the pinion gear 4334 from the rack 4332, or engage/disengage a latching arrangement between the sliding assembly and track). If the pinion gear 4334 is designed to disengage, as is generally known in the art, the spring 4350 would bias the panel 4310 to a default position (extension or retraction) while the pinion gear 4334 is disengaged.

FIG. 44 shows a side panel 4410 on sliding assembly (block or rollers) 4420 and track 4430 in which a tension/extension spring 4440 normally biases the panel into retraction, but is overcome by the deployment action of an actuator 4450. Of course the spring 4440 could be a compression spring, in which case the actuator 4450 would overcome the spring to retract the panel 4410. The spring 4440 is mounted at one point 4442 on the body and at another point 4444 on the sliding assembly 4420 or panel edge. The actuator 4450 is powered or manual and is mounted between the body/frame and the rotating rigid member 4460. This actuator can control retraction against the bias of the spring 4440. It should be clear that a variety of combinations of springs, actuators, motors, gears, etc. can be combined to achieve deployment and retraction in accordance with skill. These devices can act on the panel, the panel hinge assembly, the guide (e.g. roller and track) for the panel, and/or an interconnected linkage such as the rotating rigid member.

Figure 45:
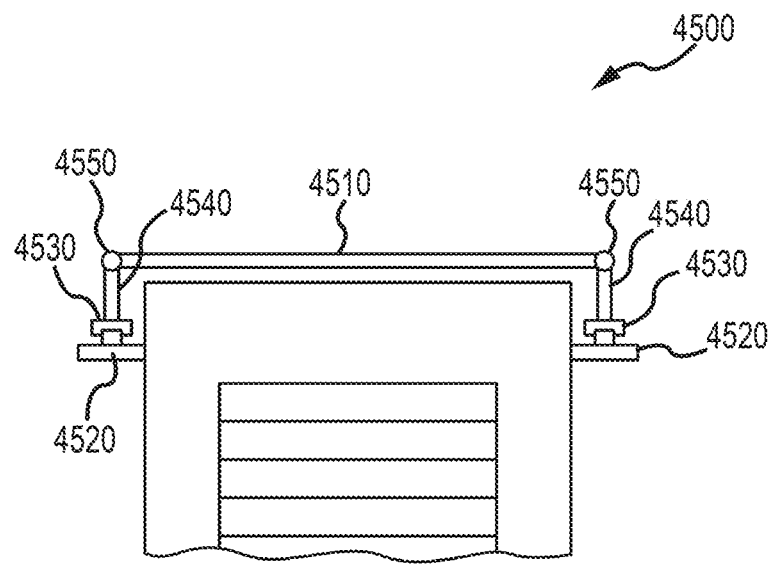
FIG. 45 is a partial rear view of a cargo body and rear aerodynamic device showing an anti-racking pivot arrangement applied to a top panel as side-mounted rollers and side-mounted slides according to an illustrative embodiment.
Figure 46:
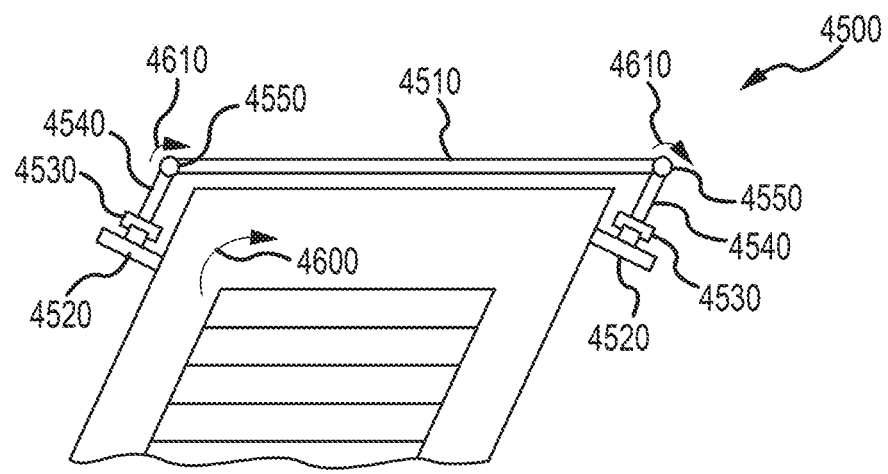
FIG. 46 is a partial rear view of the cargo body and rear aerodynamic device of FIG. 45 showing the response of the anti-racking pivot arrangement to an exemplary racking event due to twisting of the cargo body.

FIGS. 45 and 46 show an illustrative anti-racking system 4500 that contemplates possible flexure of the vehicle body as it traverses bumps and uneven road contours. This system is applicable to arrangements in which the top panel 4510 slides along tracks 4520 located along the side of the cargo body (see embodiment in FIGS. 39 and 40 above, for example, but employable with any embodiment applicable herein). The top panel 4510 is connected to the tracks 4520 on each side of the body by sliding on assemblies 4530 (e.g. a lubricous material or rollers as described herein) that interconnect with the panel 4510 by extension bars 4540 (or similar structures that run from the roof to the tracks). In an embodiment, the upper end of each of the bars is interconnected to the horizontally oriented top panel arrangement 4510 by pivots 4550 with axes aligned along the longitudinal axis of the body (i.e. perpendicular to the figure and page). Notably, racking, which is shown by the distorted body shape (and curved arrow 4600) can result in fatigue failure for the panel assembly where it joins with the sliding assembly and extension bars 4540 if such flexure is not accounted for. The illustrative pivots 4550 allow for conforming flexure at the pivots 4550 (shown by curved arrows 4610) thus avoiding potential failure due to racking. The pivots can be constructed in using a variety of joints and can include elastomeric dampers/bushings in the manner of the suspension joints on vehicles. The pivots could include ball and socket joints, hinges, or the like. The joints can be constrained by stops or torsion springs that ensure they do not flex beyond a maximum angle, and that they recover to the original position after flexure. In alternate arrangements, the components that join the panel and sliding assembly can include unitary or integral flexible members (e.g. living hinges, etc.).

Figure 47:
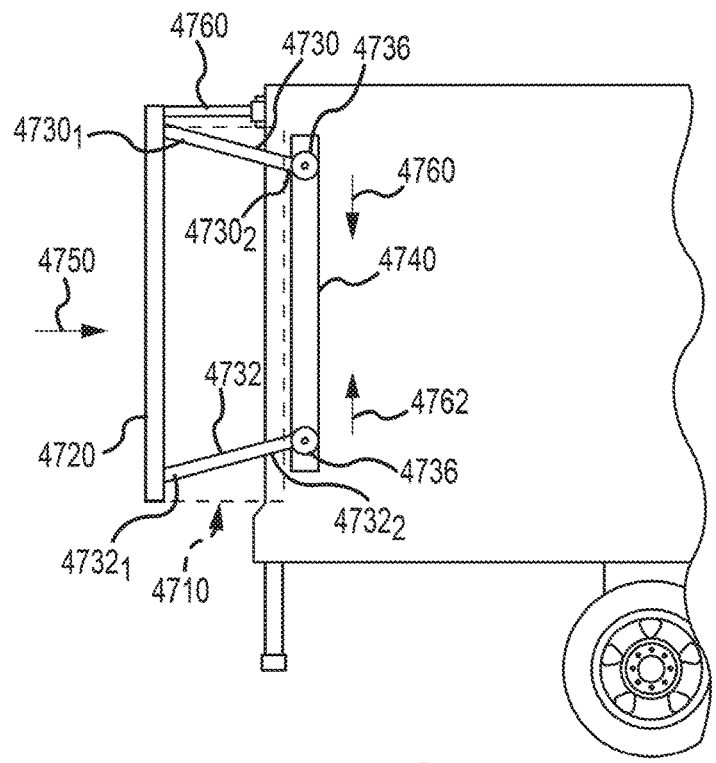
FIG. 47 is a partial side view of a cargo body and rear aerodynamic device showing a vertical, body-side-mounted track and guided rollers on the ends of supports for the side panels, in a deployed position, according to an illustrative embodiment.
Figure 48:
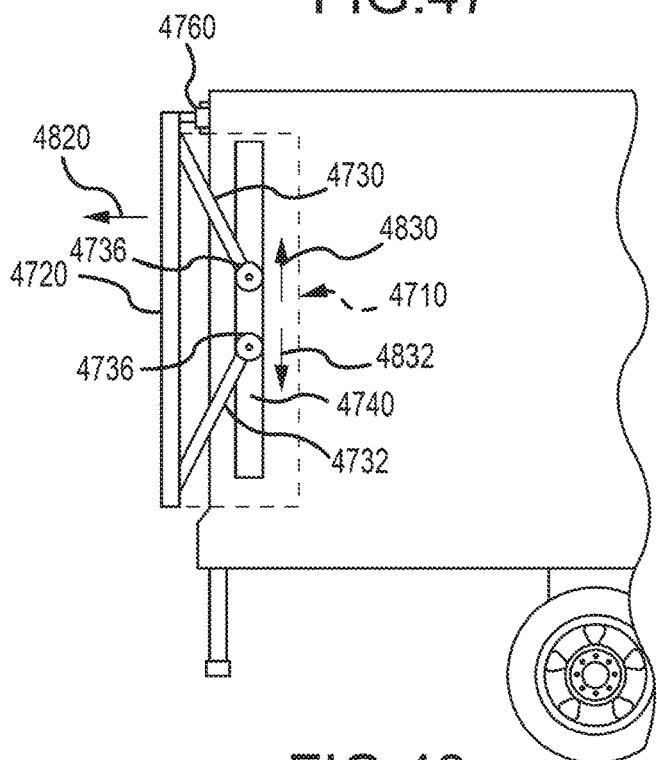
FIG. 48 is a partial side view of the cargo body and rear aerodynamic device of FIG. 47 in a retracted position.

With reference to FIGS. 47 and 48, a further arrangement for moving side (and top) panels 4710 between a deployed (FIG. 47) and retracted (FIG. 48) position is shown and described. The panels 4710 are shown in phantom for clarity of the guiding mechanism. The rear end of each panel includes a vertical support bar 4720 that is hingedly (in two axes) attached to a top and bottom pivoting and to first ends 4730$_1$, 4732$_1$ of sliding bar member 4730, 4732. The opposing second ends 4730$_2$, 4732$_2$ of each bar member 4730, 4732 includes a roller 4736, or other element, that rides in a vertical track 4740, mounted on the cargo body side as shown. The position of the track ends, and the rollers 4736 with respect to the track ends, controls the final position of the panel.

When retracting (arrow 4750 in FIG. 47) under control of the rotating rigid member 4760 coupled to an actuator, for example, or other extension and retraction mechanisms explained herein, the bar members 4730 and 4732 pivot, and their rollers 4736 slide (or roll) toward each other (respective arrows 4760, 4762) in the track 4740. Conversely, when deploying (arrow 4820 in FIG. 48), the bar members 4730 and 4732 pivot so that the rollers move away from each other on the track 4740 (respective arrows 4830 4832). Generally, the rigid member 4760 controls the degree of rearward extension as well as the inward/rearward taper angle of the panel 4710 in a manner described generally above. The ends of the track can act as stops on the extension if extension is not stopped by limit to rotation of the rigid member 4760.

Figure 49:
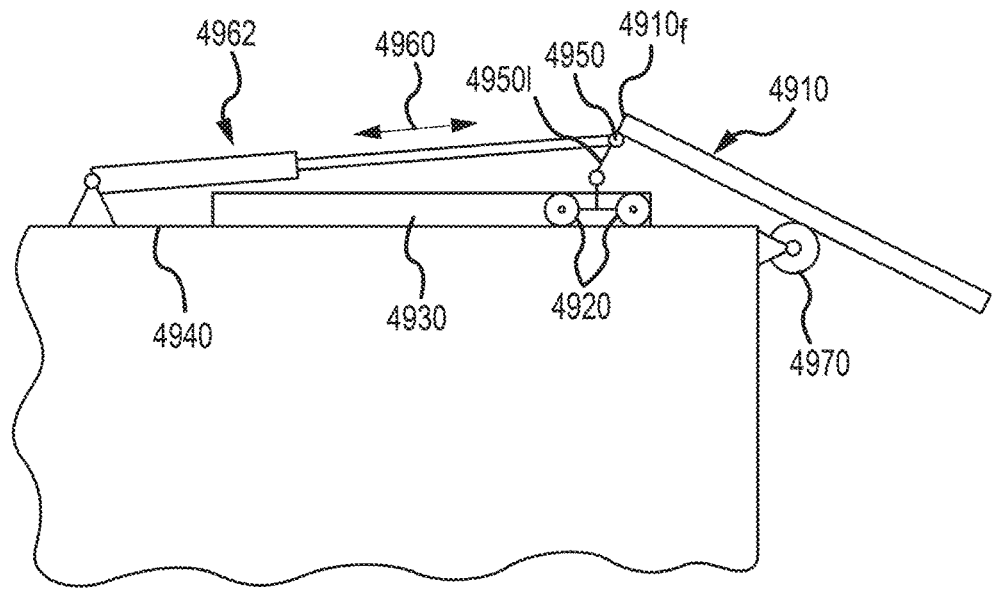
FIG. 49 is a partial side view of a cargo body and rear aerodynamic device showing a top panel that is free of rigid members in a deployed position according to an illustrative embodiment.
Figure 50:
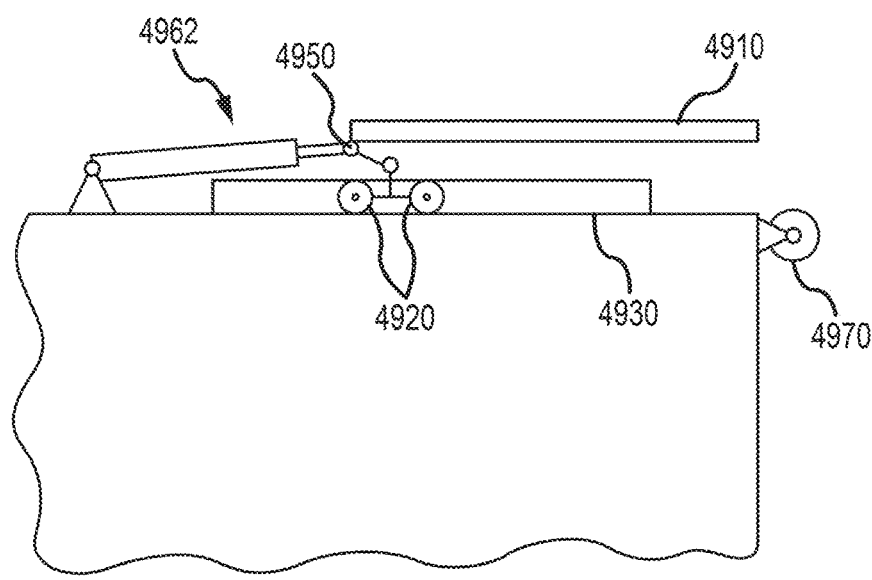
FIG. 50 is a partial side view of the cargo body and rear aerodynamic device of FIG. 49 in a retracted position.

FIGS. 49 and 50 show an arrangement for deploying (FIG. 49) and retracting (FIG. 50) a top or side panel 4910 (that is typically rigid) that can be free of rigid members or cables. While nacelles have been omitted in this example, they can be employed in a manner described herein. The panel 4910 is supported by a roller or other sliding assembly 4920 that rides on a track 4930. The track is mounted on the body side or top 4940 as shown. The forward end 4910f of the panel 4910 is attached at a hinge or pivot 4950 to the sliding/roller assembly 4920 (the connection may include a linkage 4950l as shown). The panel is moved between a deployed and retracted position (double arrow 4960) by an actuator 4962 that is mounted between the body side 4940 and the sliding/roller assembly 4920 or panel forward end 4910f. The panel 4910 rides along a corner roller 4970 or joist mounted on the door frame. This arrangement allows the taper angle to be varied by varying the position of the actuator and length of extension of the panel rearwardly. While shown as driving the panel 4910, the actuator 4962 may couple to the sliding assembly 4920. The angle of the panel is obtained by the linkage assembly 4950l moving from a parallel orientation for the panel (as shown in FIG. 50) and an angled orientation for the panel (as shown in FIG. 49) by operation of the actuator 4962.

Figure 51:
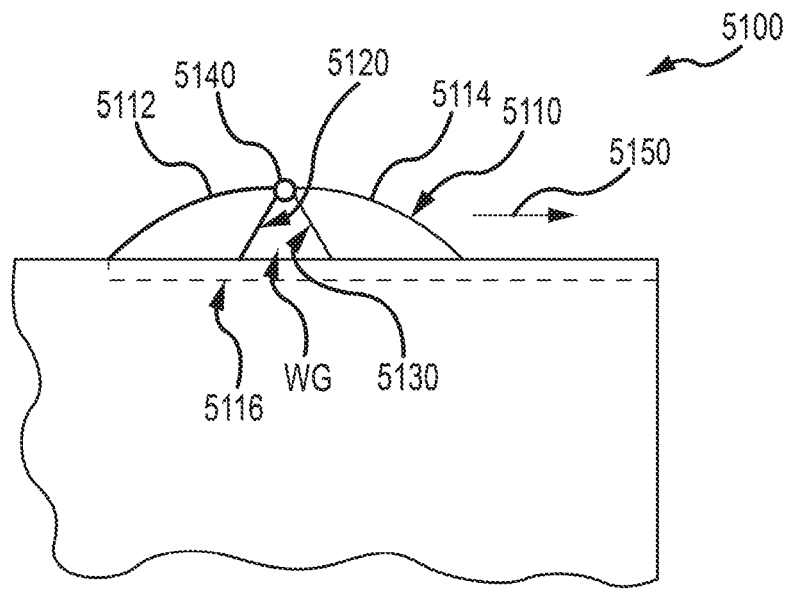
FIG. 51 is a partial side view of a cargo body and rear aerodynamic device showing a two-piece structurally segmented aerodynamic panel in a retracted position according to an illustrative embodiment.
Figure 52:
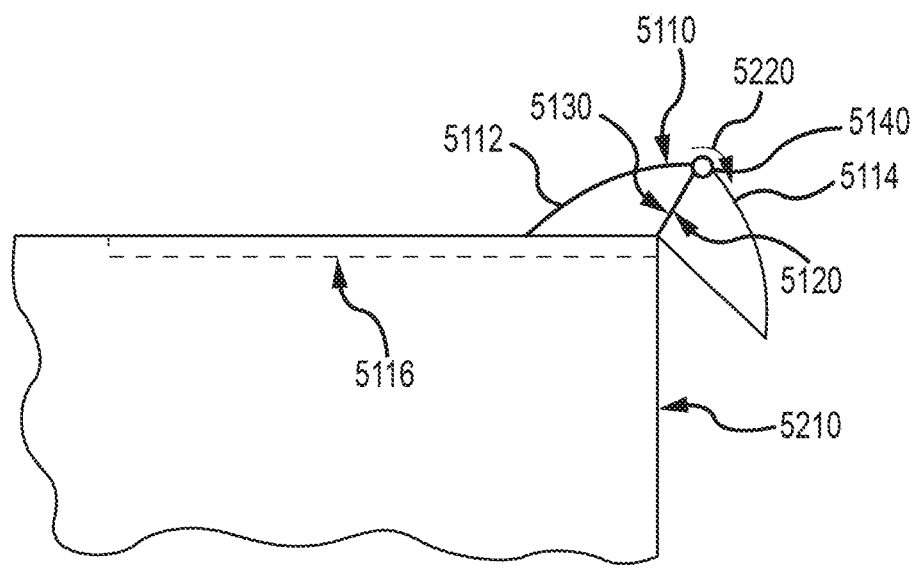
FIG. 52 is a partial side view of the cargo body and rear aerodynamic device of FIG. 51 in a deployed position.

FIGS. 51-54 show an aerodynamic device 5100 in which the aerodynamic panels are formed from structural segments. With reference to FIGS. 51 and 52, which respectively show a panel structure 5110 in a retracted and deployed position. The panel structure consists of a forward support 5112 that slides, for example, on tracks or guides 5116 (shown in phantom). The forward support 5112 defines an aerodynamic leading edge shape in this example. It includes in involute (undercut) rear edge 5120. A panel section 5114 is located rearward of the support 5112, and includes a confronting front edge 5130 that is also involute (undercut) as shown in the retracted position. The two edges 5120 and 5130 define a wedge-shaped gap WG therebetween in the depicted retracted position (FIG. 51). A top joint 5140 as described throughout the application extends across the width of the body and joint the support 5112 and panel 5114 at the joint in the otherwise continuous top surface. When the structure 5110 is moved rearward (arrow 5150) until the support edge 5120 meets the top corner of the cargo body rear side 5210, the aerodynamic panel 5114 rotates downwardly (curved arrow 5220) about the hinge under action of gravity or another rotation force and because the confronting front edge 5130 is stopped before the structure 5110 is completely stopped. The movement of the structure 5110, which causes the panel 5114 to rotate as shown by arrow 5220, continues until the two confronting edges 5120 and 5130 meet to provide a side of an overall rear aerodynamic, inwardly tapered structure that overhangs the rear side 5210 of the body as shown.

Figure 53:
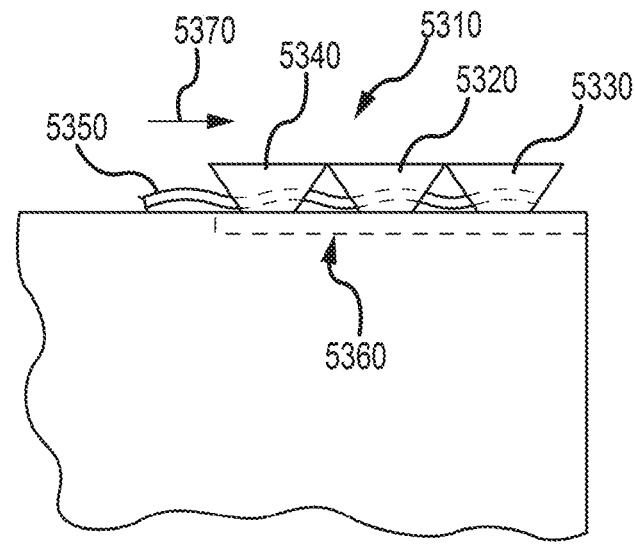
FIG. 53 is a partial side view of a cargo body and rear aerodynamic device showing a three-piece structurally segmented aerodynamic panel with a cable threaded through the segments, in a retracted position, according to an illustrative embodiment.
Figure 54:
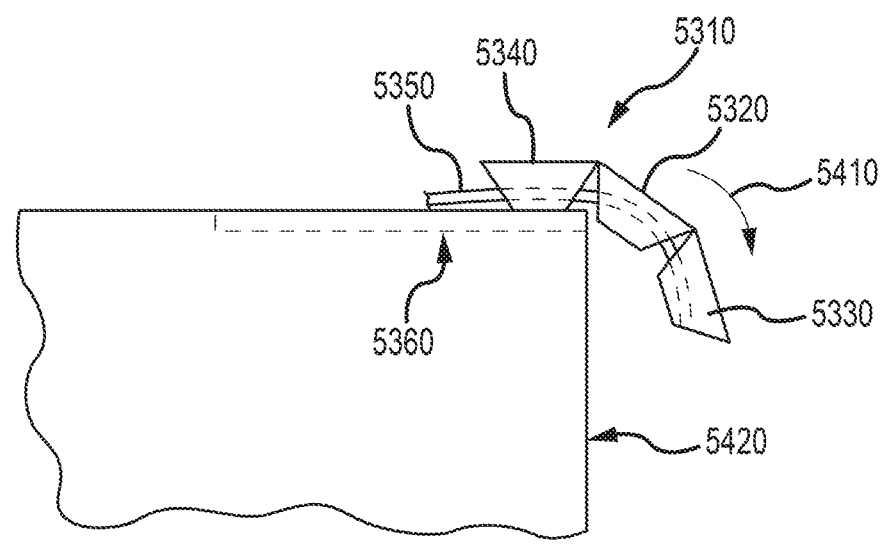
FIG. 54 is a partial side view of the cargo body and rear aerodynamic device of FIG. 53 in a deployed position.

In FIGS. 53 and 54 an aerodynamic structure 5310 is shown, respectively in a retracted position and a deployed position. In this exemplary arrangement, a series of wedge-shaped segments 5320, 5330 and 5340 are interconnected by one or more cables 5350. The segments 5320, 5330 and 5340 can be adapted to slide along a track 5360 (shown in phantom), or otherwise be guided in the longitudinal direction of the cargo body. The confronting edges of each of the segments is involute (undercut), similar to the structure 5110 in FIGS. 51 and 52. When deployed, the cable, and/or another biasing mechanism permits the segments to move (arrow 5370) rearwardly so that at least some of the segments rotate downwardly (curved arrow 5410) to overhang the rear side 5420 of the body, so that the confronting edges of the segments come into engagement and define a predetermined degree of inward taper. Note that the angle of each of the confronting edges can be varied to define a given taper shape and angle. Some edges can have a steeper angle than others to define, for example, a parabolic shape. The cable 5350 is fixed to the rearmost segment 5330 to prevent the line of segments from slipping away. The cable 5350 can be drawn rearwardly to retract the structure 5310 using an actuator or motorized reel (not shown) according to ordinary skill.

Figure 56:
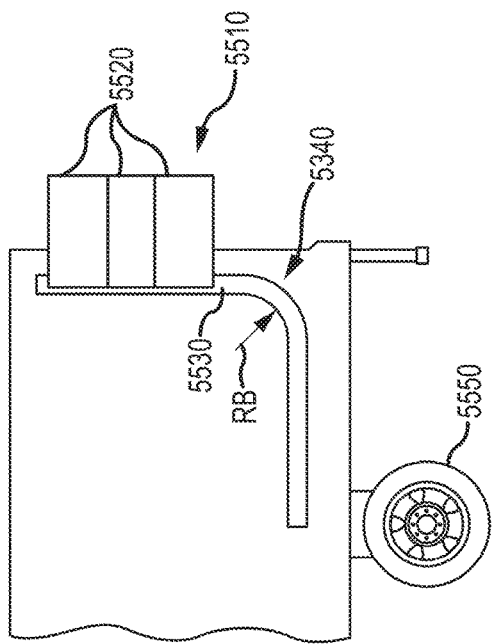
FIG. 56 is a partial side view of the cargo body and rear aerodynamic device of FIG. 56 in a deployed position.
Figure 57:
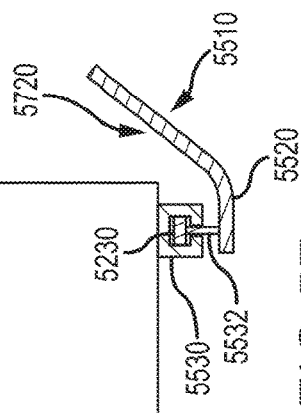
FIG. 57 is a partial top cross section of the cargo body and rear aerodynamic device of FIG. 55 showing a cross section of the track and roller arrangement for the panels in a deployed position.
Figure 55:
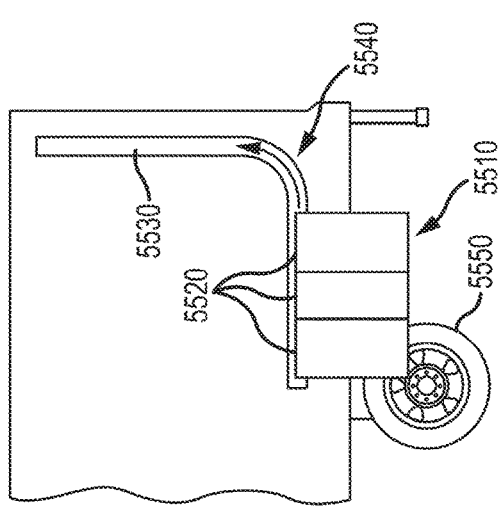
FIG. 55 is a partial side view of a cargo body and rear aerodynamic device showing a segmented aerodynamic panel that is stowed along the underside of the body, in a retracted position, according to an illustrative embodiment.

FIGS. 55-57 show another arrangement of a side-mounted aerodynamic structure 5510 that can be arranged in segments 5520 that each ride on a curved track (or rail) 5530 mounted rear area of each side of the cargo body and running from a position longitudinally (horizontally) near the bottom of the body to a position vertically along the rear side. A 90-degree bend 5540 facing the bottom-rear corner of the body guides the track 5530 between the horizontal and vertical orientation. As shown in FIG. 57, the panels can be formed with an inward taper along an overhanging section

5720. Each segment 5520 includes at least two rollers 5730 sized and arranged to ride in the track 5530. The rollers are captured by the track with a slot to allow the roller base/axle 5532 to interconnect with the segment 5520 along a parallel section before the tapered section 5720. The interconnection between the rollers 5730 and the track 5340 is sufficiently rigid and sturdy to prevent wobble or bending under aerodynamic load at highway speed. Additional reinforcing members—for example sliding blocks—can be used to make the interconnection more rigid while still allowing the segments to move along the track. The radius RB of the bend 5340 is defined to prevent binding of the inwardly tapered section of the segments on the body as they transition around the bend. The segments can overlap or reside edge-to-edge, and optional seals can be provided between segments. In this example, the segments are retracted into a location beneath the cargo body and rearward of the rear wheels 5550. This area is relatively protected and does not interfere with the door or other vehicle components/operations. When deployed, the segments are driven along the track into the vertical portion where they reside near the roof of the body. A sliding top panel can also be provided in accordance with any retracting and deploying arrangement contemplated herein. The shape, size and degree of taper for the segments are highly variable. Likewise, the mechanism by which the segments are moved between the retracted and deployed positions is also highly variable. For example a gear rack can be applied to the track, and a motor with a pinion gear can be mounted to one or more segments along the track in engagement with the rack.

FIGS. 58 and 59 show anther exemplary side-mounted, rear aerodynamic device arrangement 5810, typically for a side panel, which moves, respectively, between a deployed position and a retracted position. In this embodiment, the side panel 5820 is hingedly mounted (via hinge assembly 5822) on a rotating frame 5830 that is, itself, hinged to the corner of the body door frame by an axle 5840. In the deployed position, the rotating frame 5830 overlies part of the rear frame 5870 of the body as shown in the manner of a swinging rear trailer door. When retracted, the entire rotating frame 5830 rotates (curved arrow 5860) against the side 5920 of the body. This arrangement provides better mechanical advantage as the actuator 5880 can be moved more internally to overlap the door, and is attached between the frame 5830 and the panel 5820 as shown. Thus, the panel 5820 retracts against the rotating frame 5830 as the frame swings to the side, during retraction, thus allowing the arrangement to avoid interference with the door. A rubber/elastomeric stop 5890 can be provided to one or more locations on the frame to protect the panel during retraction against the frame. A variety of actuators—for example powered hinge assemblies can be used to open and close the frame, or this function can be performed manually. Likewise, a variety of biasing and actuation mechanisms can be employed to retract and deploy the panel with respect to the frame. The top panel can be implemented to deploy and retract according to any mechanism/technique contemplated herein.

Reference is now made to FIGS. 60-63 that show a side-mounted rear aerodynamic device 6010 according to another exemplary arrangement that moves, respectively, from a retracted to a deployed position. A panel 6020 is retracted by swinging upwardly on a pivot axis 6030 that extends laterally (into the page on the figure) of the cargo body side 6040. Because the side 6040 is typically planar, it is well suited for such a "swing-down" arrangement. The panel can be deployed (curved arrow 6050) using gravity and retracted using a geared motor or another drive system such as those systems described above. The 6020 panel can have a flexible shape that naturally tapers inward, but that can flex into a flatter configuration as it is rotated along the body side 6040 during retraction. The axle and the structure that secures the axle to the body side are sufficiently sturdy to avoid bending and excess vibration under aerodynamic loads. For added security, the panel 6020 can be locked in place by an appropriate latching system (e.g. a solenoid) in either the retracted or deployed position—or both.

Figure 60:
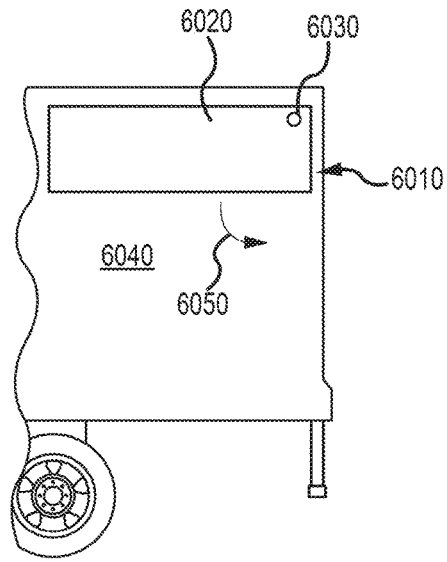
FIG. 60 is a partial side view of a cargo body and rear aerodynamic device showing a swing-down side panel in a retracted position according to an illustrative embodiment.
Figure 61:
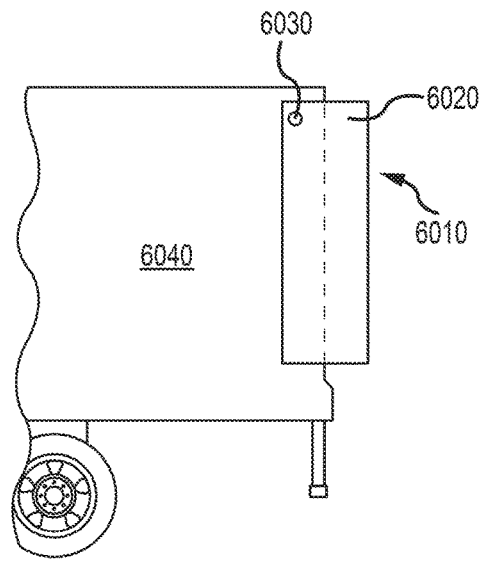
FIG. 61 is a partial side view of the cargo body and rear aerodynamic device of FIG. 60 in a deployed position.
Figure 62:
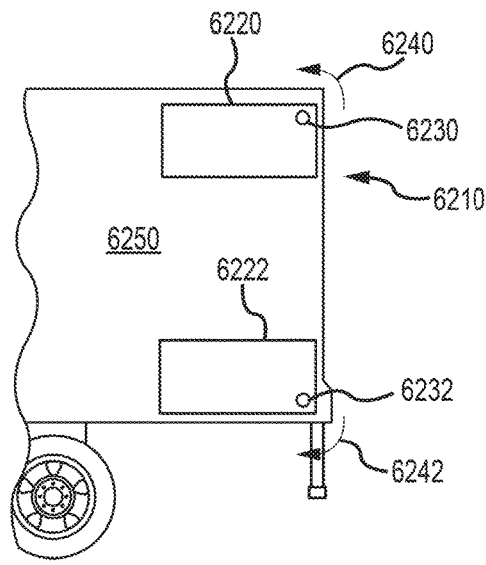
FIG. 62 is a partial side view of a cargo body and rear aerodynamic device showing a swing-down and swing-up side panel pair in a retracted position according to an illustrative embodiment.
Figure 63:
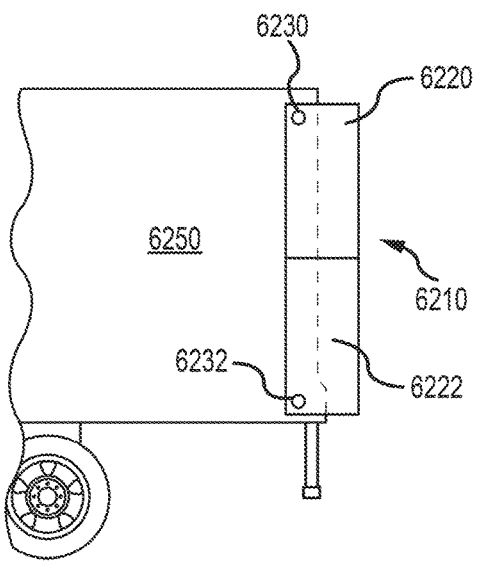
FIG. 63 is a partial side view of the cargo body and rear aerodynamic device of FIG. 62 in a deployed position.

FIGS. 62 and 63 show a modified version of the swinging panel arrangement 6010 of FIGS. 60 and 61. This side-mounted rear aerodynamic device 6210 is shown in a retracted position in FIG. 62 and a deployed position in FIG. 63. In this exemplary arrangement, each body side 6250 includes at least two swinging panels 6220, 6222 each mounted on an axis and actuated from a retracted position to a deployed position by rotation (curved arrows 6240, 6242) in opposing directions about a respective axle 6230, 6232. Various actuators and latches can be provided to the panels to move and/or lock them in place as described generally above. The panels 6220 and 6222 can overlap in a deployed position.

It should be clear that the various arrangements of deployable/retractable rear aerodynamic devices/structures described herein provide effective mechanisms for improving the rear-end aerodynamics of a cargo body with a rolling door or similar structure. These solutions maintain a low, non-interfering profile at the rear when the vehicle is parked—for example at a loading dock—while affording effective drag reduction when travelling at highway speed. These arrangements use a relative small number of moving parts and are reliable and durable over a long service life, avoiding rubbing and wear through effective placement of rollers, hinges and/or sliding components. Notably, the various embodiments herein employ a rotating rigid member that effectively guides side panels (and interconnected top panels) between retraction and deployment. The rotating rigid member includes one rotating end mounted to the rear of the cargo body and an opposing rotating end mounted to, or near, a trailing edge of the respective panel.

In addition, the various features described herein may be used with the embodiment in which the feature is introduced as well as other embodiments described herein whether specifically described or not. Multiple panels for each side may be used to increase panel and member rigidity. Stiffening segments, which are adhered or integrated into the panel material, may be used to allow for a rigid panel in one dimension and a flexible or rollable panel in another. Accordingly a three sided fabric, or flexible material, device is possible which uses rollers to collect each panel in the retracted state. Nacelles may be used to cover an all fabric device's mechanisms. Fabric which stretches may be applied to obtain a taught aerodynamic surface over a planar or complex shape. Intermediate members may be used to create a complex aerodynamic shape and maintain panel tension. Multi-axis linkage members may be used in place of single plane rotating members in order to achieve a compact assembly and longer device panel length. Fabric panels may be tensioned individually along the edges of the panels at the fastening points to allow for inconsistencies in the manufactured and installed device materials. All methods of springs may be used to retract panels on rollers including power springs, torsion, constant force, and twisted coil.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, the structures described herein, while applied to cargo bodies can be employed in other movable structures, such as cargo containers and smaller vehicles. Accordingly, this description is meant to be taken only by way of example, and not to otherwise limit the scope of this invention.

What is claimed is:

1. An aerodynamic device for a rear of a cargo body comprising:
    a side panel mounted between a frame of the cargo body and to a support that hinges between a retracted position and a deployed position;
    a mechanism that selectively biases the support to at least one of the retracted position and the deployed position;
    a side take-up area into which the side panel is gathered in the retracted position;
    a moving top frame member operatively connected to the support that coordinates movement of a top panel between the retracted position and the deployed position; and
    a top take-up area into which the top panel is gathered in the retracted position,
    wherein at least one of the side take-up area or the top take-up area includes a roller.

2. The aerodynamic device as set forth in claim 1 wherein the roller comprises a conical roller and the side panel defines a tapered structure in the deployed position.

3. The aerodynamic device as set forth in claim 1 wherein the mechanism that selectively biases the support is a spring.

4. A device for a rear of a cargo body comprising:
    a side panel mounted between a frame of the cargo body and to a support that hinges between a retracted position and a deployed position, the support comprising a rotating member that is hingedly attached at or near a rear of the frame of the cargo body and at or near a trailing edge of the side panel;
    a side take-up area into which the side panel is gathered in the retracted position;
    a moving top frame member operatively connected to the support that coordinates movement of a top panel between the retracted position and the deployed position; and
    a top take-up area into which the top panel is gathered in the retracted position,
    wherein at least one of the side take-up area or the top take-up area includes a roller.

5. An aerodynamic device for a rear of a cargo body comprising:
    a side panel mounted between a frame of the cargo body and to a support that hinges between a retracted position and a deployed position;
    a side take-up area into which the side panel is gathered in the retracted position;
    a moving top frame member operatively connected to the support that coordinates movement of a top panel between the retracted position and the deployed position; and
    a top take-up area into which the top panel is gathered in the retracted position,
    wherein the side take-up area and the top take-up area are configured to retain the side panel and top panel away from a door of the cargo body to allow operation of the door and the side panel and top panel are configured to be in an aerodynamic tapered position in the deployed position,
    wherein at least one of the side take-up area or the top take-up area includes a roller.

6. The aerodynamic device as set forth in claim 5 further comprising an actuator coupled to the support.

7. The aerodynamic device as set forth in claim 6 wherein the actuator comprises at least one of a mechanical spring, a gas spring, a driven lead screw, a linear motor, a rotating motor, a fluid motor, a fluid piston, or a combination thereof.

8. An aerodynamic device for a rear of a cargo body comprising:
    a side panel that moves between a retracted position and a deployed position along a guide that is mounted on a side of the cargo body;
    a rotating member interconnected between the cargo body and the side panel that maintains a shape and inward/rearward taper of the panel as it swings from the retracted position to the deployed position;
    a top take-up area into which the top panel is gathered in the retracted position;
    a linkage that joins the rotating member to a top panel so that the top panel moves between the retracted position and the deployed position in coordination with the rigid side panel; and
    a biasing mechanism that moves the rigid side panel and the top panel to at least one of the retracted position and the deployed position.

9. The aerodynamic device as set forth in claim 8 wherein the side panel is stored within a nacelle when it is in the retracted position.

10. The aerodynamic device as set forth in claim 9 wherein the side panel defines a rear edge that is positioned remote from a rear edge of the cargo body in the deployed position.

11. The aerodynamic device as set forth in claim 9 wherein the side panel includes a plurality of hinges to avoid contacting the cargo body when moving to the retracted position.

12. An aerodynamic device for a rear of a cargo body comprising:
    a side panel that moves between a retracted position and a deployed position;
    a top panel that moves between a retracted position and a deployed position;
    a rotating member interconnected between the cargo body and the side panel that maintains a shape and inward/rearward taper of the panel in the deployed position;
    a biasing mechanism that moves the side panel and the top panel to at least one of the retracted position and the deployed position; and
    an actuator that, when actuated, moves the side panel and the top panel to the other of the retracted position and deployed position by overcoming the biasing force of the biasing mechanism.

13. An aerodynamic device for a rear of a cargo body comprising:
- a side panel that moves between a retracted position and a deployed position along a guide that is mounted on a side of the cargo body;
- a rotating member interconnected between the cargo body and the side panel that maintains a shape and inward/rearward taper of the panel as it swings from the retracted position to the deployed position;
- a top take-up area into which the top panel is gathered in the retracted position;
- a linkage that joins the rotating member to a top panel so that the top panel moves between the retracted position and the deployed position in coordination with the side panel; and
- an actuator that moves the side panel and the top panel to at least one of the retracted position and the deployed position.

14. The aerodynamic device as set forth in claim 13 wherein the actuator is at least one of a mechanical spring, a gas spring, a driven lead screw, a linear motor, a rotating motor, a fluid motor and a fluid piston.

* * * * *